(12) United States Patent
Hendricks

(10) Patent No.: US 7,861,166 B1
(45) Date of Patent: Dec. 28, 2010

(54) RESIZING DOCUMENT PAGES TO FIT AVAILABLE HARDWARE SCREENS

(75) Inventor: John S. Hendricks, Potomac, MD (US)

(73) Assignee: Discovery Patent Holding, LLC, Silver Spring, MD (US)

( * ) Notice: Subject to any disclaimer, the term of this patent is extended or adjusted under 35 U.S.C. 154(b) by 0 days.

(21) Appl. No.: 09/335,268

(22) Filed: Jun. 17, 1999

Related U.S. Application Data

(63) Continuation-in-part of application No. 09/289,957, filed on Apr. 13, 1999, now Pat. No. 7,835,989, and a continuation-in-part of application No. 09/237,828, filed on Jan. 27, 1999, now Pat. No. 7,401,286, and a continuation-in-part of application No. 08/906,469, filed on Aug. 5, 1997, now Pat. No. 6,408,437, which is a continuation of application No. 08/160,281, filed on Dec. 2, 1993, now Pat. No. 5,798,785, application No. 09/335,268, which is a continuation-in-part of application No. 08/336,247, filed on Nov. 7, 1994, now Pat. No. 5,986,690, and a continuation-in-part of application No. 08/160,194, filed on Dec. 2, 1993, now Pat. No. 5,990,927.

(51) Int. Cl.
*G06F 17/28* (2006.01)

(52) U.S. Cl. .................. 715/277; 715/238; 715/252; 715/800

(58) Field of Classification Search .............. 715/500, 715/526, 792–793, 901, 200, 201, 205, 234, 715/251–252, 277, 800, 801, 238; 345/1.1–3.4
See application file for complete search history.

(56) References Cited

U.S. PATENT DOCUMENTS

| 3,860,873 A | 1/1975 | Ringstad |
| 3,891,792 A | 6/1975 | Kimura |
| 3,978,470 A | 8/1976 | McGuire |
| 4,023,408 A | 5/1977 | Ryan et al. |
| 4,071,697 A | 1/1978 | Bushnell et al. |
| 4,159,417 A | 6/1979 | Rubincam |

(Continued)

FOREIGN PATENT DOCUMENTS

| CA | 2044574 | 12/1992 |

(Continued)

OTHER PUBLICATIONS

Barnes, 10 Minute Guide to Windows 3.1, Alpha Books, 1992, pp. 60-64.*

(Continued)

*Primary Examiner*—Cesar B Paula
(74) *Attorney, Agent, or Firm*—Arent Fox, LLP

(57) ABSTRACT

An electronic book having various features for manipulating text or other information. The subscriber may highlight, cut and paste, copy and paste, and annotate information within an electronic book. A multiple page view feature permits the subscriber to simultaneously view any plurality of pages of an electronic book, and a multiple screen feature permits the subscriber to view one or more pages on a viewer having multiple screens. A picture-in-picture feature permits the subscriber to simultaneously view a page of an electronic book along with other content, such as a television program or information from another electronic book. The picture-in-picture feature may display an electronic book page as a main image wrapped around an inset image.

9 Claims, 47 Drawing Sheets

U.S. PATENT DOCUMENTS

| | | | |
|---|---|---|---|
| 4,160,242 A | 7/1979 | Fowler | |
| 4,179,212 A | 12/1979 | Lahr | |
| 4,197,590 A | 4/1980 | Sukonick et al. | |
| 4,272,819 A | 6/1981 | Katsumata et al. | |
| 4,298,793 A | 11/1981 | Melis et al. | |
| 4,302,193 A | 11/1981 | Haynes | |
| 4,361,848 A | 11/1982 | Poignet et al. | |
| 4,381,522 A | 4/1983 | Lambert | 725/93 |
| 4,398,216 A | 8/1983 | Field et al. | |
| 4,405,829 A | 9/1983 | Rivest et al. | |
| 4,406,626 A | 9/1983 | Anderson et al. | |
| 4,429,385 A | 1/1984 | Cichelli et al. | |
| 4,455,570 A | 6/1984 | Saeki et al. | |
| 4,484,217 A | 11/1984 | Block et al. | |
| 4,488,179 A | 12/1984 | Kruger et al. | |
| 4,513,390 A | 4/1985 | Walter et al. | |
| 4,517,598 A | 5/1985 | Van Valkenburg et al. | |
| 4,528,589 A | 7/1985 | Block et al. | |
| 4,528,643 A | 7/1985 | Freeny, Jr. | |
| 4,532,540 A | 7/1985 | Wine | |
| 4,533,948 A | 8/1985 | McNamara et al. | |
| 4,546,382 A | 10/1985 | McKenna et al. | |
| 4,567,512 A | 1/1986 | Abraham | |
| 4,578,531 A | 3/1986 | Everhart et al. | |
| 4,579,533 A | 4/1986 | Anderson et al. | |
| 4,587,520 A | 5/1986 | Astle | |
| 4,602,279 A | 7/1986 | Freeman et al. | |
| 4,604,710 A | 8/1986 | Amezcua et al. | |
| 4,605,964 A | 8/1986 | Chard | |
| 4,613,901 A | 9/1986 | Gilhousen et al. | |
| 4,616,263 A | 10/1986 | Eichelberger | |
| 4,621,282 A | 11/1986 | Ahern | |
| 4,625,076 A | 11/1986 | Okamoto et al. | |
| 4,625,235 A | 11/1986 | Watson | |
| 4,633,462 A | 12/1986 | Stifle et al. | |
| 4,639,225 A | 1/1987 | Washizuka | |
| 4,644,470 A | 2/1987 | Feigenbaum et al. | |
| 4,653,100 A | 3/1987 | Barnett et al. | |
| 4,668,218 A | 5/1987 | Virtanen | |
| 4,673,976 A | 6/1987 | Wreford-Howard | |
| 4,688,218 A | 8/1987 | Blineau et al. | |
| 4,688,245 A | 8/1987 | Schenk | |
| 4,688,246 A | 8/1987 | Eilers et al. | |
| 4,691,109 A | 9/1987 | Magee | |
| 4,694,483 A | 9/1987 | Cheung | |
| 4,694,490 A | 9/1987 | Harvey et al. | |
| 4,697,209 A | 9/1987 | Kiewit et al. | |
| 4,706,121 A | 11/1987 | Young | |
| 4,712,105 A | 12/1987 | Kohler | |
| 4,712,130 A | 12/1987 | Casey | |
| 4,716,543 A | 12/1987 | Ogawa et al. | |
| 4,724,491 A | 2/1988 | Lambert | |
| 4,731,840 A | 3/1988 | Mniszewski et al. | |
| 4,739,510 A | 4/1988 | Jeffers et al. | |
| 4,742,543 A | 5/1988 | Frederiksen | |
| 4,751,578 A | 6/1988 | Reiter et al. | |
| 4,768,087 A | 8/1988 | Taub et al. | |
| 4,774,655 A | 9/1988 | Kollin et al. | |
| 4,776,011 A | 10/1988 | Busby | |
| 4,792,972 A | 12/1988 | Cook, Jr. | |
| 4,796,220 A | 1/1989 | Wolfe | |
| 4,805,014 A | 2/1989 | Sahara et al. | |
| 4,816,901 A | 3/1989 | Music et al. | |
| 4,816,904 A | 3/1989 | McKenna et al. | |
| 4,820,167 A | 4/1989 | Nobles et al. | |
| D301,037 S | 5/1989 | Matsuda | |
| 4,829,372 A | 5/1989 | McCalley et al. | |
| 4,829,558 A | 5/1989 | Welsh | |
| 4,829,569 A | 5/1989 | Seth-Smith et al. | |
| 4,835,607 A | 5/1989 | Keith | |
| 4,854,878 A | 8/1989 | Malvino | |
| 4,855,725 A | 8/1989 | Fernandez | 345/173 |
| 4,860,379 A | 8/1989 | Schoenberger et al. | |
| 4,866,770 A | 9/1989 | Seth-Smith | |
| 4,868,866 A | 9/1989 | Williams, Jr. | |
| 4,876,736 A | 10/1989 | Kiewit | |
| 4,885,803 A | 12/1989 | Hermann et al. | |
| 4,890,319 A | 12/1989 | Seth-Smith | |
| 4,890,321 A | 12/1989 | Seth-Smith | |
| 4,891,838 A | 1/1990 | Faber | |
| 4,899,292 A | 2/1990 | Montagna | |
| 4,920,432 A | 4/1990 | Eggers et al. | |
| 4,924,513 A | 5/1990 | Herbison et al. | |
| 4,928,168 A | 5/1990 | Iwashita | |
| 4,928,177 A | 5/1990 | Martinez | |
| 4,930,160 A | 5/1990 | Vogel | |
| 4,941,089 A | 7/1990 | Fischer | |
| 4,941,125 A | 7/1990 | Boyne | |
| 4,947,244 A | 8/1990 | Fenwick et al. | |
| 4,947,429 A | 8/1990 | Bestler et al. | |
| 4,949,187 A | 8/1990 | Cohen | |
| 4,959,810 A | 9/1990 | Darbee et al. | |
| 4,961,109 A | 10/1990 | Tanaka | |
| 4,965,819 A | 10/1990 | Kannes | |
| 4,965,825 A | 10/1990 | Harvey et al. | |
| 4,975,951 A | 12/1990 | Bennett | |
| 4,977,455 A | 12/1990 | Young | |
| 4,982,344 A | 1/1991 | Jordan | |
| 4,985,697 A | 1/1991 | Boulton | 715/500.1 |
| D314,383 S | 2/1991 | Hafner | |
| 4,995,078 A | 2/1991 | Monslow et al. | |
| 4,996,597 A | 2/1991 | Duffield | |
| 5,001,554 A | 3/1991 | Johnson et al. | |
| 5,003,384 A | 3/1991 | Durden et al. | |
| 5,003,591 A | 3/1991 | Kauffman et al. | |
| 5,010,499 A | 4/1991 | Yee | |
| 5,014,125 A | 5/1991 | Pocock et al. | 725/93 |
| 5,015,829 A | 5/1991 | Eilert et al. | |
| 5,020,129 A | 5/1991 | Martin et al. | |
| 5,027,400 A | 6/1991 | Baji et al. | |
| 5,036,394 A | 7/1991 | Morii | |
| 5,036,537 A | 7/1991 | Jeffers et al. | |
| 5,038,402 A | 8/1991 | Robbins | |
| 5,046,093 A | 9/1991 | Wachob | |
| 5,047,867 A | 9/1991 | Strubbe et al. | |
| 5,049,862 A * | 9/1991 | Dao et al. | 345/179 |
| 5,049,990 A | 9/1991 | Kondo et al. | |
| 5,054,984 A | 10/1991 | Chan et al. | |
| 5,056,138 A | 10/1991 | Tyson, Sr. | |
| 5,057,917 A | 10/1991 | Shalkauser et al. | |
| 5,073,930 A | 12/1991 | Green et al. | |
| 5,075,771 A | 12/1991 | Hashimoto | |
| 5,077,607 A | 12/1991 | Johnson et al. | |
| 5,078,019 A | 1/1992 | Aoki | |
| 5,089,956 A | 2/1992 | MacPhail | |
| 5,091,782 A | 2/1992 | Krause et al. | |
| 5,093,718 A | 3/1992 | Hoarty et al. | 725/120 |
| 5,099,319 A | 3/1992 | Esch et al. | |
| 5,099,331 A * | 3/1992 | Truong | 348/564 |
| D325,581 S | 4/1992 | Schwartz | |
| 5,103,314 A | 4/1992 | Keenan | |
| 5,104,125 A | 4/1992 | Wilson | |
| 5,105,268 A | 4/1992 | Yamanouchi et al. | |
| D326,446 S | 5/1992 | Wong | |
| 5,115,426 A | 5/1992 | Spanke | |
| 5,121,476 A | 6/1992 | Yee | |
| 5,124,980 A | 6/1992 | Maki | |
| 5,128,662 A * | 7/1992 | Failla | 345/1.3 |
| 5,130,792 A | 7/1992 | Tindell et al. | |
| 5,130,924 A | 7/1992 | Barker et al. | |
| 5,132,789 A | 7/1992 | Ammon et al. | |
| 5,132,992 A | 7/1992 | Yurt et al. | |
| 5,133,079 A | 7/1992 | Ballantyne et al. | |
| 5,140,419 A | 8/1992 | Galumbeck et al. | |

| | | | | | |
|---|---|---|---|---|---|
| D329,238 S | 9/1992 | Grasso et al. | 5,319,542 A | 6/1994 | King et al. |
| 5,144,663 A | 9/1992 | Kudelski et al. ............ 380/230 | 5,319,649 A | 6/1994 | Raghaven et al. |
| 5,144,665 A | 9/1992 | Takaragi et al. | 5,319,707 A | 6/1994 | Wasilewski et al. |
| 5,146,552 A * | 9/1992 | Cassorla et al. ............. 715/512 | 5,321,846 A | 6/1994 | Yokota et al. |
| 5,146,600 A | 9/1992 | Sugiura | 5,323,240 A | 6/1994 | Amano et al. |
| 5,150,118 A | 9/1992 | Finkle et al. | 5,327,554 A | 7/1994 | Palazzi, III et al. |
| 5,151,782 A | 9/1992 | Ferraro | 5,329,590 A | 7/1994 | Pond |
| 5,151,789 A | 9/1992 | Young | D349,923 S | 8/1994 | Billings et al. |
| 5,152,011 A | 9/1992 | Schwob | 5,339,091 A | 8/1994 | Yamazaki et al. |
| 5,155,590 A | 10/1992 | Beyers, II et al. | 5,339,239 A | 8/1994 | Manabe et al. |
| 5,155,591 A | 10/1992 | Wachob | 5,339,315 A | 8/1994 | Maeda et al. |
| 5,157,783 A | 10/1992 | Anderson | 5,341,166 A | 8/1994 | Garr et al. |
| 5,159,452 A | 10/1992 | Kinoshita et al. | 5,341,293 A * | 8/1994 | Vertelney et al. ............ 715/530 |
| 5,159,669 A | 10/1992 | Trigg et al. | 5,341,425 A | 8/1994 | Wasilweski et al. |
| 5,166,886 A | 11/1992 | Molnar et al. | 5,341,426 A | 8/1994 | Barney et al. |
| D331,760 S | 12/1992 | Renk, Jr. | 5,341,474 A | 8/1994 | Gelman et al. |
| 5,172,413 A | 12/1992 | Bradley et al. | 5,343,239 A | 8/1994 | Lappington |
| 5,173,051 A | 12/1992 | May et al. | 5,343,516 A | 8/1994 | Callele et al. |
| 5,182,639 A | 1/1993 | Jutamulia et al. | 5,345,580 A | 9/1994 | Tamaru et al. |
| 5,185,667 A | 2/1993 | Zimmerman et al. | 5,345,594 A | 9/1994 | Tsuda |
| 5,195,181 A | 3/1993 | Bryant et al. | 5,349,638 A | 9/1994 | Pitroda et al. |
| 5,199,104 A | 3/1993 | Hirayama | 5,351,075 A | 9/1994 | Herz et al. |
| 5,202,817 A | 4/1993 | Koenck et al. | 5,353,121 A | 10/1994 | Young et al. |
| 5,204,947 A | 4/1993 | Bernstein et al. | 5,355,162 A | 10/1994 | Yazolino et al. |
| 5,206,722 A | 4/1993 | Kwan | 5,357,276 A | 10/1994 | Banker et al. |
| 5,206,929 A | 4/1993 | Langford et al. ............. 715/723 | 5,365,265 A | 11/1994 | Shibata et al. |
| 5,206,954 A | 4/1993 | Inoue et al. | 5,365,434 A | 11/1994 | Figliuzzi |
| 5,208,665 A | 5/1993 | McCalley et al. | 5,367,330 A | 11/1994 | Haave et al. |
| 5,208,745 A | 5/1993 | Quentin et al. | 5,367,571 A | 11/1994 | Bowen et al. |
| 5,210,611 A | 5/1993 | Yee et al. | 5,367,621 A | 11/1994 | Cohen et al. |
| 5,212,553 A | 5/1993 | Maruoka | 5,367,643 A | 11/1994 | Chang et al. |
| 5,216,515 A | 6/1993 | Steele et al. | 5,371,532 A | 12/1994 | Gelman et al. |
| 5,220,438 A | 6/1993 | Yamamoto | 5,372,507 A | 12/1994 | Goleh |
| 5,220,649 A * | 6/1993 | Forcier ....................... 715/541 | 5,373,324 A | 12/1994 | Kuroda et al. |
| 5,221,962 A | 6/1993 | Backus et al. | 5,375,068 A | 12/1994 | Palmer et al. |
| 5,222,136 A | 6/1993 | Rasmussen et al. | 5,375,160 A | 12/1994 | Guidon et al. |
| 5,223,924 A | 6/1993 | Strubbe | 5,379,057 A | 1/1995 | Clough et al. |
| 5,231,631 A | 7/1993 | Buhrke | 5,383,112 A | 1/1995 | Clark |
| 5,233,333 A | 8/1993 | Borsuk | 5,384,588 A | 1/1995 | Martin et al. |
| 5,235,419 A | 8/1993 | Krause et al. | 5,388,101 A | 2/1995 | Dinkins |
| 5,235,619 A | 8/1993 | Beyers et al. | 5,388,196 A | 2/1995 | Pajak et al. |
| 5,235,680 A | 8/1993 | Bijnagte | 5,390,348 A | 2/1995 | Magin et al. |
| 5,237,311 A | 8/1993 | Mailey et al. | 5,392,387 A | 2/1995 | Fitzpatrick |
| 5,237,610 A | 8/1993 | Gammie et al. | 5,396,546 A | 3/1995 | Remillard ................ 379/93.24 |
| 5,237,614 A | 8/1993 | Weiss | 5,400,401 A | 3/1995 | Wasilewski et al. |
| 5,239,665 A | 8/1993 | Tsuchiya | 5,404,393 A | 4/1995 | Remillard ................ 379/93.25 |
| 5,241,671 A | 8/1993 | Reed et al. | 5,404,505 A | 4/1995 | Levison |
| 5,247,347 A | 9/1993 | Litteral et al. | 5,407,357 A | 4/1995 | Cutler |
| 5,247,575 A | 9/1993 | Sprague et al. | 5,408,258 A | 4/1995 | Kolessar |
| 5,251,324 A | 10/1993 | McMullan | 5,408,465 A | 4/1995 | Guesella et al. |
| 5,253,066 A | 10/1993 | Vogel | 5,410,326 A | 4/1995 | Goldstein |
| 5,253,275 A | 10/1993 | Yurt et al. | 5,410,344 A | 4/1995 | Graves et al. |
| 5,253,341 A | 10/1993 | Rozmanith et al. | 5,412,416 A | 5/1995 | Nemirofsky |
| 5,256,067 A | 10/1993 | Gildea | 5,414,426 A | 5/1995 | O'Donnell et al. |
| 5,257,185 A | 10/1993 | Farley et al. | 5,416,508 A | 5/1995 | Sakuma et al. |
| 5,260,778 A | 11/1993 | Kauffman et al. | 5,417,575 A * | 5/1995 | McTaggart ................ 434/317 |
| 5,260,788 A | 11/1993 | Takano et al. | 5,418,559 A | 5/1995 | Blahut |
| 5,262,875 A | 11/1993 | Mincer et al. | 5,418,957 A | 5/1995 | Narayan |
| 5,282,028 A | 1/1994 | Johnson et al. | 5,420,474 A | 5/1995 | Schmitt |
| 5,282,206 A | 1/1994 | Ishihara | 5,420,974 A | 5/1995 | Morris et al. |
| 5,283,639 A | 2/1994 | Esch et al. | 5,424,770 A | 6/1995 | Schmelzer |
| 5,285,272 A | 2/1994 | Bradley et al. | 5,425,102 A | 6/1995 | Moy |
| 5,289,271 A | 2/1994 | Watson | 5,426,594 A | 6/1995 | Wright et al. |
| 5,289,288 A | 2/1994 | Silverman et al. | 5,428,529 A | 6/1995 | Hartrick et al. |
| 5,291,554 A | 3/1994 | Morales | 5,432,542 A | 7/1995 | Thibadeau et al. |
| 5,293,540 A | 3/1994 | Trani et al. | 5,432,561 A | 7/1995 | Strubbe |
| 5,293,633 A | 3/1994 | Robbins | 5,437,552 A | 8/1995 | Baer et al. |
| 5,301,172 A | 4/1994 | Richards et al. | 5,438,372 A | 8/1995 | Tsumori et al. |
| D346,620 S | 5/1994 | McSorley | 5,440,632 A | 8/1995 | Bacon et al. |
| 5,315,711 A | 5/1994 | Barone et al. | 5,442,390 A | 8/1995 | Hooper et al. |
| 5,318,450 A | 6/1994 | Carver | 5,442,626 A | 8/1995 | Wei |
| 5,319,454 A | 6/1994 | Schutte | 5,444,853 A | 8/1995 | Lentz |
| 5,319,455 A | 6/1994 | Hoarty et al. ................. 725/34 | 5,446,488 A | 8/1995 | Vogel |

| | | | | | | |
|---|---|---|---|---|---|---|
| 5,446,490 A | | 8/1995 | Blahut et al. .................. 725/97 | 5,585,858 A | 12/1996 | Harper et al. |
| 5,446,919 A | | 8/1995 | Wilkins | 5,586,235 A | 12/1996 | Kauffman et al. |
| D362,429 S | | 9/1995 | Lande et al. | 5,587,724 A | 12/1996 | Matsuda |
| 5,453,796 A | | 9/1995 | Duffield | 5,596,697 A | 1/1997 | Foster et al. |
| 5,459,507 A | | 10/1995 | Sakuma et al. | 5,598,209 A | 1/1997 | Cortjens et al. |
| 5,461,667 A | | 10/1995 | Remillard | 5,598,279 A | 1/1997 | Ishii |
| 5,465,213 A | | 11/1995 | Ross | 5,598,351 A | 1/1997 | Chater et al. |
| 5,465,401 A | | 11/1995 | Thompson | 5,598,523 A | 1/1997 | Fujita |
| 5,466,158 A | | 11/1995 | Smith, III | 5,600,368 A | 2/1997 | Matthews, III .............. 348/143 |
| 5,467,102 A | * | 11/1995 | Kuno et al. .................. 345/1.3 | 5,600,573 A | 2/1997 | Hendricks et al. |
| 5,469,206 A | | 11/1995 | Strubbe et al. | 5,602,596 A | 2/1997 | Claussen et al. |
| 5,473,362 A | | 12/1995 | Fitzgerald et al. | 5,604,824 A | 2/1997 | Chui et al. |
| 5,475,398 A | * | 12/1995 | Yamazaki et al. ........... 345/104 | 5,608,449 A | 3/1997 | Swafford et al. |
| 5,475,399 A | | 12/1995 | Borsuk | 5,613,109 A | 3/1997 | Yamauchi et al. |
| 5,475,585 A | | 12/1995 | Bush | 5,621,456 A | 4/1997 | Florin et al. |
| 5,475,682 A | | 12/1995 | Choudhury | 5,621,658 A | 4/1997 | Jackson et al. |
| 5,477,262 A | | 12/1995 | Banker et al. .................. 725/38 | 5,624,265 A | 4/1997 | Redford et al. |
| 5,477,263 A | | 12/1995 | O'Callaghan et al. | 5,625,833 A | * 4/1997 | Levine et al. ................ 715/500 |
| 5,479,268 A | | 12/1995 | Young et al. .................. 386/83 | 5,630,103 A | 5/1997 | Smith et al. |
| 5,479,508 A | | 12/1995 | Bestler et al. | 5,630,125 A | 5/1997 | Zellweger |
| 5,479,615 A | | 12/1995 | Ishii et al. | 5,631,693 A | 5/1997 | Wunderlich et al. |
| 5,481,294 A | | 1/1996 | Thomas et al. | 5,631,694 A | 5/1997 | Aggarwal et al. |
| 5,481,296 A | | 1/1996 | Cragun et al. ................ 725/136 | 5,632,022 A | 5/1997 | Warren et al. |
| 5,481,542 A | | 1/1996 | Logston | 5,634,064 A | * 5/1997 | Warnock et al. ............ 715/208 |
| 5,483,278 A | | 1/1996 | Strubbe et al. | 5,635,918 A | 6/1997 | Tett |
| 5,484,292 A | * | 1/1996 | McTaggart .................. 434/317 | 5,636,036 A | 6/1997 | Ashbey |
| 5,485,176 A | | 1/1996 | Ohara | 5,638,443 A | 6/1997 | Stefik |
| 5,485,221 A | | 1/1996 | Banker et al. | 5,640,193 A | 6/1997 | Wellner |
| 5,486,686 A | | 1/1996 | Zdybel, Jr. et al. | 5,640,196 A | 6/1997 | Behrens et al. |
| 5,495,581 A | | 2/1996 | Tsai | 5,644,354 A | 7/1997 | Thompson et al. .......... 725/138 |
| 5,497,187 A | | 3/1996 | Banker et al. | 5,646,675 A | 7/1997 | Copriviza et al. |
| 5,497,459 A | | 3/1996 | Tanihira et al. | 5,649,230 A | 7/1997 | Lentz |
| 5,499,330 A | * | 3/1996 | Lucas et al. .................. 715/514 | 5,657,414 A | 8/1997 | Lett et al. |
| 5,500,794 A | | 3/1996 | Fujita et al. .................... 700/83 | 5,661,516 A | 8/1997 | Carles |
| 5,502,576 A | | 3/1996 | Ramsay et al. | 5,663,748 A | 9/1997 | Huffman |
| 5,506,902 A | | 4/1996 | Kubota | 5,663,757 A | 9/1997 | Morales ........................ 725/5 |
| 5,509,074 A | | 4/1996 | Choudhury et al. | 5,666,493 A | 9/1997 | Wojoik et al. |
| 5,512,934 A | | 4/1996 | Kochanski | 5,682,206 A | 10/1997 | Wehmeyer |
| 5,515,098 A | | 5/1996 | Carles | 5,689,641 A | 11/1997 | Ludwig et al. |
| 5,517,254 A | | 5/1996 | Monta et al. | 5,689,648 A | 11/1997 | Diaz et al. |
| 5,519,780 A | | 5/1996 | Woo et al. | 5,689,663 A | 11/1997 | Williams ...................... 715/721 |
| 5,521,631 A | | 5/1996 | Budow et al. | 5,691,777 A | 11/1997 | Kassaatly |
| 5,524,193 A | | 6/1996 | Covington et al. | 5,696,906 A | 12/1997 | Peters et al. |
| 5,524,201 A | | 6/1996 | Shwarts et al. | 5,696,982 A | 12/1997 | Tanigawa et al. |
| 5,526,035 A | | 6/1996 | Lappington et al. | 5,697,793 A | 12/1997 | Huffman et al. |
| 5,526,469 A | | 6/1996 | Brindle et al. | 5,708,960 A | 1/1998 | Kamisaka |
| 5,528,281 A | | 6/1996 | Grady et al. | 5,710,887 A | 1/1998 | Chelliah et al. |
| 5,528,490 A | | 6/1996 | Hill | 5,715,314 A | 2/1998 | Payne et al. |
| 5,530,235 A | | 6/1996 | Stefik | 5,715,515 A | 2/1998 | Akins, III |
| 5,531,227 A | | 7/1996 | Schneider | 5,721,832 A | 2/1998 | Westrope et al. |
| 5,531,600 A | | 7/1996 | Baer | 5,721,908 A | 2/1998 | Lagarde et al. |
| 5,532,920 A | | 7/1996 | Hartnick et al. | 5,721,956 A | 2/1998 | Martin et al. |
| 5,534,888 A | | 7/1996 | Lebby et al. | 5,722,418 A | 3/1998 | Bro |
| 5,538,430 A | | 7/1996 | Smith | 5,724,091 A | 3/1998 | Freeman et al. ............. 725/138 |
| 5,544,320 A | | 8/1996 | Konrad | 5,724,521 A | 3/1998 | Dedrick |
| 5,544,342 A | | 8/1996 | Dean | 5,726,909 A | 3/1998 | Krikorian |
| 5,550,863 A | | 8/1996 | Yurt et al. | 5,727,065 A | 3/1998 | Dillon |
| 5,553,216 A | | 9/1996 | Yoshioka et al. | 5,734,719 A | 3/1998 | Tsevdos et al. |
| 5,555,441 A | | 9/1996 | Haddad | 5,734,823 A | 3/1998 | Saigh et al. |
| 5,557,722 A | | 9/1996 | DeRose et al. | 5,734,891 A | 3/1998 | Saigh |
| 5,557,744 A | | 9/1996 | Kobayakawa et al. | 5,737,725 A | 4/1998 | Case |
| 5,561,708 A | | 10/1996 | Remillard | 5,737,747 A | 4/1998 | Vishlitzky et al. |
| 5,561,803 A | | 10/1996 | Kilis | 5,739,814 A | 4/1998 | Ohara et al. |
| 5,564,043 A | | 10/1996 | Siefert | 5,740,549 A | 4/1998 | Reily et al. |
| 5,565,908 A | | 10/1996 | Ahmad | 5,742,680 A | 4/1998 | Wilson |
| 5,565,999 A | | 10/1996 | Takahashi | 5,745,711 A | 4/1998 | Kitahara et al. |
| 5,570,126 A | | 10/1996 | Blahut et al. | 5,748,441 A | 5/1998 | Loritz et al. |
| 5,572,625 A | | 11/1996 | Raman et al. | 5,749,735 A | 5/1998 | Redford |
| 5,572,652 A | | 11/1996 | Robusto et al. | 5,754,172 A | 5/1998 | Kubota et al. |
| 5,579,055 A | | 11/1996 | Hamilton et al. | 5,758,257 A | 5/1998 | Herz et al. |
| 5,579,057 A | | 11/1996 | Banker et al. | 5,760,771 A | 6/1998 | Blonder |
| 5,581,560 A | | 12/1996 | Shimada et al. | 5,761,468 A | 6/1998 | Emberson |
| 5,581,686 A | * | 12/1996 | Koppolu et al. ............... 715/784 | 5,761,485 A | 6/1998 | Munyan ........................ 715/839 |

| | | | | | |
|---|---|---|---|---|---|
| 5,761,606 A | 6/1998 | Wolzien | 5,986,677 A | 11/1999 | Jones et al. |
| 5,761,681 A | 6/1998 | Huffman | 5,986,690 A | 11/1999 | Hendricks .................... 725/60 |
| 5,764,276 A | 6/1998 | Martin et al. | 5,990,927 A | 11/1999 | Hendricks et al. |
| 5,767,896 A | 6/1998 | Nemirofsky | 5,991,594 A | 11/1999 | Froeber |
| 5,768,521 A | 6/1998 | Dedrick | 5,999,214 A | 12/1999 | Inagaki |
| 5,771,354 A | 6/1998 | Crawford | 6,009,401 A | 12/1999 | Horstmann |
| 5,774,109 A | 6/1998 | Winksy et al. | 6,012,890 A | 1/2000 | Celorio |
| 5,774,170 A | 6/1998 | Hite et al. | 6,014,184 A | 1/2000 | Knee et al. |
| 5,778,374 A | 7/1998 | Dang et al. | 6,016,484 A | 1/2000 | Williams et al. |
| 5,784,565 A | 7/1998 | Lewine | 6,025,837 A | 2/2000 | Mathews, III et al. |
| 5,786,521 A | 7/1998 | Darsow | 6,025,871 A | 2/2000 | Kantor et al. |
| 5,787,171 A | 7/1998 | Kubota et al. | 6,029,045 A | 2/2000 | Picco et al. |
| 5,787,254 A | 7/1998 | Maddalozzo et al. | 6,029,141 A | 2/2000 | Bezos et al. |
| 5,788,504 A | 8/1998 | Rice et al. | 6,029,176 A | 2/2000 | Cannon |
| 5,790,176 A | 8/1998 | Criag | 6,034,680 A | 3/2000 | Kessenich .................... 715/733 |
| 5,790,935 A | 8/1998 | Payton | 6,044,385 A | 3/2000 | Gross et al. |
| 5,793,414 A | 8/1998 | Shaffer ........................ 725/133 | 6,052,717 A | 4/2000 | Reynolds et al. ............ 709/218 |
| 5,796,954 A | 8/1998 | Hanif | 6,055,544 A | 4/2000 | DeRose et al. |
| 5,798,785 A | 8/1998 | Hendricks et al. | 6,061,504 A | 5/2000 | Tzelnic et al. |
| 5,799,071 A | 8/1998 | Azar et al. | 6,072,463 A | 6/2000 | Glaser |
| 5,799,157 A | 8/1998 | Escallon ........................ 705/27 | 6,091,823 A | 7/2000 | Hosomi et al. |
| 5,802,465 A | 9/1998 | Hamalainen et al. | 6,091,930 A | 7/2000 | Mortimer et al. |
| 5,802,526 A | 9/1998 | Fawcett et al. | 6,101,485 A | 8/2000 | Fortenberry et al. |
| 5,805,204 A | 9/1998 | Thompson et al. ............ 725/48 | 6,112,049 A | 8/2000 | Sonnenfeld |
| 5,815,662 A | 9/1998 | Ong | 6,115,040 A | 9/2000 | Bladow et al. |
| 5,815,671 A | 9/1998 | Morrison | 6,115,482 A | 9/2000 | Sears et al. |
| 5,819,301 A | 10/1998 | Rowe et al. | 6,132,789 A | 10/2000 | Sprott |
| 5,835,732 A | 11/1998 | Kikinis et al. | 6,161,093 A | 12/2000 | Watari et al. |
| 5,844,600 A | 12/1998 | Kerr | 6,163,796 A | 12/2000 | Yokomizo |
| 5,844,890 A | 12/1998 | Delp et al. | 6,167,435 A | 12/2000 | Druckenmiller et al. |
| 5,850,218 A | 12/1998 | LaJoie et al. | 6,173,335 B1 | 1/2001 | Culbert |
| 5,850,520 A | 12/1998 | Griebenow et al. | 6,177,936 B1 | 1/2001 | Cragun |
| 5,850,629 A | 12/1998 | Holm et al. | 6,195,667 B1 | 2/2001 | Duga et al. |
| 5,859,594 A | 1/1999 | King et al. | 6,204,885 B1 | 3/2001 | Kwoh .......................... 348/564 |
| 5,862,325 A | 1/1999 | Reed et al. | 6,229,694 B1 | 5/2001 | Kono |
| 5,862,329 A | 1/1999 | Aras et al. | 6,243,071 B1 | 6/2001 | Shwarts et al. |
| 5,864,823 A | 1/1999 | Levitan | 6,249,785 B1 | 6/2001 | Paepke |
| 5,870,717 A | 2/1999 | Wiecha | 6,252,876 B1 | 6/2001 | Brueckheimer |
| 5,870,767 A | 2/1999 | Kraft, IV | 6,252,879 B1 | 6/2001 | Zhang |
| 5,877,755 A | 3/1999 | Helhake | 6,260,024 B1 | 7/2001 | Shkedy |
| 5,877,801 A | 3/1999 | Martin et al. | 6,269,483 B1 | 7/2001 | Broussard |
| 5,881,269 A | 3/1999 | Dobbelstein | 6,279,017 B1 | 8/2001 | Walker |
| 5,884,288 A | 3/1999 | Chang | 6,281,986 B1 | 8/2001 | Form |
| 5,887,801 A | 3/1999 | Stevens | 6,295,542 B1 | 9/2001 | Corbin |
| 5,890,122 A | 3/1999 | Van Kleeck et al. | 6,298,441 B1 | 10/2001 | Handelman et al. |
| 5,890,177 A | 3/1999 | Moody et al. | 6,301,584 B1 | 10/2001 | Ranger |
| 5,892,900 A | 4/1999 | Ginter et al. | 6,313,828 B1 | 11/2001 | Chombo |
| 5,892,915 A | 4/1999 | Duso et al. | 6,314,474 B1 | 11/2001 | Walter et al. |
| 5,893,109 A | 4/1999 | DeRose et al. | 6,320,591 B1 | 11/2001 | Griencewic |
| 5,893,132 A | 4/1999 | Huffman et al. | 6,331,865 B1 | 12/2001 | Sachs et al. |
| 5,898,852 A | 4/1999 | Petolino et al. | 6,331,867 B1 | 12/2001 | Eberhard et al. |
| 5,903,319 A | 5/1999 | Busko et al. | 6,334,109 B1 | 12/2001 | Kanevsky et al. |
| 5,903,652 A | 5/1999 | Mital | 6,335,678 B1 | 1/2002 | Heutschi |
| 5,903,901 A | 5/1999 | Kawakura et al. | 6,339,842 B1 | 1/2002 | Fernandez et al. |
| 5,906,397 A | 5/1999 | MacWilliams | 6,344,853 B1 | 2/2002 | Knight |
| 5,914,706 A | 6/1999 | Kono | 6,351,750 B1 | 2/2002 | Duga et al. |
| 5,917,543 A | 6/1999 | Uehara | 6,363,418 B1 | 3/2002 | Conboy et al. |
| 5,917,915 A | 6/1999 | Hirose | 6,385,614 B1 | 5/2002 | Vellandi |
| 5,918,213 A | 6/1999 | Bernard et al. | 6,411,973 B1 | 6/2002 | Yianilos |
| 5,923,656 A | 7/1999 | Duan | 6,415,316 B1 | 7/2002 | Van Der Meer |
| 5,926,624 A | 7/1999 | Katz et al. | 6,418,214 B1 | 7/2002 | Smythe et al. |
| 5,929,848 A | 7/1999 | Albukerk et al. | 6,438,233 B1 | 8/2002 | Yoshimune et al. |
| 5,930,768 A | 7/1999 | Hooban | 6,452,614 B1 | 9/2002 | King et al. |
| 5,933,498 A | 8/1999 | Schneck et al. | 6,452,933 B1 | 9/2002 | Duffield et al. |
| 5,937,162 A | 8/1999 | Funk et al. | 6,460,036 B1 | 10/2002 | Herz |
| 5,940,073 A | 8/1999 | Klosterman et al. | 6,462,729 B2 | 10/2002 | Morita |
| 5,956,034 A | 9/1999 | Sachs et al. | 6,486,895 B1 * | 11/2002 | Robertson et al. ............ 715/776 |
| 5,956,483 A | 9/1999 | Grate et al. | 6,493,734 B1 | 12/2002 | Sachs et al. |
| 5,957,695 A | 9/1999 | Redford et al. | 6,507,342 B1 | 1/2003 | Hirayama |
| 5,957,697 A | 9/1999 | Iggulden et al. | 6,510,531 B1 | 1/2003 | Gibbons |
| 5,959,945 A | 9/1999 | Kleiman | 6,535,505 B1 | 3/2003 | Hwang et al. |
| 5,963,246 A | 10/1999 | Kato | 6,546,016 B1 | 4/2003 | Gerszberg et al. |
| 5,978,841 A | 11/1999 | Berger | 6,556,561 B1 | 4/2003 | Himbeault et al. |

| | | | | | | |
|---|---|---|---|---|---|---|
| 6,557,173 B1 | 4/2003 | Hendricks | | EP | 0355697 | 2/1990 |
| 6,585,776 B1 | 7/2003 | Bates et al. | | EP | 0377334 | 7/1990 |
| 6,597,314 B1 | 7/2003 | Beezer | | EP | 0384986 | 9/1990 |
| 6,606,603 B1 | 8/2003 | Joseph | | EP | 0396186 | 11/1990 |
| 6,611,531 B1 | 8/2003 | Chen et al. | | EP | 0399200 | 11/1990 |
| 6,634,028 B2 | 10/2003 | Handelman | | EP | 0402 809 | 12/1990 |
| 6,639,225 B2 | 10/2003 | Kirschtein et al. | | EP | 0402809 | 12/1990 |
| 6,654,754 B1 | 11/2003 | Knauft et al. | | EP | 0420 123 | 4/1991 |
| 6,657,654 B2 | 12/2003 | Narayanaswami | | EP | 0420123 | 4/1991 |
| 6,675,384 B1 | 1/2004 | Block et al. | | EP | 0420123 A2 | 4/1991 |
| 6,683,631 B2 | 1/2004 | Carroll | | EP | 0424 648 | 5/1991 |
| 6,714,238 B2 | 3/2004 | Urisaka et al. | | EP | 0425 834 | 5/1991 |
| 6,725,203 B1 | 4/2004 | Seet et al. | | EP | 0187961 | 5/1991 |
| 6,813,249 B1 | 11/2004 | Lauffenburger et al. | | EP | 0424648 | 5/1991 |
| 6,847,403 B1 | 1/2005 | Forsberg, Jr. et al. | | EP | 0425834 | 5/1991 |
| 6,886,000 B1 | 4/2005 | Aggarwal et al. | | EP | 0450841 | 10/1991 |
| 6,891,551 B2 | 5/2005 | Keeley et al. | | EP | 0472070 | 2/1992 |
| 6,976,028 B2 | 12/2005 | Fenton | | EP | 0472070 A2 | 2/1992 |
| 6,990,464 B1 | 1/2006 | Pirillo | | EP | 0506 435 | 9/1992 |
| 7,020,663 B2 | 3/2006 | Hay | | EP | 0506435 | 9/1992 |
| 7,039,643 B2 | 5/2006 | Sena et al. | | EP | 0513 763 | 11/1992 |
| 7,051,351 B2 | 5/2006 | Goldman et al. | | EP | 0513763 | 11/1992 |
| 7,181,468 B2 | 2/2007 | Spring | | EP | 0516533 | 12/1992 |
| 7,181,692 B2 | 2/2007 | Siegel | | EP | 0539106 | 4/1993 |
| 7,185,274 B1 | 2/2007 | Rubin et al. | | EP | 0539106 A2 | 4/1993 |
| 7,350,704 B2 | 4/2008 | Barsness | | EP | 0567800 | 11/1993 |
| 7,401,286 B1 | 7/2008 | Hendricks et al. | | EP | 0570785 | 11/1993 |
| 2002/0034296 A1 | 3/2002 | Yoshimune | | EP | 09322877 | 11/1993 |
| 2002/0087555 A1 | 7/2002 | Murata | | EP | 0586954 | 3/1994 |
| 2002/0120635 A1 | 8/2002 | Joao | | EP | 0620689 | 10/1994 |
| 2003/0018543 A1 | 1/2003 | Alger et al. | | EP | 0646856 | 4/1995 |
| 2003/0093336 A1 | 5/2003 | Ukita et al. | | EP | 0690426 | 1/1996 |
| 2003/0093382 A1 | 5/2003 | Himeno et al. | | EP | 0702491 | 3/1996 |
| 2003/0124502 A1 | 7/2003 | Chou | | EP | 0372384 | 5/1997 |
| 2003/0198932 A1 | 10/2003 | Stuppy | | EP | 0810534 A | 12/1997 |
| 2003/0200145 A1 | 10/2003 | Krassner et al. | | EP | 0810534 A | 12/1997 |
| 2003/0236836 A1 | 12/2003 | Borthwick | | EP | 0810534 A2 | 12/1997 |
| 2004/0039934 A1 | 2/2004 | Land et al. | | EP | 0838798 | 4/1998 |
| 2004/0201609 A1 | 10/2004 | Obrador | | EP | 0838798 A1 | 4/1998 |
| 2004/0215658 A1 | 10/2004 | Carnegie et al. | | EP | 0892388 | 1/1999 |
| 2004/0219494 A1 | 11/2004 | Boon | | EP | 0924629 A | 6/1999 |
| 2004/0268224 A1 | 12/2004 | Balkus et al. | | EP | 0924687 | 6/1999 |
| 2005/0144133 A1 | 6/2005 | Hoffman et al. | | EP | 0701220 | 7/2001 |
| 2006/0204942 A1 | 9/2006 | Kimball | | EP | 0726535 | 5/2003 |
| 2006/0259239 A1 | 11/2006 | Nouri | | GB | 1204190 | 12/1967 |
| 2007/0016657 A1 | 1/2007 | Ito | | GB | 1204190 | 9/1970 |
| 2008/0229182 A1 | 9/2008 | Hendricks et al. | | GB | 2149544 | 6/1985 |
| 2009/0216623 A1 | 8/2009 | Hendricks et al. | | GB | 2149544 A | 12/1985 |
| | | | | GB | 2168227 | 6/1986 |
| FOREIGN PATENT DOCUMENTS | | | | GB | 2 177 873 A | 1/1987 |
| | | | | GB | 2269302 A | 2/1994 |
| CA | 2257659 | 11/1993 | | GB | 2344009 | 5/2000 |
| CA | 2177154 | 6/1995 | | JP | 060-143086 | 7/1985 |
| CA | 2458564 | 6/1995 | | JP | 61-028150 | 2/1986 |
| CA | 2256591 | 11/1997 | | JP | 061060150 | 3/1986 |
| DE | 3423846 | 1/1986 | | JP | 061060150 | 8/1986 |
| DE | 3935294 | 4/1991 | | JP | 62-24777 | 2/1987 |
| DE | 4212184 | 10/1993 | | JP | 062-24777 | 2/1987 |
| EP | 0103438 | 3/1984 | | JP | 62-140134 | 6/1987 |
| EP | 140302 | 5/1985 | | JP | 062-245167 | 10/1987 |
| EP | 0145063 | 6/1985 | | JP | 62-245167 | 10/1987 |
| EP | 0149536 | 7/1985 | | JP | 64-086778 | 3/1989 |
| EP | 0158548 | 10/1985 | | JP | 0186778 | 3/1989 |
| EP | 0158767 | 10/1985 | | JP | 01-130683 | 5/1989 |
| EP | 0167237 | 1/1986 | | JP | 01130683 | 5/1989 |
| EP | 0243312 | 10/1987 | | JP | 01-142918 | 6/1989 |
| EP | 0277014 | 8/1988 | | JP | 064-007786 | 11/1989 |
| EP | 0281293 | 9/1988 | | JP | 64-007786 | 11/1989 |
| EP | 0299830 | 1/1989 | | JP | 02-284571 | 11/1990 |
| EP | 0299830 A1 | 1/1989 | | JP | 03-114375 | 5/1991 |
| EP | 0314572 | 5/1989 | | JP | 03-198119 | 8/1991 |
| EP | 0328440 | 8/1989 | | JP | 03225445 | 10/1991 |
| EP | 0340643 | 11/1989 | | JP | 04-170183 | 6/1992 |

| | | | | | |
|---|---|---|---|---|---|
| JP | 05-046045 | 2/1993 | WO | WO 93/22877 | 11/1993 |
| JP | 05056405 | 3/1993 | WO | WO 94/01964 | 1/1994 |
| JP | 05-046045 | 5/1993 | WO | WO 94/07327 A1 | 3/1994 |
| JP | 05-236437 | 9/1993 | WO | WO 94/13107 | 6/1994 |
| JP | 05233547 | 9/1993 | WO | WO 94/14282 | 6/1994 |
| JP | 05236437 | 9/1993 | WO | WO 94/16527 | 7/1994 |
| JP | 05250106 | 9/1993 | WO | WO94/23537 | 10/1994 |
| JP | 05-334167 A | 12/1993 | WO | WO 95/15649 | 6/1995 |
| JP | 05334167 A | 12/1993 | WO | WO 9515649 A | 6/1995 |
| JP | 06-068339 A | 3/1994 | WO | WO 96/08109 | 3/1996 |
| JP | 06068339 A | 3/1994 | WO | WO 96/17306 | 6/1996 |
| JP | 06134489 | 5/1994 | WO | WO 96/25006 | 8/1996 |
| JP | 06187359 | 7/1994 | WO | WO 96/41473 | 12/1996 |
| JP | 07-230466 A | 8/1995 | WO | WO 97/13368 | 4/1997 |
| JP | 7230466 | 8/1995 | WO | WO 97/18665 | 5/1997 |
| JP | 07-235909 | 9/1995 | WO | WO 97/12105 | 6/1997 |
| JP | 07 235909 | 9/1995 | WO | WO 97/20224 | 6/1997 |
| JP | 08-008850 A | 1/1996 | WO | WO 97/20274 | 6/1997 |
| JP | 08008851 | 1/1996 | WO | WO 97/22049 | 6/1997 |
| JP | 08-051614 A | 2/1996 | WO | WO 97/22062 | 6/1997 |
| JP | 408051614 A | 2/1996 | WO | WO 97/22063 | 6/1997 |
| JP | 08-228328 | 9/1996 | WO | WO 97/22064 | 6/1997 |
| JP | 08314790 | 11/1996 | WO | WO 97/22065 | 6/1997 |
| JP | 08510869 | 11/1996 | WO | WO 97/22067 | 6/1997 |
| JP | 09506225 | 6/1997 | WO | WO 97/22079 | 6/1997 |
| JP | 09227193 | 8/1997 | WO | WO 97/22080 | 6/1997 |
| JP | 09-227193 | 9/1997 | WO | WO 97/22097 | 6/1997 |
| JP | 09237096 | 9/1997 | WO | WO 97/22099 | 6/1997 |
| JP | 09 284571 | 10/1997 | WO | WO 97/22100 | 6/1997 |
| JP | 09-284571 | 10/1997 | WO | WO 97/22101 | 6/1997 |
| JP | 09282218 | 10/1997 | WO | WO 97/22102 | 6/1997 |
| JP | 10070530 | 3/1998 | WO | WO 97/22103 | 6/1997 |
| JP | 10134080 | 5/1998 | WO | WO 97/22104 | 6/1997 |
| JP | 10-285568 A | 10/1998 | WO | WO 97/22105 | 6/1997 |
| JP | 10275186 | 10/1998 | WO | WO 97/22106 | 6/1997 |
| JP | 10301946 | 11/1998 | WO | WO 97/22107 | 6/1997 |
| JP | 10312344 | 11/1998 | WO | WO 97/22108 | 6/1997 |
| JP | 10327397 | 12/1998 | WO | WO 97/22109 | 6/1997 |
| JP | 410285568 A | 12/1998 | WO | WO 97/22110 | 6/1997 |
| JP | 11003341 | 1/1999 | WO | WO 97/22111 | 6/1997 |
| JP | 11-068770 | 3/1999 | WO | WO 97/22112 | 6/1997 |
| JP | 11096175 | 4/1999 | WO | WO 9720274 | 6/1997 |
| JP | 11250145 | 9/1999 | WO | WO 97/12819 | 7/1997 |
| TW | 234223 | 11/1994 | WO | WO 97/23819 | 7/1997 |
| TW | 235358 | 12/1994 | WO | WO 9737344 | 10/1997 |
| TW | 235359 | 12/1994 | WO | WO 97/41688 A1 | 11/1997 |
| TW | 236065 | 12/1994 | WO | WO 97/45798 | 12/1997 |
| TW | 236744 | 12/1994 | WO | WO 98/02836 | 1/1998 |
| TW | 238461 | 8/1995 | WO | WO 98/08344 | 2/1998 |
| WO | WO 80/00209 | 2/1980 | WO | WO 9808344 | 2/1998 |
| WO | WO 83/03020 | 9/1983 | WO | WO 9808344 A | 2/1998 |
| WO | WO 84/00237 | 1/1984 | WO | WO 98/18086 | 4/1998 |
| WO | WO 86/01962 | 3/1986 | WO | WO 9818086 | 4/1998 |
| WO | WO 87/01481 | 3/1987 | WO | WO 9827494 | 6/1998 |
| WO | WO 88/01463 | 2/1988 | WO | WO 98/48566 | 10/1998 |
| WO | WO 8809985 | 12/1988 | WO | WO 98/53581 | 11/1998 |
| WO | WO 89/09528 | 10/1989 | WO | WO 99/12349 | 3/1999 |
| WO | WO 89/12370 | 12/1989 | WO | WO 99/18701 A1 | 4/1999 |
| WO | WO 90/10988 | 9/1990 | WO | WO 99/26415 | 5/1999 |
| WO | WO 9100670 | 1/1991 | WO | WO 99/44144 | 9/1999 |
| WO | WO 91/03112 | 3/1991 | WO | WO 99/45491 | 9/1999 |
| WO | WO 91/11769 | 8/1991 | WO | WO 9944144 A | 9/1999 |
| WO | WO 91/15841 | 10/1991 | WO | WO 99/45491 | 10/1999 |
| WO | WO 92/10040 | 6/1992 | WO | WO 99/52285 | 10/1999 |
| WO | WO 92/11713 | 7/1992 | WO | WO 99/66719 | 12/1999 |
| WO | WO 92/12599 | 7/1992 | WO | WO 00/62228 A3 | 10/2000 |
| WO | WO 92/17027 | 10/1992 | WO | WO 01/18665 A1 | 3/2001 |
| WO | WO 92/21206 | 11/1992 | | | |
| WO | WO 93/06692 | 4/1993 | | | |
| WO | WO 9307713 | 4/1993 | | | |
| WO | WO 93/09490 | 5/1993 | | | |
| WO | WO 93/09631 | 5/1993 | | | |
| WO | WO93/15466 | 8/1993 | | | |

WO  WO 07/022107  2/2007

OTHER PUBLICATIONS

Technology Update, Wordperfect Corporation Introduces Wordperfect 6.0 for DOS, http://www.nfbnet.org/files/word_processing/WP60.TXT, Mar. 24, 1993.*

Caitlin Bestler, "Flexible Data Structures and Interface Rituals for Rapid Development of OSD Applications", Jun. 1993, pp. 223-236.

Alexander Gelman, et al., "An Architecture For Interactive Applications", May 1993, pp. 848-852.

Henrie van den Boom, "An Interactive Videotex System", Nov.-Dec. 1986, pp. 397-401.

Nicole Yankelovich, et al., "Reading and Writing the Electronic Book", Oct. 1985, pp. 16-30.

Craig Boyle, et al., "A Survey and Classification of Hypertext Documentation Systems", Jun. 1992, pp. 98-111.

Thyra Rauch, et al., "Enabling the book metaphor for the World Wide Web: Disseminating on-line information as dynami Web documents", Jun. 1997.

Pasquier-Boltuck, et al., "Prototyping an Interactive Electronic Book System Using an Object-Oriented Approach", Aug. 1988.

Bogdan Czejdo, "Using an ER Query and Update Interface for Rapid Prototyping of Hypertext Systems", Jan. 1990, pp. 227-236.

Michael Bieber, et al., "Fourth Generation Hypermedia: some missing links for the World Wide Web", 1997, pp. 31-65.

Speech Technology; "Electronic Dictionary Pronounces Over 35,000 Words"; 1989; pp. 78-79.

"A Survey and Classification of Hypertext Documentation Systems," Boyle, C. et al.; *IEEE Transactions on Professional Communication*; IEEE Inc.; New York; vol. 35, No. 2; Jun. 1, 1992.

"An Interactive Lesson in the Interactive Course Series" Waite Group Press, MacMillan Computer Publishing, Online! 1996, XP00082591, Retrieved from the Internet: <URL:http//www.waite.com/> retrieved on 1996!.

"An Interactive Lesson in the Interactive Course Series," Waite Group Press, Macmillian Computer Publishing, 'Online! 1996, XP000829591 Retrieved from the Internet: <URL:http://www.waite.com/> retrieved on 1996!.

"Enabling the book metaphor for the World-Wide-Web: disseminating on-line information as dynamic Web documents," Rauch, T. et al.; *IEEE Transactions on Professional Communications*, Jun. 1997; vol. 40, No. 2, pp. 111-128.

"Multimedia Systems," *A Dynamic Policy of Segment Replication for Load-Balancing in Video-On-Demand Servers*; Dan, et al.; Jul. 1995.

"Prototyping an Interactive Electronic Book System Using and Object-oriented Approach," Pasquier-Boltuck, J. et al.; ECOOP; european Conference on Object-oriented Programming; Aug. 15, 1988; pp. 177-190.

Herron T.L., "Teaching with the Internet" Internet and Higher Education, US, JAI Press, Stamford, CT, vol. 1, No. 3, 1998, pp. 217-222, XP002118719, ISSN: 1096-7516.

Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.

Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.

An Interactive Lesson in the Interactive Course Series, Waite Group Press, Macmillan Computer Publishing, 'Online! 1996, XP000829591, Retrieved from the Internet: URL:http://www.waite.com/> 'retrieved in 1996!.

Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.

Hartley, S. et al., "Enhancing Teaching Using the Internet", SIGCSE/SIGCUE Conference on Integrating Technology into Computer Science Education, US, New York, ACM, vol. Conf. 1, Jun. 2, 1996, pp. 218-228, ISBN: 0-89791-844-4.

Seno, H. et al., "A Consideration of Data Transmission Method for Enhanced Teletext", NHK Science and Technical Research Laboratories, ITEJ Technical Report, vol. 16, No. 71, Oct. 1992, Japan, pp. 1-6.

Technology Update, Wordperfect Corporation Introduces Wordperfect 6.0 for DOS, http://www.nfbnet.org/files/word_processing/WP60.TXT, Mar. 24, 1993.

T.V. Raman, "An Audio View of (LA)Tex Documents," Proceedings of the 1191 Annual Meeting, pp. 1001-1008.

Microsoft Press Computer Dictionary Second Edition, Microsoft Press, 1994, p. 418.

"BSD Kernel Interfaces Manual-PTY(4)", Mac OS X Man Pages, original publication, Nov. 30, 1993.

Sandrick, Karen, "Internet marketing: Software for the hard sell," Health Management Technology, Oct. 1998, vol. 19, No. 11, 6 pages.

Antelman et al. "Collection Development in the Electronic Library," Proceedings of the 21rst annual ACM SIGUCCS Conference on User Services, San Diego, CA, p. 50-56, 1993.

Proceedings of the Symnposium on Optical Character Recognition, Washington, D.C., 1962, Edited by Fisher, George, et al., 6 pages.

Rethinking Ink, Science News, Jun. 20, 1998, 4 pages.

Computer Organization and Design, Patterson, David, and John Hennessay, 1998, 4 pages.

Systems, Boyle, C. et al.; *IEEE Transactions on Professional Communication*; IEEE Inc.; New York; vol. 35, No. 2; Jun. 1, 1992, pp. 98-111.

"An Interactive Lesson in the Interactive Course Series" Waite Group Press, MacMillan Computer Publishing, Online! 1996, XP00082591, Retrieved from the Internet: <URL:http//www.waite.com/> retrieved in 1996.

"Electronic Dictionary Pronounces over 83,000 Words," Goorfin, L., *Speech Technology*; Man-Machine Voice Communications, U.S., Media Dimensions Inc.; New York, vol. 4, No. 4; Apr. 1, 1989, pp. 78-79.

"Enabling the book metaphor for the World-Wide-Web: disseminating on-line information as dynamic Web documents," Rauch, T. et al.; *IEEE Transactions on Professional Communications*, Jun. 1997; vol. 40, No. 2, pp. 111-128.

"Fourth generation hypermedia: some missing links for the World Wide Web," Bieber, M. et al., *International Journal of Human-Computer Studies*; U.S.; Academic Press: New York; vol. 47, No. 1; Jul. 1997; pp. 31-65.

"*A Dynamic Policy of Segment Replication for Load-Balancing in Video-On-Demand Servers*," Dan, A. et al.; Multimedia Systems, vol. 3, No. 3, Jul. 1995, pp. 93-103.

"Prototyping an Interactive Electronic Book System Using an Object-oriented Approach," Pasquier-Boltuck, J. et al.; *ECOOP*; European Conference on Object-oriented Programming; Aug. 15, 1988; pp. 177-190.

"Reading and Writing the Electronic Book," Yankelovich, N. et al., *Computer*; U.S. IEEE Computer Society, Long Beach, Calif., U.S. vol. 18, No. 10, Oct. 1, 1985, pp. 15-30.

"Subscription Teletext for Value Added Services", Dr. G.T. Sharpless, IEEE Transactions on Consumer Electronics, Aug. 1985, vol. CE-31, No. 3, pp. 283-289.

"The Internet bookstore opens for business", Medford: Jul./Aug. 1994. vol. 11, Iss. 4; p. 21 (1 page).

"Using an ER Query and Update Interface for Rapid Prototyping of Hypertext Systems," Czejdo, B.; Proceedings of the Annual Hawaii International Conference on System Sciences; Jan. 1, 1990, pp. 227-236.

"A Store-and-Forward Architecture for Video-on-Demand Service," Gelman, A.D. et al., ICC Conference, 1991, pp. 842-846.

Dinaro, M. et al., "Markets and Products Overview," Revue HF Tijdschrift, 1991, vol. 15, No. 3/4, pp. 135-148.

Alexander Gelman, et al., "An Architecture for Interactive Applications", May 1993, pp. 848-852.

Boom, H., "An Interactive Videotex System for Two-Way CATV Networks," 1986, vol. 40, No. 6, pp. 397-401.

"*Applied Cryptography Protocols, Algorithms, and Source Code in C*,"Schneier, Bruce; 1996 by John Wiley & Sons, pp. 34-44.

Azuma J., "Creating Educational Web Sites", IEE Communications Magazine, U.S. IEEE Service Center, Piscataway, N.J., vol. 37, No. 3, Mar. 1999 (1999-2003), pp. 109-113.
Barnes, 10 Minute Guide to Windows 3.1., Alpha Books, 1992, pp. 60-64.
Basch, Reva, "Books Online: Visions, Plans, and Perspectives for Electronic Text", Online, Medford: Jul. 1991, vol. 15, Iss. 4; pp. 13-23.
Bestler, C., "Flexible Data Structure and Interface Rituals for Rapid Development of OSD Applications", NCTA Technical Papers, pp. 223-236, Jun. 1993.
Broering, N. C., "The Electronic Library and IAIMS at Georgetown University", Policy Issues in Information and Communication Techniques in Medical Applications, 1988. Symposium Record, Sep. 29-30, 1988, pp. 27-29.
Chan, L. M., "Principles, Structure and Format", Immroth's Guide to the Library-of Congress Classification, 4th Edition, 1990, Chapter 2, pp. 19-51.
Consumer Digest advertisement; "Xpand Your TV's Channel Capability;" Fall/Winter 1992; p. 215.
Daniel M. Moloney, "Digital Compression in Today's Addressable Environment;" 1993 NCTA Technical Papers; Jun. 6, 1993; pp. 308-316.
DeBuse, R., "So That's a Book . . . Advancing Technology and the Library," Mar. 1988, Information Technology and Libraries, vol. 7, Issue 1, pp. 7-18.
Endo, K. et al., "Electronic Book in 3.5" Floppy Disk, Consumer Electronics, Digest of Technical Papers, IEEE 1994 International Conference on Jun. 21-23, 1994 pp. 316-317.
Fox E. A., et al., "Users, user interfaces, and objects: Envision, a Digital Library," Sep. 1993, Journal of the American Society for Information Science, vol. 44, issue 8, p. 480-491.
Schepers, C., "Für Geschlossene Benutzergruppen" Funkschau, De, Franzis-Verlag K.G. Munchen, No. 18, Aug. 25, 1989, pp. S53-S54.
Goldberg M W et al: "World Wide Web—course tool: An environment for building www-based courses," Computer Networks and ISDN Systems, NL, North Holland Publishing. Amsterdam, vol. 28, No. 11, May 1, 1996.
Great Presentations advertisement; "Remote, Remote;" 1987; p. 32H.
Hartley S et al.: "Enhancing Teaching Using the Internet" SIGCSE/SIGCUE Conference on Integrating Technology into Computer Science Education, US, New York, ACM, vol. Conf. 1, 2 Jun. 1996, pp. 218-228.
Herron T L: "Teaching with the Internet" Internet and Higher Education, US, JAI Press, Stamford, CT, vol. 1, No. 3, 1998, pp. 217-222.
Hong Kong Enterprise; Advertisement, "Two Innovative New Consumer Products From SVI," Nov. 1988, p. 379.
HP-41 C Operating Manual—A Guide for the Experienced User, Hewlett Packard Co., Jun. 1980.
"Applying Interactive Voice Response Technology in Psychiatric Practice", Sorce J. F. et al., Human Factors in Telecommunications; R. V. Decker's Verlag, Heidelberg, Germany, pp. 397-407.
Indian Patent Application 762-Cal-93.
Indian Patent Application 765-Cal-93.
Intner, S. S. et al., "The Dewey Decimal Classification", Special Libraries: A Cataloging Guide, 1998, Chapter 11, pp. 211-239.
John Reimer, "Memories in My Pocket;" BYTE; Feb. 1991; pp. 251-258.
Kubota H. et al.: "Terrestrial Data Multiplex Broadcasting News Delivery System and Its Terminal", IEE Transactions on Consumer Electronics, U.S., IEE Inc., New York, vol. 43, No. 3, Aug. 1, 1997, pp. 504-509.
Lewis, B.T. et al.; "Shared books: collaborative publication management for an office information system"; ACM SIGIOS Bulletin Conference sponsored by ACM SIGIOS and IEEECS TC-OA on Office information systems, vol. 9, Issue 2-3, Apr. 1988, pp. 197-204.
Mann et al.; "A coherent distributed file cache with directory write-behind" ACM Transactions on Computer Systems (TCOS), vol. 12, Issue 2, May 1994.
Miyazawa, M. et al., "An electronic book: APT Book," Aug. 1990, Human-Computer Interaction, Interact '90, Proceedings of the IFIP TC 13 Third International Conference, Cambridge, UK, pp. 513-519.
O'Gorman, L., "Image and document processing techniques for the RightPages electronic library system", Conference B: Pattern Recognition Methodology and Systems, Proceedings, 11th IAP International Conference on Aug. 30-Sep. 3, 1992 pp. 260-263.
Olshansky R. et al., "Subscriber Distribution Networks Using Compressed Digital Video;" Journal of Lightwave Technology; Nov. 1992; vol. 10, No. 11, pp. 1760-1765.
Pobiak, B.C., "Adjustable access electronic books", Computing Applications to Assist Persons with Disabilities, 1992, Proceedings of the John Hopkins National Search for Feb. 1-5, 1992 pp. 90-94.
Raman, T.V., "Audio System for Technical Readings," May 1994, Cornell University, pp. 1-129.
Rawlins, "The New Publishing—Technology's impact on the publishing industry over the next decade", Nov. 12, 1991, pp. 1-65.
Schatz, "Building an electronic scientific community", System Sciences, 1991. Proceeding of the Twenty-Fourth Annual Hawaii International Conference on vol. iii, Jan. 8-11, 1991 pp. 739-748 vol. 3.
Simpson, Alan, Mastering Wordperfect® 5.1 & 5.2 for Windows, 1993, Sybex, Inc., pp. 72-73.
Soloview; "Prefetching in segmented disk cache for multi-disk systems" Proceedings of the fourth workshop on I/O in parallel and distributed systems: part of the federated computing research conference; May 1996.
Valauskas, Edward J, "Electronic books as databases", Database, Aug 1993. vol. 16, Iss. 4; p. 84-86.
Office Action dated Sep. 24, 1996, U.S. Appl. No. 29/030,157.
Office Action dated Sep. 8, 2009, U.S. Appl. No. 12/010,045.
Office Action dated Sep. 4, 2009, U.S. Appl. No. 09/964,883.
Office Action dated Feb. 17, 2009, U.S. Appl. No. 09/964,883.
Office Action dated Sep. 17, 2008, U.S. Appl. No.09/964,883.
Office Action dated Feb. 6, 2008, U.S. Appl. No. 09/964,883.
Office Action dated Jun. 22, 2007, U.S. Appl. No. 09/964,883.
Office Action dated Jan. 3, 2007, U.S. Appl. No. 09/964,883.
Office Action dated Jul. 12, 2006, U.S. Appl. No. 09/964,883.
Office Action dated Feb. 2, 2006, U.S. Appl. No. 09/964,883.
Office Action dated Jun. 15, 2005, U.S. Appl. No. 09/964,883.
Office Action dated Sep. 27, 2004, U.S. Appl. No. 09/964,883.
Office Action dated Aug. 10, 2007, U.S. Appl. No. 09/964,882.
Office Action dated May 22, 2006, U.S. Appl. No. 09/964,882.
Office Action dated Dec. 2, 2005, U.S. Appl. No. 09/964,882.
Office Action dated Mar. 22, 2005, U.S. Appl. No. 09/964,882.
Office Action dated Jul. 22, 2005, U.S. Appl. No. 09/964,880.
Office Action dated Jan. 12, 2005, U.S. Appl. No. 09/964,880.
Office Action dated May 9, 2005, U.S. Appl. No. 09/964,857.
Office Action dated Jul. 7, 2004, U.S. Appl. No. 09/964,857.
Office Action dated Feb. 8, 2006, U.S. Appl. No. 09/723,282,.
Office Action dated Aug. 17, 2005, U.S. Appl. No. 09/723,282.
Office Action dated Jun. 3, 2004, U.S. Appl. No. 09/723,282.
Office Action dated May 19, 2005, U.S. Appl. No. 09/723,280.
Office Action dated Jun. 7, 2004, U.S. Appl. No. 09/723,280.
Office Action dated Aug. 24, 2005, U.S. Appl. No. 09/722,823.
Office Action dated Jan. 4, 2005, U.S. Appl. No. 09/722,823.
Office Action dated Jul. 18, 2002, U.S. Appl. No. 09/722,743.
Office Action dated Jan. 16, 2002, U.S. Appl. No. 09/722,744.
Office Action dated Oct. 5, 2005, U.S. Appl. No. 09/722,743.
Office Action dated Dec. 16, 2004, U.S. Appl. No. 09/722,743.
Office Action dated Jan. 11, 2008, U.S. Appl. No. 09/722,742.
Office Action dated May 29, 2007, U.S. Appl. No. 09/722,742.
Office Action dated Oct. 2, 2006, U.S. Appl. No. 09/722,742.
Office Action dated Apr. 13, 2006, U.S. Appl. No. 09/722,742.
Office Action dated Oct. 7, 2003, U.S. Appl. No. 09/722,742.
Office Action dated Mar. 24, 2005, U.S. Appl. No. 09/722,741.
Office Action dated Jun. 28, 2004, U.S. Appl. No. 09/722,741.
Office Action dated Aug. 24, 2005, U.S. Appl. No. 09/722,740.
Office Action dated May 24, 2004, U.S. Appl. No. 09/722,740.
Office Action dated Apr. 10, 2009, U.S. Appl. No. 09/722,626.
Office Action dated Dec. 5, 2008, U.S. Appl. No. 09/722,626.
Office Action dated Jun. 9, 2008, U.S. Appl. No. 09/722,626.
Office Action dated Oct. 30, 2007, U.S. Appl. No. 09/722,626.
Office Action dated May 8, 2007, U.S. Appl. No. 09/722,626.
Office Action dated Aug. 1, 2006, U.S. Appl. No. 09/722,626.
Office Action dated Feb. 22, 2006, U.S. Appl. No. 09/722,626.
Office Action dated Jun. 20, 2005, U.S. Appl. No. 09/722,626.

Office Action dated Dec. 20, 2006, U.S. Appl. No. 09/722,519.
Office Action dated Aug. 15, 2006, U.S. Appl. No. 09/722,519.
Office Action dated Mar. 15, 2006, U.S. Appl. No. 09/722,519.
Office Action dated Nov. 22, 2005, U.S. Appl. No. 09/722,519.
Office Action dated Apr. 14, 2005, U.S. Appl. No. 09/722,519.
Office Action dated Aug. 10, 2004, U.S. Appl. No. 09/722,519.
Office Action dated Jan. 18, 2006, U.S. Appl. No. 09/722,463.
Office Action dated Jul. 27, 2005, U.S. Appl. No. 09/722,463.
Office Action dated Jan. 12, 2005, U.S. Appl. No. 09/722,463.
Office Action dated Jun. 6, 2005, U.S. Appl. No. 09/722,462.
Office Action dated Jun. 4, 2004, U.S. Appl. No. 09/722,462.
Office Action dated May 17, 2005, U.S. Appl. No. 09/722,460.
Office Action dated Jun. 18, 2004, U.S. Appl. No. 09/722,460.
Office Action dated Feb. 9, 2007, U.S. Appl. No. 09/722,456.
Office Action dated Aug. 11, 2006, U.S. Appl. No. 09/722,4562.
Office Action dated Feb. 23, 2006, U.S. Appl. No. 09/722,456.
Office Action dated May 5, 2005, U.S. Appl. No. 09/722,456.
Office Action dated Jun. 16, 2004, U.S. Appl. No. 09/722,456.
Office Action dated Jul. 30, 2009, U.S. Appl. No. 09/539,773.
Office Action dated Jun. 24, 2009, U.S. Appl. No. 09/539,773.
Office Action dated Feb. 25, 2009, U.S. Appl. No. 09/539,773.
Office Action dated Aug. 25, 2008, U.S. Appl. No. 09/539,773.
Office Action dated Nov. 29, 2007, U.S. Appl. No. 09/539,773.
Office Action dated Nov. 24, 2006, U.S. Appl. No. 09/539,773.
Office Action dated Aug. 2, 2006, U.S. Appl. No. 09/539,773.
Office Action dated Apr. 4, 2006, U.S. Appl. No. 09/539,773.
Office Action dated Jun. 15, 2005, U.S. Appl. No. 09/539,773.
Office Action dated Jun. 22, 2004, U.S. Appl. No. 09/539,773.
Office Action dated Apr. 6, 2009, U.S. Appl. No. 09/520,344.
Office Action dated Oct. 23, 2008, U.S. Appl. No. 09/520,344.
Office Action dated Jun. 13, 2008, U.S. Appl. No. 09/520,344.
Office Action dated Dec. 26, 2007, U.S. Appl. No. 09/520,344.
Office Action dated Aug. 3, 2007, U.S. Appl. No. 09/520,344.
Office Action dated Jun. 23, 2005, U.S. Appl. No. 09/520,344.
Office Action dated Nov. 12, 2008, U.S. Appl. No. 09/441,892.
Office Action dated Apr. 29, 2008, U.S. Appl. No. 09/441,892.
Office Action dated Nov. 2, 2007, U.S. Appl. No. 09/441,892.
Office Action dated Jun. 18, 2007, U.S. Appl. No. 09/441,892.
Office Action dated Nov. 24, 2006, U.S. Appl. No. 09/441,892.
Office Action dated Feb. 3, 2006, U.S. Appl. No. 09/441,892.
Office Action dated May 17, 2005, U.S. Appl. No. 09/441,892.
Office Action dated Aug. 24, 2004, U.S. Appl. No. 09/441,892.
Office Action dated Jun. 19, 2009, U.S. Appl. No. 09/427,939.
Office Action dated Aug. 16, 2007, U.S. Appl. No. 09/427,939.
Office Action dated Mar. 29, 2007, U.S. Appl. No. 09/427,939.
Office Action dated Jun. 7, 2006, U.S. Appl. No. 09/427,939.
Office Action dated May 20, 2005, U.S. Appl. No. 09/427,939.
Office Action dated May 28, 2009, U.S. Appl. No. 09/427,938.
Office Action dated Dec. 3, 2008, U.S. Appl. No. 09/427,938.
Office Action dated Apr. 18, 2008, U.S. Appl. No. 09/427,938.
Office Action dated Oct. 19, 2007, U.S. Appl. No. 09/427,938.
Office Action dated Jun. 15, 2007, U.S. Appl. No. 09/427,938.
Office Action dated Jan. 31, 2007, U.S. Appl. No. 09/427,938.
Office Action dated Jun. 7, 2006, U.S. Appl. No. 09/427,938.
Office Action dated Apr. 25, 2005, U.S. Appl. No. 09/427,938.
Office Action dated Dec. 30, 2005, U.S. Appl. No. 09/400,296.
Office Action dated Apr. 8, 2005, U.S. Appl. No. 09/400,296.
Office Action dated Jun. 25, 2009, U.S. Appl. No. 09/391,461.
Office Action dated Jan. 7, 2009, U.S. Appl. No. 09/391,461.
Office Action dated Jul. 3, 2008, U.S. Appl. No. 09/391,461.
Office Action dated Dec. 13, 2007, U.S. Appl. No. 09/391,461.
Office Action dated Jun. 22, 2007, U.S. Appl. No. 09/391,461.
Office Action dated Nov. 17, 2006, U.S. Appl. No. 09/391,461.
Office Action dated Mar. 28, 2006, U.S. Appl. No. 09/391,461.
Office Action dated Jun. 15, 2005, U.S. Appl. No. 09/391,461.
Office Action dated Jun. 30, 2004, U.S. Appl. No. 09/391,461.
Office Action dated Aug. 10, 2009, U.S. Appl. No. 09/344,499.
Office Action dated Feb. 18, 2009, U.S. Appl. No. 09/344,499.
Office Action dated Feb. 8, 2008, U.S. Appl. No. 09/344,499.
Office Action dated Jun. 14, 2007, U.S. Appl. No. 09/344,499.
Office Action dated Dec. 15, 2006, U.S. Appl. No. 09/344,499.
Office Action dated Jun. 30, 2006, U.S. Appl. No. 09/344,499.
Office Action dated May 6, 2005, U.S. Appl. No. 09/344,499.
Office Action dated Jul. 13, 2009, U.S. Appl. No. 09/344,492.
Office Action dated Jan. 23, 2009, U.S. Appl. No. 09/344,492.
Office Action dated Aug. 5, 2008, U.S. Appl. No. 09/344,492.
Office Action dated Jan. 23, 2008, U.S. Appl. No. 09/344,492.
Office Action dated Jul. 11, 2007, U.S. Appl. No. 09/344,492.
Office Action dated Dec. 19, 2006, U.S. Appl. No. 09/344,492.
Office Action dated Jun. 26, 2006, U.S. Appl. No. 09/344,492.
Office Action dated Jan. 24, 2006, U.S. Appl. No. 09/344,492.
Office Action dated Jun. 6, 2005, U.S. Appl. No. 09/344,492.
Office Action dated Jan. 22, 2009, U.S. Appl. No. 09/335,268.
Office Action dated Jul. 9, 2008, U.S. Appl. No. 09/335,268.
Office Action dated Jan. 10, 2008, U.S. Appl. No. 09/335,268.
Office Action dated May 17, 2007, U.S. Appl. No. 09/335,268.
Office Action dated Oct. 2, 2006, U.S. Appl. No. 09/335,268.
Office Action dated Apr. 13, 2006, U.S. Appl. No. 09/335,268.
Office Action dated Oct. 28, 2005, U.S. Appl. No. 09/335,268.
Office Action dated Feb. 24, 2005, U.S. Appl. No. 09/335,268.
Office Action dated Feb. 19, 2009, U.S. Appl. No. 09/328,672.
Office Action dated Jun. 16, 2004, U.S. Appl. No. 09/328,672.
Office Action dated Jul. 7, 2009, U.S. Appl. No. 09/289,958.
Office Action dated Dec. 24, 2008, U.S. Appl. No. 09/289,958.
Office Action dated Jul. 29, 2008, U.S. Appl. No. 09/289,958.
Office Action dated Jan. 18, 2008, U.S. Appl. No. 09/289,958.
Office Action dated Jul. 31, 2007, U.S. Appl. No. 09/289,958.
Office Action dated Mar. 23, 2007, U.S. Appl. No. 09/289,958.
Office Action dated Jun. 6, 2006, U.S. Appl. No. 09/289,958.
Office Action dated Jan. 3, 2005, U.S. Appl. No. 09/289,958.
Office Action dated Jul. 22, 2009, U.S. Appl. No. 09/289,957.
Office Action dated Nov. 18, 2008, U.S. Appl. No. 09/289,957.
Office Action dated Mar. 25, 2008, U.S. Appl. No. 09/289,957.
Office Action dated Jul. 6, 2007, U.S. Appl. No. 09/289,957.
Office Action dated Oct. 11, 2006, U.S. Appl. No. 09/289,957.
Office Action dated Apr. 21, 2006, U.S. Appl. No. 09/289,957.
Office Action dated Nov. 3, 2005, U.S. Appl. No. 09/289,957.
Office Action dated Nov. 4, 2004, U.S. Appl. No. 09/289,957.
Office Action dated Sep. 9, 2009, U.S. Appl. No. 09/289,956.
Office Action dated Mar. 17, 2009, U.S. Appl. No. 09/289,956.
Office Action dated Nov. 13, 2008, U.S. Appl. No. 09/289,956.
Office Action dated Jun. 12, 2008, U.S. Appl. No. 09/289,956.
Office Action dated Mar. 22, 2007, U.S. Appl. No. 09/289,956.
Office Action dated Jul. 24, 2006, U.S. Appl. No. 09/289,956.
Office Action dated Jan. 30, 2006, U.S. Appl. No. 09/289,956.
Office Action dated Jun. 23, 2005, U.S. Appl. No. 09/289,956.
Office Action dated Oct. 3, 2007, U.S. Appl. No. 09/237,828.
Office Action dated Mar. 5, 2007, U.S. Appl. No. 09/237,828.
Office Action dated Sep. 8, 2006, U.S. Appl. No. 09/237,828.
Office Action dated May 12, 2005, U.S. Appl. No. 09/237,828.
Office Action dated Aug. 25, 2004, U.S. Appl. No. 09/237,828.
Office Action dated Aug. 28, 2009, U.S. Appl. No. 09/237,827.
Office Action dated Mar. 2, 2009, U.S. Appl. No. 09/237,827.
Office Action dated Aug. 18, 2008, U.S. Appl. No. 09/237,827.
Office Action dated Jan. 9, 2008, U.S. Appl. No. 09/237,827.
Office Action dated Jul. 23, 2007, U.S. Appl. No. 09/237,827.
Office Action dated May 16, 2007, U.S. Appl. No. 09/237,827.
Office Action dated Jan. 12, 2007, U.S. Appl. No. 09/237,827.
Office Action dated Aug. 2, 2006, U.S. Appl. No. 09/237,827.
Office Action dated Oct. 19, 2005, U.S. Appl. No. 09/237,827.
Office Action dated Jan. 26, 2005, U.S. Appl. No. 09/237,827.
Office Action dated Aug. 3, 2009, U.S. Appl. No. 09/237,826.
Office Action dated Feb. 13, 2009, U.S. Appl. No. 09/237,826.
Office Action dated Aug. 15, 2008, U.S. Appl. No. 09/237,826.
Office Action dated Dec. 7, 2007, U.S. Appl. No. 09/237,826.
Office Action dated Jun. 27, 2007, U.S. Appl. No. 09/237,826.
Office Action dated Dec. 19, 2006, U.S. Appl. No. 09/237,825.
Office Action dated Jun. 14, 2006, U.S. Appl. No. 09/237,826.
Office Action dated Dec. 6, 2005, U.S. Appl. No. 09/237,826.
Office Action dated Jun. 6, 2005, U.S. Appl. No. 09/237,826.
Office Action dated May 25, 2004, U.S. Appl. No. 09/237,826.
Office Action dated Jun. 15, 2005, U.S. Appl. No. 09/237,825.
Office Action dated Jun. 4, 2004, U.S. Appl. No. 09/237,825.
Office Action dated May 12, 1998, U.S. Appl. No. 08/336,247.
Office Action dated Jul. 24, 1997, U.S. Appl. No. 08/336,247.
Office Action dated Apr. 29, 1997, U.S. Appl. No. 08/336,247.

Office Action dated Aug. 28, 1996, U.S. Appl. No. 08/336,247.
Office Action dated Jun. 27, 1996, U.S. Appl. No. 08/336,247.
Office Action dated Nov. 1, 1995, U.S. Appl. No. 08/336,247.
IPER dated Mar. 6, 1996 for PCT/US94/13808.
Written Opinion dated Nov. 16, 1995 for PCT/US94/13808.
ISR dated Apr. 5, 1995 for PCT/US94/13808.
ISR dated Feb. 21, 2002 for PCT/US01/10559.
IPER dated Apr. 11, 2002 for PCT/US01/04946.
Written Opinion dated Dec. 4, 2001 for PCT/US01/04946.
ISR dated Oct. 16, 2001 for PCT/US01/04946.
Partial ISR dated Nov. 18, 2002 for PCT/US00/29813.
IPER dated Oct. 18, 2001 for PCT/US/09542.
Written Opinion dated Jun. 19, 2001 for PCT/US00/01708.
ISR dated Jun. 26, 2000 for PCT/US00/01708.
Office Action dated May 8, 1998, 95904787.9, EP.
Office Action dated Dec. 7, 2004, 515760/95, JP.
Office Action dated Apr. 13, 2004, 515760/95, JP.
Office Action dated Jan. 30, 2009, 2459780, CA.
Office Action dated Nov. 16, 2007, 2459780, CA.
Office Action dated Jan. 30, 2009, 2459779, CA.
Office Action dated Nov. 21, 2007, 2459779, CA.
Office Action dated Jun. 18, 2007, 2459529, CA.
Office Action dated Oct. 20, 2004, 2459528, CA.
Office Action dated May 1, 2008, 2459063, CA.
Office Action dated Dec. 13, 2006, 2459063, CA.
Office Action dated Mar. 10, 2006, 2459063, CA.
Office Action dated Apr. 22, 2009, 2459059, CA.
Office Action dated Mar. 28, 2008, 2459059, CA.
Office Action dated May 17, 2007, 2459059, CA.
Office Action dated Jun. 26, 2007, 2459048, CA.
Office Action dated Oct. 4, 2006, 2459048, CA.
Office Action dated Dec. 20, 2004, 2458564, CA.
Office Action dated May 14, 2004, 2458564, CA.
Office Action dated Jun. 21, 2007, 2458379, CA.
Office Action dated Nov. 5, 2007, 2458355, CA.
Office Action dated Nov. 10, 2006, 2458355, CA.
Office Action dated Nov. 25, 2005, 2458355, CA.
Office Action dated Apr. 12, 2005, 2458346, CA.
Office Action dated May 12, 2004, 2458346, CA.
Office Action dated Jan. 24, 2007, 2458337, CA.
Office Action dated Dec. 28, 2005, 2458337, CA.
Office Action dated Dec. 6, 2004, 2458337, CA.
Office Action dated May 6, 2008, 2458317, CA.
Office Action dated Nov. 10, 2006, 2458317, CA.
Office Action dated Mar. 13, 2006, 2458317, CA.
Office Action dated Feb. 16, 2009, 2458307, CA.
Office Action dated Oct. 31, 2007, 2458307, CA.
Office Action dated Oct. 3, 2006, 2458258, CA.
ISR dated Feb. 4, 2003 for PCTUS00/29813, 2388649, CA.
IPER dated Jan. 25, 2002 for PCTUS00/29813, 2388649, CA.
Written Opinion dated Sep. 5, 2001 for PCTUS00/29813, 2388649, CA.
ISR dated Feb. 21, 2003 for PCT/US00/29809, 2388648, CA.
IPER dated Feb. 11, 2002 for PCT/US00/29809, 2388648, CA.
Written Opinion dated Sep. 5, 2001 for PCT/US00/29809, 2388648, CA.
Office Action dated Feb. 12, 2009, 2385097, CA.
IPER dated Mar. 25, 2002 for PCT/US00/25826, 2385097, CA.
Written Opinion dated Nov. 2, 2001 for PCT/US00/25826, 2385097, CA.
ISR dated Jun. 22, 2001 for PCT/US00/25826, 2385097, CA.
Written Opinion dated May 29, 2001 for PCT/US00/09542, 2371379, CA.
ISR dated Nov. 2, 2000 for PCT/US00/09542, 2371379, CA
Office Action dated Apr. 30, 2009, 2369779, CA.
ISR dated Nov. 2, 2000 for PCT/US00/09541, 2369759, CA.
Office Action dated Apr. 9, 2009, 2361371, CA.
Office Action dated Oct. 17, 2007, 2361371, CA.
Office Action dated Jul. 6, 2006, 2361371, CA.
Office Action dated Sep. 10, 2008, 2359690, CA.
Office Action dated Mar. 29, 2007, 2002/002984, MX.
Office Action dated Sep. 11, 2008, 2002/002555, MX.
Office Action dated Jan. 25, 2007, 2002/002555, MX.

Office Action dated Feb. 12, 2007, 2002/000197, MX.
IPER dated Feb. 14, 2002 for PCT/US00/31740, 2001-539201, JP.
Written Opinion dated Oct. 19, 2001 for PCT/US00/31740, 2001-539201, JP.
ISR dated Sep. 18, 2001 for PCT/US00/31740, 2001-539201, JP.
IPER dated Aug. 22, 2003 for PCT/US00/17266, 2001-506518, JP.
Written Opinion dated Jan. 31, 2003 for PCT/US00/17266, 2001-506518, JP.
ISR dated Sep. 21, 2001 for PCT/US00/15810, 2001-502044, JP.
Office Action dated Nov. 19, 2008, 2001/010300, MX.
Office Action dated Jun. 19, 2008, 2001/010300, MX.
Office Action dated Sep. 10, 2004, 2001/010300, MX.
Office Action dated Sep. 26, 2008, 2001/010298, MX.
Office Action dated Nov. 11, 2006, 2001/010298, MX.
Office Action dated Apr. 28, 2005, 2001/010298, MX.
Office Action dated Mar. 11, 2009, 2001/007581, MX.
Office Action dated Jul. 12, 2006, 2001/007581, MX.
Office Action dated Mar. 11, 2009, 2001/007580, MX.
Office Action dated Jun. 30, 2008, 2001/007580, MX.
Office Action dated Feb. 14, 2008, 2001/007580, MX.
Office Action dated Jul. 28, 2004, 00974006.9, EP.
Office Action dated Jun. 1, 2006, 00974003.6, EP.
ESR dated Oct. 4, 2005, 00974003.6, EP.
Office Action dated Jul. 28, 2004, 00974003.6, EP.
Office Action dated Jul. 11, 2005, 00968375.6, EP.
Office Action dated Mar. 30, 2004, 00968375.6, EP.
Office Action dated Oct. 24, 2007, 00960077.6, EP.
IPER dated Feb. 13, 2002 for PCT/US00/24819, 00960077.6, EP.
Written Opinion dated Aug. 13, 2001 for PCT/US00/24819, 00960077.6, EP.
ISR dated Dec. 7, 2000 for PCT/US00/24819, 00960077.6, EP.
Office Action dated Dec. 4, 2006, 00943086.9, EP.
ISR dated Jan. 18, 2001 for PCT/US00/17266, 00943086.9, EP.
IPER dated Sep. 8, 2001 for PCT/US00/15810, 00941287.5, EP.
Office Action dated Apr. 27, 2007, 00925915.1, EP
IPER dated Jan. 2, 2002 for PCT/US00/00/09541, 00925915.1, EP.
Written Opinion dated Aug. 13, 2001 for PCT/US00/09541, 00925915.1, EP.
Office Action dated May 30, 2005, 00923211.7, EP.
IPER dated Feb. 14, 2001 for PCT/US00/09543, 00923211.7, EP.
ISR dated Oct. 24, 2000 for PCT/US00/09543, 00923211.7, EP.
Office Action dated Jun. 8, 2005, 00923210.9, EP.
Office Action dated Jun. 23, 2006, 00909966.4, EP.
IPER dated Nov. 1, 2001 for PCT/US00/01708, 00909966.4, EP.
Office Action dated Oct. 13, 2006, 00909958.1, EP.
Office Action dated Sep. 6, 2006, 00909958.1, EP.
Office Action dated Jul. 27, 2005, 00909958.1, EP.
Office Action dated May 14, 2004, 00909958.1, EP.
IPER dated Feb. 2, 2001 for PCT/US00/01625, 00909958.1, EP.
IPER dated Jul. 24, 2000 for PCT/US00/01625, 00909958.1, EP.
Tan, Q. et al., "A brief overview of current TV set-top box developments", Systems, Man, and Cybernetics, 1996, IEEE International Conference on: Oct. 14-17, 1996, 2127-2132.
Perry, T.S., "Consumer electronics", Spectrum, IEEE, Jan. 1997, vol. 34, No. 1, 43-48.
The Internet Protocol Journal, Dec. 1998, vol. 3, No. 1, http://www.noc.garr.it/docum/journal/ipj_dic_98.pdf.
T.P. David, "Networking requirements and solutions for a TV WWW Browser" 1997 from http://scholar.lib.vt.edu/theses/public/etd-82497-16476/materials/etd.pdf.
Atzori, L. et al., "Multimedia information broadcasting using digital TV channels", Broadcasting, IEEE Transactions on, Dec. 1997, vol. 43, No. 4, 383-392.
Encryption. Free On-line dictionary of computing: http://foldoc.doc.ic.ac.uk/foldoc/2003-04-12.
Encode. Free On-line dictionary of computing: http://foldoc.doc.ic.ac.uk/foldoc/1999-07-06.
The project Gutenberg entitled: "The Bible: Old and New Testaments, King James Version by Anonymous", released on Aug. 1, 1989.
"'Optical Disks' May Be Books of the Future", Steven Kosek and Dennis Lynch; Chicago Tribune, Sep. 15, 1985, p. 31.

"Transmission Control Protocol; Request for Comment 793", pp. 1-85; Sep. 1981.

Cerf, V. et al., "A protocol for Packet Network Intercommunication," May 1974, IEEE Transactions on Communications Col. COM-22, No. 5, 637-647.

Holzmann, G., "Design and Validation of Computer Protocols," Nov. 1990, Prentice Hall, pp. 1- 512.

Hearst, "Changing Network Society: New Technology in the Internet," (the original title: Interfaces for Searching the Web), Dec. 1998, Japan Nikkei Science, 1$^{st}$ edition, 80-85.

Shunji Ichiyama, "WWW-based Digital Library System," Jul. 1996, NEC Giho (technical journal), NEC Creative, vol. 49, 33-39.

Minoru Ashizawa, "Using Digital Libraries as a Community Hall for Worldwide Information Spiral Development," May 1998, Journal of the Institute of Electronics, Information and Communication Engineers, Japan, vol. J81-D-II, No. 5, 1014-1024.

Akira Kojima, "Navigable Digital Library System Using Video-based Walk-through Technology," Mar. 1996, Technical Research Report of the Institute of Electronics, Information and Communication Engineers, Japan, vol. 95, No. 580, 31-36.

Toshiyuki Kamiya, "Development of Electronic Library Interface with 3D Walk-through and CG Librarian," Jan. 1995, Research Report of Information Processing Society of Japan, vol. 95, No. 1, 27-35.

Mamoru Sato, "Electronic Library Search using Animation," Apr. 1989, Science and Technology Information Service, Japan, National Diet Library, No. 88, 11-17.

Mamoru Sato, "SON-GO-KU: A dream of Automated Library," Mar. 1989, Joho Kanri (Journal of Information Processing and Management), the Japan Information Center of Science and Technology, vol. 31, No. 12, 1023-1034.

English language translation of citation No. 12, JP08008851.
English language translation of citation No. 13, JP09237096.
English language translation of citation No. 14, JP10070530.
English language translation of citation No. 17, JP10134080.
English language translation of citation No. 18, JP10275186.
English language translation of citation No. 19, JP10301946.
English language translation of citation No. 21, JP10327397.
English language translation of citation No. 23, JP11250145.

* cited by examiner

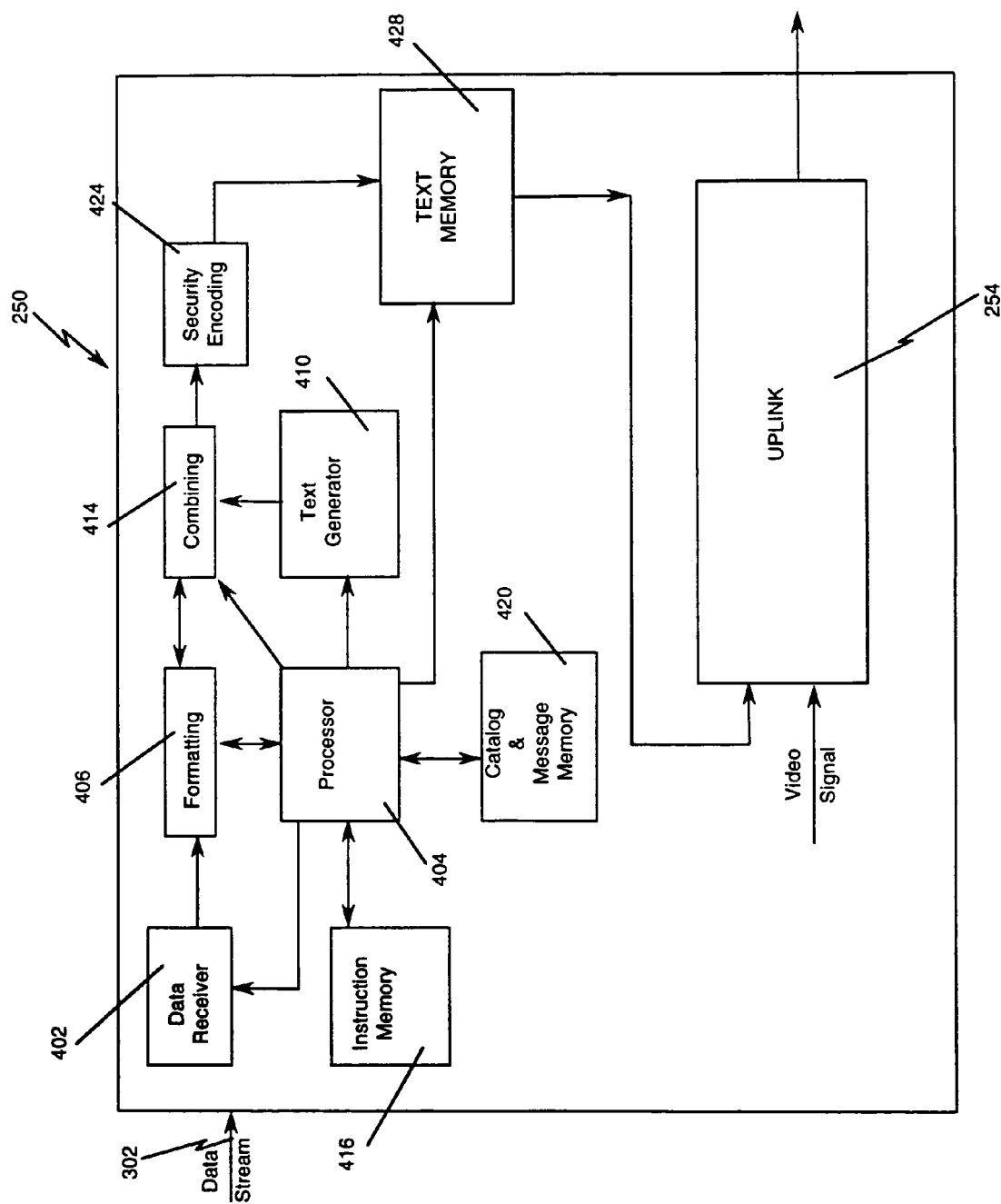

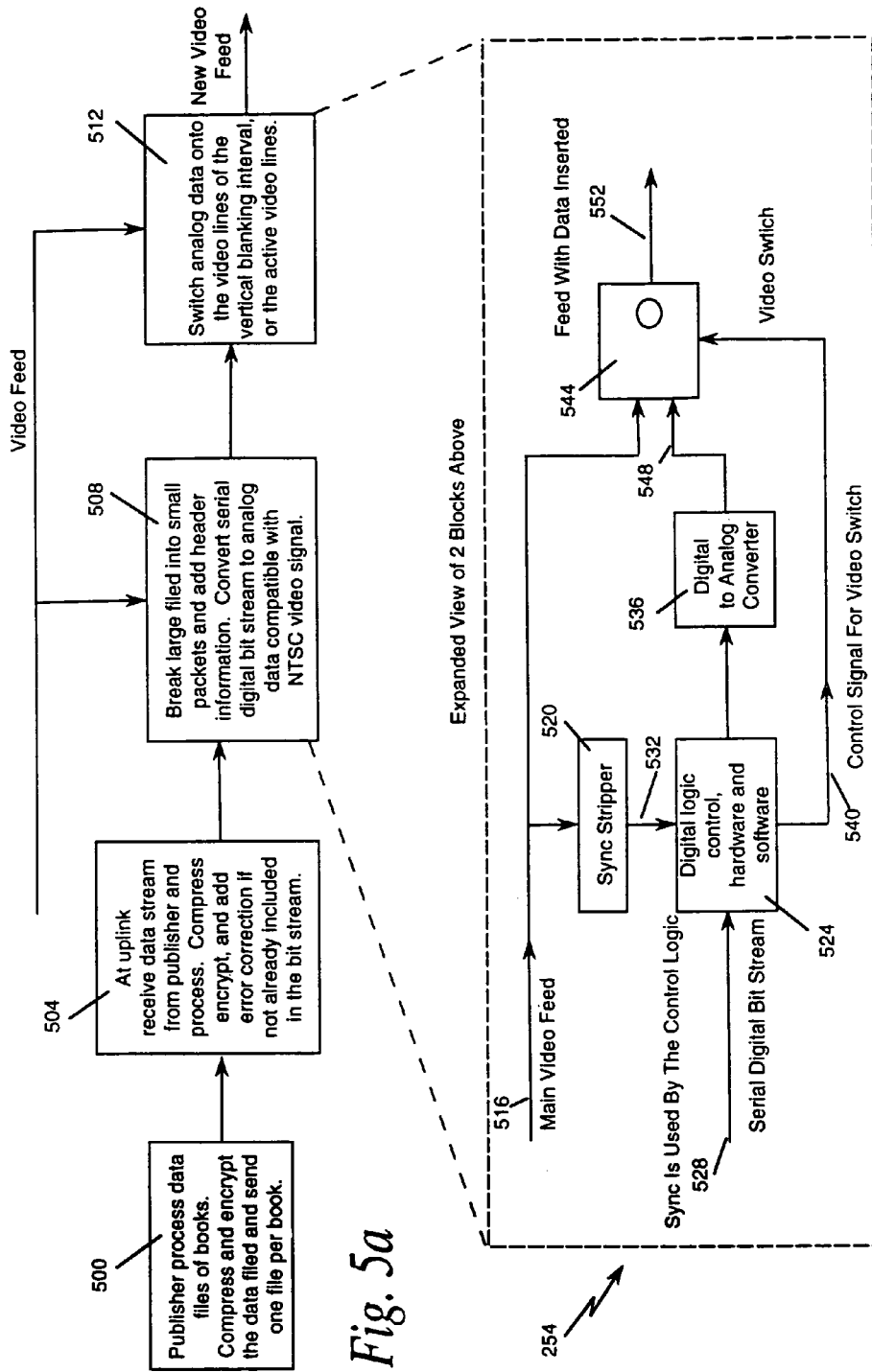

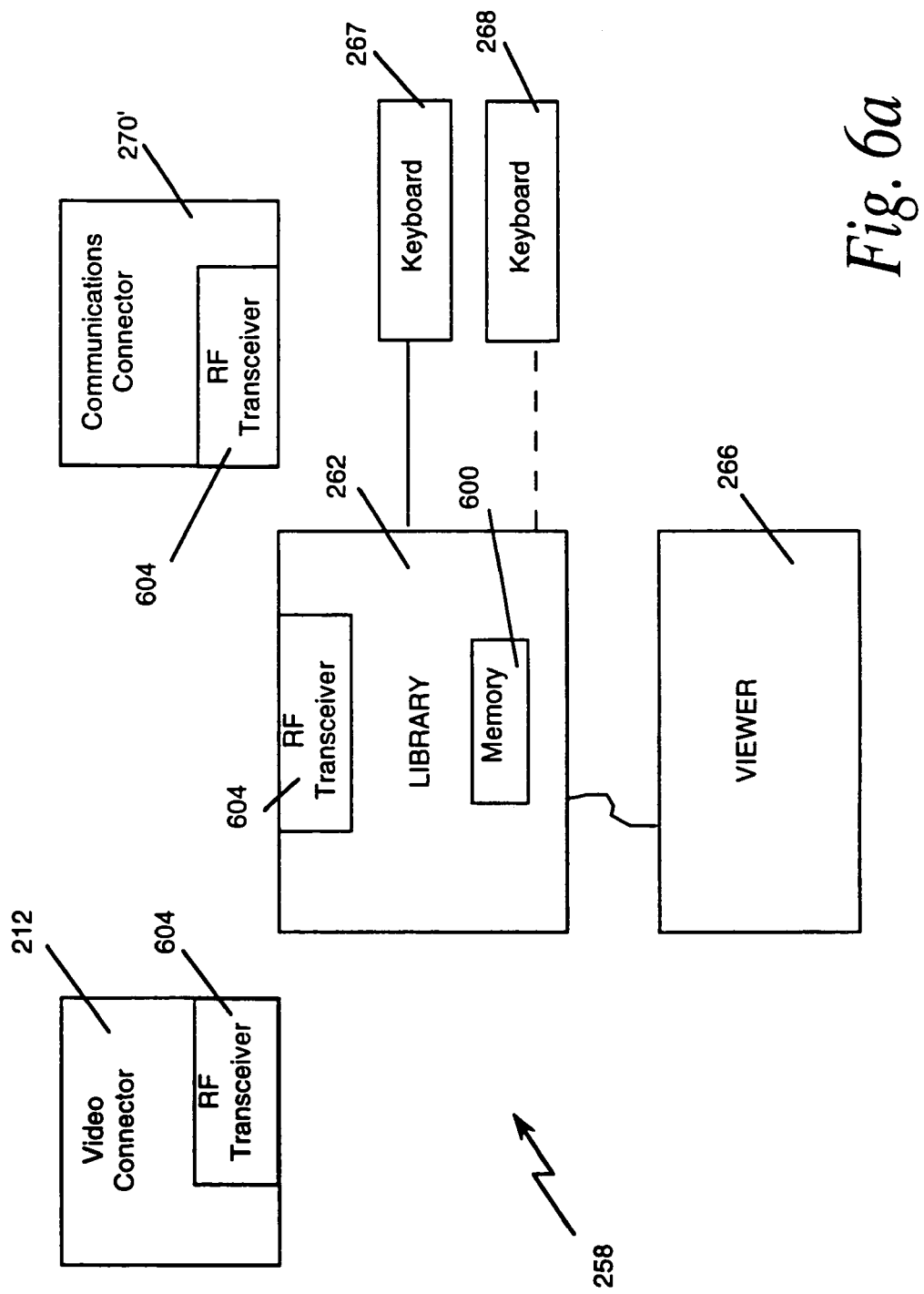

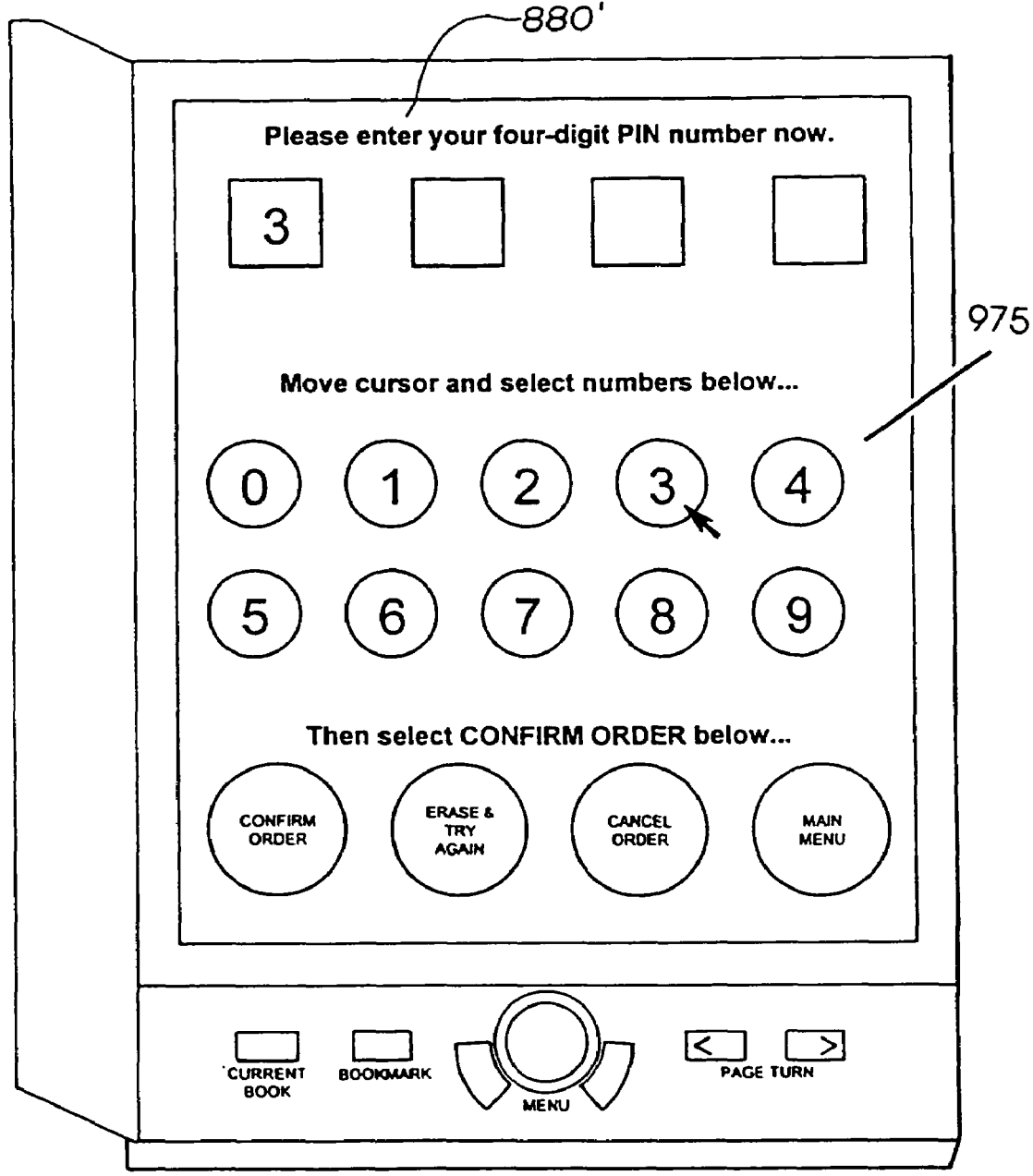

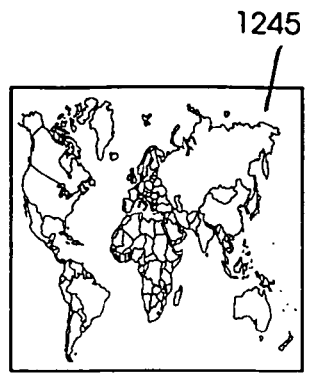
*Fig. 26c*
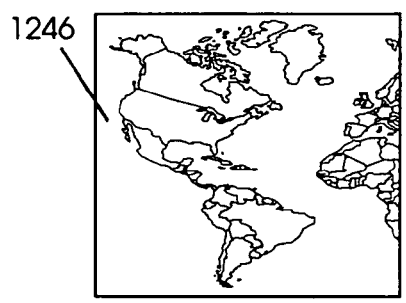 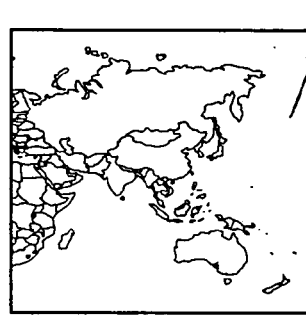
*Fig. 26d*
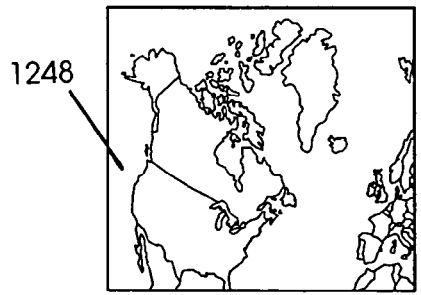 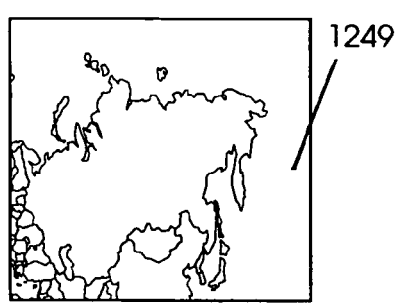
 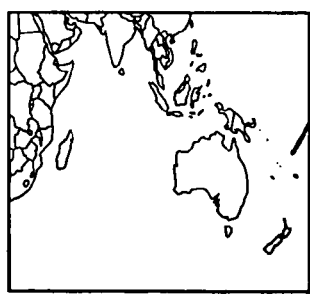
*Fig. 26e*

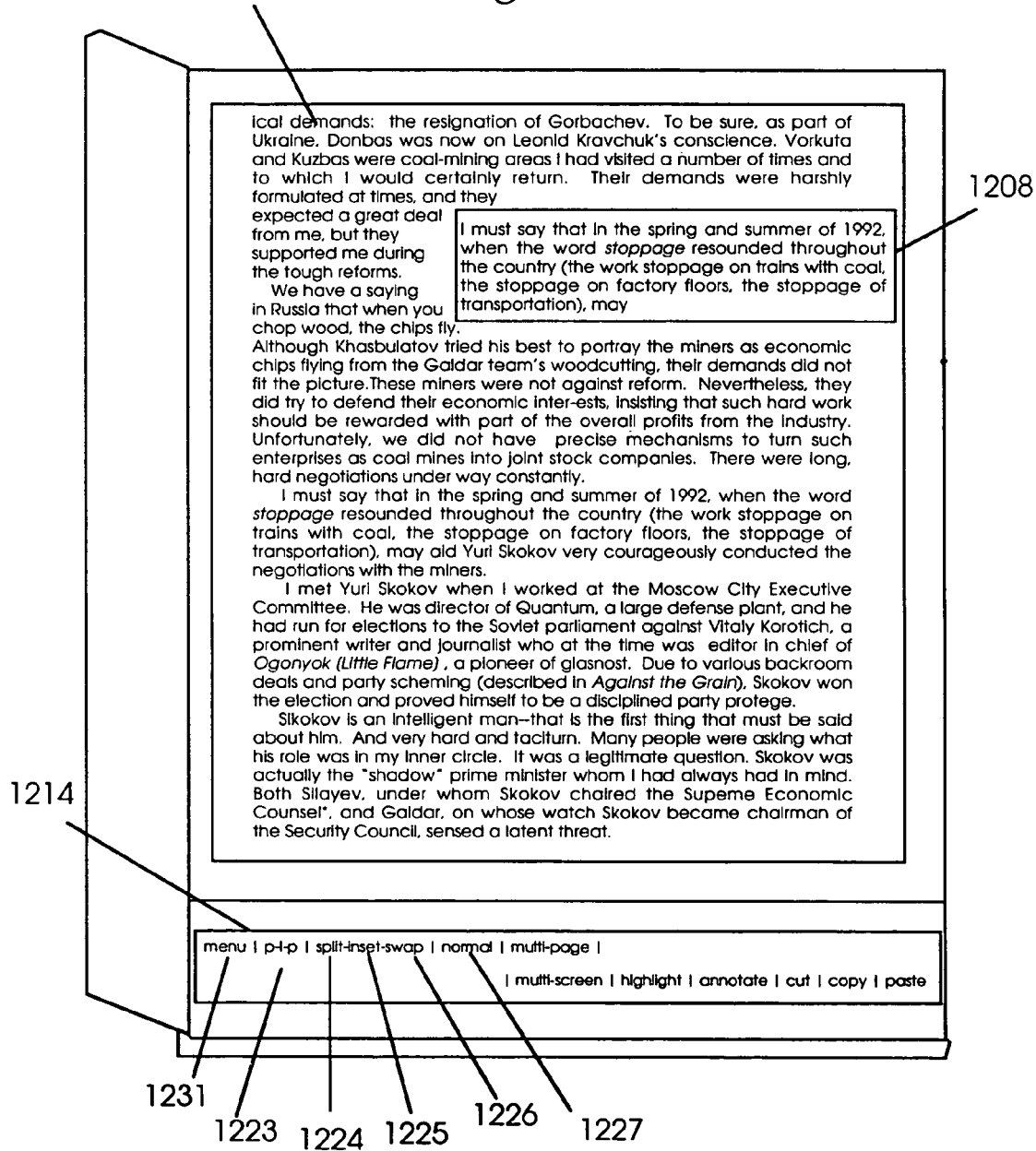

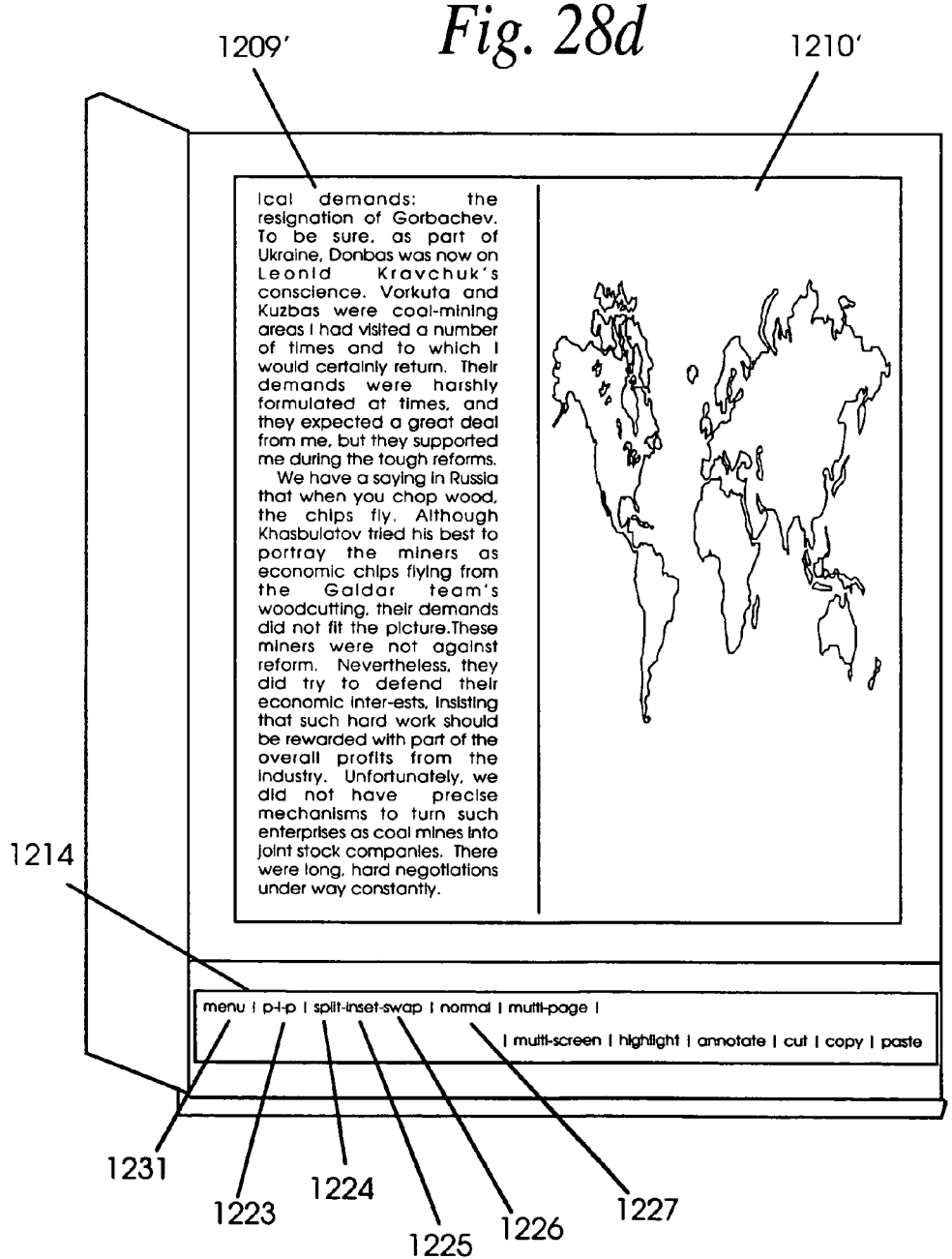

RESIZING DOCUMENT PAGES TO FIT AVAILABLE HARDWARE SCREENS

RELATED APPLICATIONS

This application is a continuation-in-part of U.S. application Ser. No. 08/336,247 entitled ELECTRONIC BOOK SELECTION AND DELIVERY SYSTEM, filed Nov. 7, 1994, now U.S. Pat. No. 5,986,690; U.S. application Ser. No. 09/237,828, filed on Jan. 27, 1999, entitled ELECTRONIC BOOK ELECTRONIC LINKS, now U.S. Pat. No. 7,401,286; U.S. application Ser. No. 09/289,957, filed on Apr. 13, 1999 now U.S. Pat. No. 7,835,989, entitled ELECTRONIC BOOK ALTERNATIVE DELIVERY SYSTEMS; U.S. application Ser. No. 08/160,194, entitled ADVANCED SET-TOP TERMINAL FOR CABLE TELEVISION DELIVERY SYSTEMS, filed Dec. 2, 1993, now U.S. Pat. No. 5,990,927; and U.S. application Ser. No. 08/906,469, entitled REPROGRAMMABLE TERMINAL FOR SUGGESTING PROGRAMS OFFERED ON A TELEVISION PROGRAM DELIVERY SYSTEM, filed Aug. 5, 1997, now U.S. Pat. No. 6,408,437, which is a continuation of U.S. application Ser. No. 08/160,281, entitled TERMINAL FOR SUGGESTING PROGRAMS OFFERED ON A TELEVISION PROGRAM DELIVERY SYSTEM, filed Dec. 2, 1993, now U.S. Pat. No. 5,798,785, dated Aug. 25, 1998, all of which are incorporated herein by reference.

TECHNICAL FIELD

This invention is directed to an electronic book unit having one or more electronic books. More specifically, the invention relates to an apparatus and method for manipulating information such as text and graphics within electronic books.

BACKGROUND ART

Sparked by the concept of an information superhighway, a revolution will take place in the distribution of books. Not since the introduction of Gutenberg's movable typeset printing has the world stood on the brink of such a revolution in the distribution of text material. The definition of the word "book" will change drastically in the near future. Due to reasons such as security, convenience, cost, and other technical problems, book and magazine publishers are currently only able to distribute their products in paper form. This invention solves the problems encountered by publishers.

SUMMARY OF INVENTION

An electronic book viewer incorporates advanced information manipulation features that enhance the functionality of the electronic book viewer. In an embodiment, information in an electronic book including text, mathematical formulas, data, graphics, and still and moving images may be selected for manipulation. A processor in the viewer uses software modules to execute information manipulation commands. Information may be highlighted by selecting a portion of the electronic book using a cursor or similar selection device, and then sending a command to the viewer's processor to initiate the highlighting process. For example, text shown on a page of the electronic book may be selected for highlighting. Highlighting may include changing font style, size, format (bold, italics or normal), or color, for example. In the disclosure that follows, the terms information and images will be understood to refer to all manner of data, graphics, text, videos, formulas and any other information or images.

Using other software modules, the viewer's processor may be used to cut and paste, or copy and paste images from one portion of the electronic book to another portion of the electronic book. Similarly, images or content from other electronic documents can be cut and pasted, or copied and pasted into the electronic book.

The viewer's processor also may use software modules to annotate portions of the electronic book, to display the annotated portions, and to move annotations within the electronic book.

In another embodiment, the viewer may display multiple electronic books. For example, the viewer may display information or images from two electronic books in a side-by-side fashion. The two electronic books also may be displayed in a picture-in-picture format. The viewer is not limited to displaying only two electronic books, and may display three or more electronic books, using well-known image processing routines.

In yet another embodiment, the viewer may use multiple screens to display an image from a single electronic book or to display images from multiple electronic books. The multiple screens may be hinged and electronically connected to fold like pages in an actual book. The multiple screens also may snap into place to form electrical connections. A single image may be expanded to fit on all the multiple screens. For example, a map of the world may be expanded from a single screen format to a three screen format. The multiple screens may also be used to display multiple pages of the electronic book. The displayed multiple pages may be consecutive or non-consecutive pages within the electronic book. The multiple screens also may be used to display multiple pages from more than one electronic book, or to display a page from an electronic book, and information from another electronic document or information source. For example, a first screen may display a page from the electronic book and a second page may display a digital television signal. The second screen also may display images that are linked to the page displayed on the first screen. A method and apparatus for links in an electronic book are described in detail in copending U.S. application Ser. No. 09/237,828, filed on Jan. 27, 1999, entitled ELECTRONIC BOOK ELECTRONIC LINKS, the disclosure of which is hereby incorporated by reference.

In still another embodiment, information from other sources may be displayed in a picture-in-picture format on the viewer's screen. For example, a live television program may be displayed in a picture-in-picture window of the screen at the same time that the text of an electronic book is displayed.

BRIEF DESCRIPTION OF DRAWINGS

FIG. 4 is a block diagram of an operations center.

FIG. 5a is a flow diagram of the processing at the operations center and uplink.

FIG. 5b is a block diagram of the hardware configuration for an uplink site.

FIG. 6a is a block diagram of the hardware configuration for a four component home subsystem.

FIGS. 14*c*, 14*d*, 14*e*, 14*f*, 14*g*, 14*h*, 14*i* and 14*j* are schematics showing examples of submenus.

FIG. 26*c* is a schematic illustrating presenting an image on a viewer having one screen.

FIG. 26*d* is a schematic illustrating presenting an image on a viewer having two screens.

FIG. 26*e* is a schematic illustrating presenting an image on a viewer having four screens.

FIG. 28*a* is a schematic illustrating use of an inset image within a main image for picture-in-picture viewing of electronic books.

FIG. 28*d* is a schematic illustrating use of a side-by-side images for picture-in-picture viewing of an electronic book and other information such as graphical images or video.

DETAILED DESCRIPTION

Figure 1:
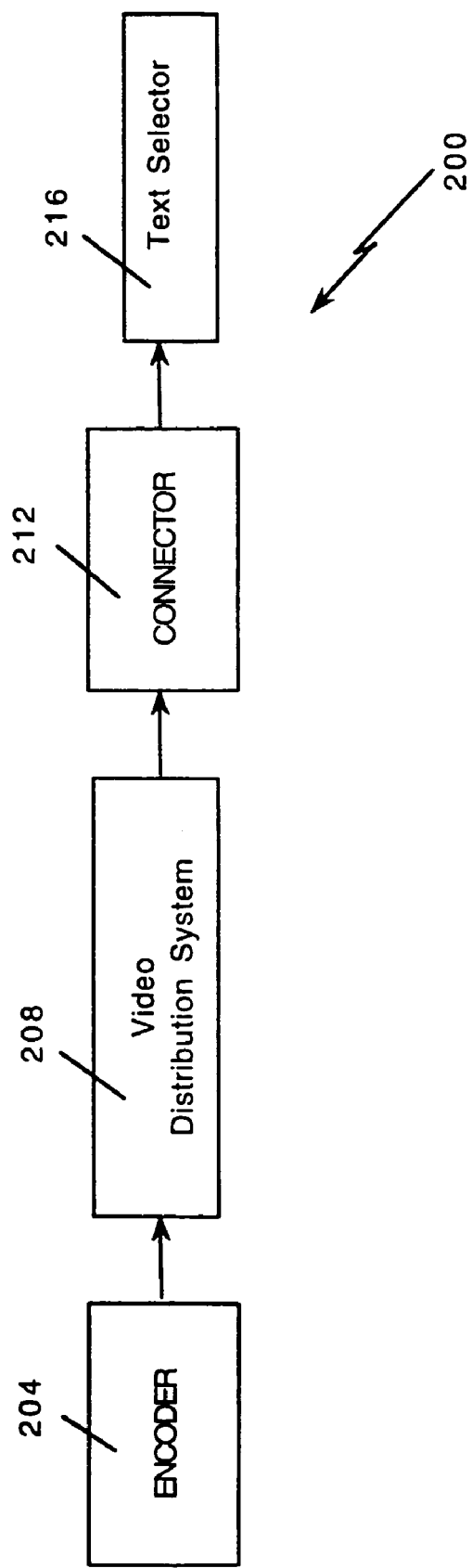
FIG. 1 is a block diagram of the primary components of the electronic book selection and delivery system.

An electronic book selection and delivery system provides a new way to distribute electronic books to bookstores, public libraries, schools, and subscribers or users. In the discussion that follows, subscribers and users will be understood to refer to an individual or individuals who interface with the electronic book or any part of the electronic book selection and delivery system. The technological breakthroughs of this invention provide a secure system for both delivering selected electronic books and receiving payments. The system has an unusual combination of features that provides the consumer with an electronic book unit that has a high tech aura while being very practical, portable, and easy to use.

The clear advantage of the system is that it eliminates the distribution of any physical object such as a paper book or computer memory device from any book or text distribution system. The purchase of an electronic book may become a PAY-PER-READ™ event avoiding the overhead, "middlemen," printing costs, and time delay associated with the current book distribution system. Published material and text such as the President's speech, a new law, a court decision on abortion, or O. J. Simpson's testimony can be made immediately available to the consumer at a nominal fee.

The system is a novel combination of new technology involving the television, cable, telephone, and computer industries. It uses high bandwidth data transmissions, strong security measures, sophisticated digital switching, high resolution visual displays, novel controls, and user friendly interface software.

The primary components of the text delivery system are the subsystem for placing the text onto a signal path and the subsystem for receiving and selecting text that was placed on the signal path. A preferred embodiment of the system includes additional components and optional features that enhance the system. The system may be configured for use by bookstores, public libraries, schools and consumers.

The system for consumer use is made up of four subsystems, namely: (1) an operations center, (2) a distribution system, (3) a home subsystem including reception, selection, viewing, transacting and transmission capabilities, and (4) a billing and collection system.

The operations center performs several primary functions: manipulating text data (including receiving, formatting and storing of text data), security encoding of text, cataloging of books, providing a messaging center capability, and performing uplink functions. The system delivers the text from the operations center to consumer homes by inserting text data into an appropriate signal path. The insertion of text is generally performed with an encoder at an uplink site that is within or near the operations center. If the signal path is a video signal path, the system can use several lines of the Vertical Blanking Interval (VBI), all the lines of the analog video signal, a digital video signal or unused portions of bandwidth to transmit text data. Using the VBI delivery method, the top ten or twenty book titles may be transmitted with video during normal programming utilizing existing cable, satellite, wireless or broadcast transmission capability without disruption to the subscriber's video reception. Using the entire video signal, thousands of books may be transmitted within just one hour of air time. Nearly any analog or digital video distribution system may be used to deliver the video signal with included text.

The text data may also be transmitted over other low and high speed signal paths including a telephone network (e.g., a public switched telephone network) having a high speed connection such as an asynchronous digital subscriber line (ADSL) connection. Other delivery methods and systems are described in detail in copending applications U.S. application Ser. No. 09/289,957, entitled ELECTRONIC BOOK ALTERNATIVE DELIVERY SYSTEMS, and U.S. application Ser. No. 09/289,956, entitled ELECTRONIC BOOK ALTERNATIVE DELIVERY METHODS, both filed Apr. 13, 1999, the disclosures of which are hereby incorporated by reference.

The home subsystem performs four primary functions: connecting to the video distribution system, selecting text, storing text, and transacting through a phone or cable communicating mechanism. The components of the home subsystem may be configured in a variety of hardware configurations. Each function may be performed by a separate component, the components may be integrated, or the capability of existing cable set top converter boxes and televisions may be utilized. Preferably, a connector, library unit and an electronic book unit, or viewer unit, are used. The connector portion of the home subsystem receives the analog video signal and strips or extracts the text from the video. The home library stores the text signal, provides a user friendly software interface to the system and processes the transactions at the consumer home. The viewer provides a screen for viewing text or menus and novel user friendly controls. The viewer may also incorporate all the functionality of the home subsystem.

The viewing device is preferably a portable book shaped viewer which stores one or more electronic books for viewing and provides a screen for interacting with the home library unit. A high resolution LCD display is used to both read the books and to interact with the home library software. An optional phone connector or return-path cable connection initiates the telephone calls and, with the aid of the library, transmits the necessary data to complete the ordering and billing portion of the consumer transaction. The user friendly controls include a bookmark, current book and page turn button. The billing and collection system performs transaction management, authorizations, collections and publisher payments automatically utilizing the telephone system. Alternative ordering and billing methods and systems are described in detail in copending applications U.S. application Ser. No. 09/289,957, filed on Apr. 13, 1999, entitled ELECTRONIC BOOK ALTERNATIVE DELIVERY SYSTEMS, and U.S. application Ser. No. 09/289,956, filed on Apr. 13, 1999, entitled ELECTRONIC BOOK ALTERNATIVE DELIVERY METHODS.

In an embodiment, the primary components of the electronic book selection and delivery system 200 are an encoder 204, a video distribution system 208, a connector 212, and a text selector 216 as shown in FIG. 1. The encoder 204 places textual data on a video signal to form a composite video signal. Although the composite signal may contain only textual data, it usually carries both video and textual data. A variety of equipment and methods may be used to encode text data onto a video signal. The video distribution system 208 distributes the composite video signal from the single point of the encoder 204 to multiple locations which have connectors 212. The connector 212 receives the digital or analog video signal from the video distribution system 208 and separates, strips or extracts the text data from the composite video signal. If necessary, the extracted text data is converted into a digital bit stream. Text selector 216 works in connection with the connector 212 to select text.

Using a connector 212 and text selector 216 combination, various methods of selecting and retrieving desired text from a composite or video signal are possible. Text may be preselected, selected as received or selected after being received and stored. A preferred method is for the connector 212 to strip or extract all the text from the video signal and have the text selector 216 screen all the text as received from the connector 212. The text selector 216 only stores text in long term or permanent memory if the text passes a screening process described below.

Figure 2:
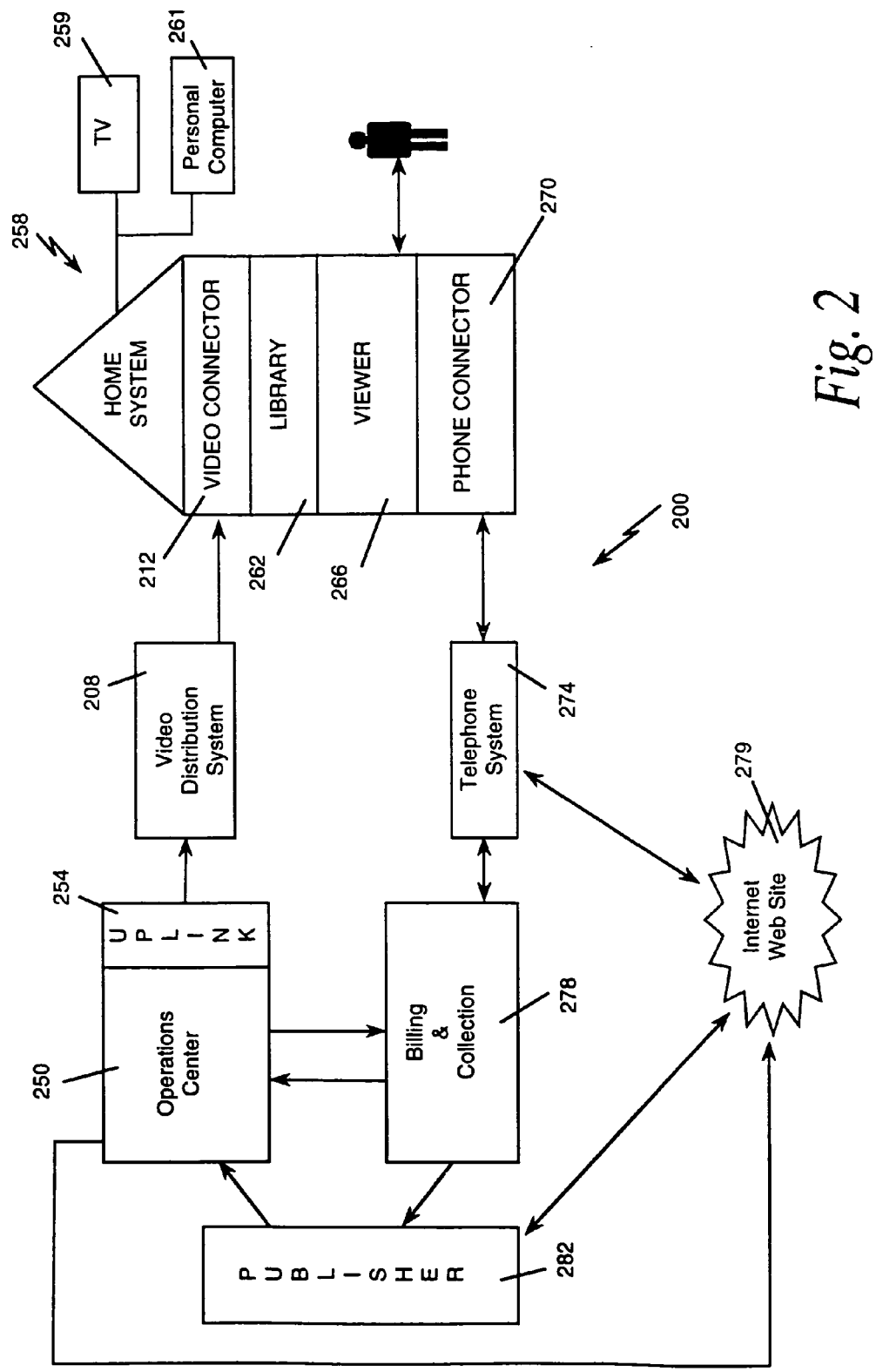
FIG. 2 is a schematic showing an overview of the electronic book selection and delivery system.

An overview of the electronic book selection and delivery system 200 is shown in FIG. 2. The delivery system 200 includes: an operations center 250 including an uplink site 254, a video distribution system 208, a home system 258 including a video connector 212, a library 262, a viewer 266, and a phone connector 270, telephone system 274, an internet web site 279 and a billing and collection system 278. Also as shown in FIG. 2, the home system 258 may include connections to a television 259 and a personal computer 261. The television 259 and the personal computer 261 may be used to display menu screens, electronic books, electronic files, or any other information associated with the delivery system 200. In addition, the television 259 and the personal computer 261 may provide control function that replicate and supplement those of the viewer 266.

The operations center 250 receives textual material from outside sources 282 such as publishers, newspapers, and on-line services. Alternately, the outside sources may maintain electronic books at the Internet web site 279. The outside sources 282 may convert textual and graphical material to digital format, or may contract with another vendor to provide this service. The operations center 250 may receive the textual and graphical material in various digital formats and may convert the textual material to a standard compressed format for storage. In so doing, the operations center 250 may create a pool of textual material that is available to be delivered to the home system 258. The textual material may be grouped by books or titles for easy access.

As used herein, "book" means textual or graphical information such as contained in any novels, encyclopedias, articles, magazines or manuals. The term "title" may represent the actual title assigned by an author to a book, or any other designation indicating a particular group, portion, or category of textual information. The title may refer to a series of related textual information, a grouping of textual information, or a portion of textual data. For example, "Latest Harlequin Romance", "Four Child Reading Books (Ages 10-12)", "Encyclopedia 'BRITANNICA'™", "President's Speech", "Instruction Manual", "Schedule of 4th of July Events", "Pet Handbooks", "Roe v. Wade", and "The Joy of Cooking" are suitable titles. Also, the title may be a graphical symbol or icon. Thus, a picture of a wrench may be a title for a repair book, a picture of a computer a title for a computer book, a graphical symbol of a telephone a title for a telephone book, a drawing of a dagger a title for a mystery book, a picture of a bat and ball a title for a sports book and a picture of tickertape a title for a business book. The term "electronic book" refers to the electronic counterpart to a "book."

The operations center 250 includes an uplink site 254 for placing the text onto a video signal and sending the composite video signal into a video distribution system. The uplink site 254 would generally include an encoder 204 (not shown in FIG. 2) to encode the text onto a video signal.

Many analog and digital distribution systems 208, or other telecommunications systems, can be used with the delivery system 200, such as a cable television distribution system, a broadcast television distribution system, video distributed over telephone systems, distribution from the Internet, direct satellite broadcast distribution systems, and other wired and wireless distribution systems.

The home system 258 performs five primary functions: (1) connecting with a video distribution system, (2) selecting data, (3) storing data, (4) displaying data, and (5) handling transactions. An important optional function of the home sub-system 258 is communicating using a telephone communication system 274. The home system 258 is made up of primarily four parts: a video connector 212 or similar type of connector for connecting with the video distribution system 208, a library unit 262 for storing and processing, an electronic book, or viewer unit, 266 for viewing menus and text and a telephone connector 270 for connecting with a telephone communications system 274. In an alternate arrangement, the viewer 266 may include all the functionality of the home system 258.

The billing and collection system 278 may be co-located with the operations center 250 or located remote from the operations center 250. In an embodiment, the billing and collection system 278 is in communication with the home system 258 via telephone-type communication systems (for example 274). Any of a number of telephone type communication systems, such as, a cellular system, will operate with the billing and collection system 278. The billing and collection system 278 records the electronic books or portions of text that are selected or ordered by the subscriber. The collection system will charge a subscriber's credit account or bill the subscriber. In addition, the billing and collection system 278 will monitor that amount due to publishers or other outside sources 282 who have provided textual data or other services such as air time to enable the text delivery system 200 to operate.

When electronic books are provided via the Internet web site 279, the billing and collecting functions may be incorporated into the Internet web site 279. For example, a subscriber may pay for an electronic book selection by entering a credit card number into a data field of a page of the Internet web site 279. In this configuration, a separate billing and collection system may not be required.

Figure 3A:
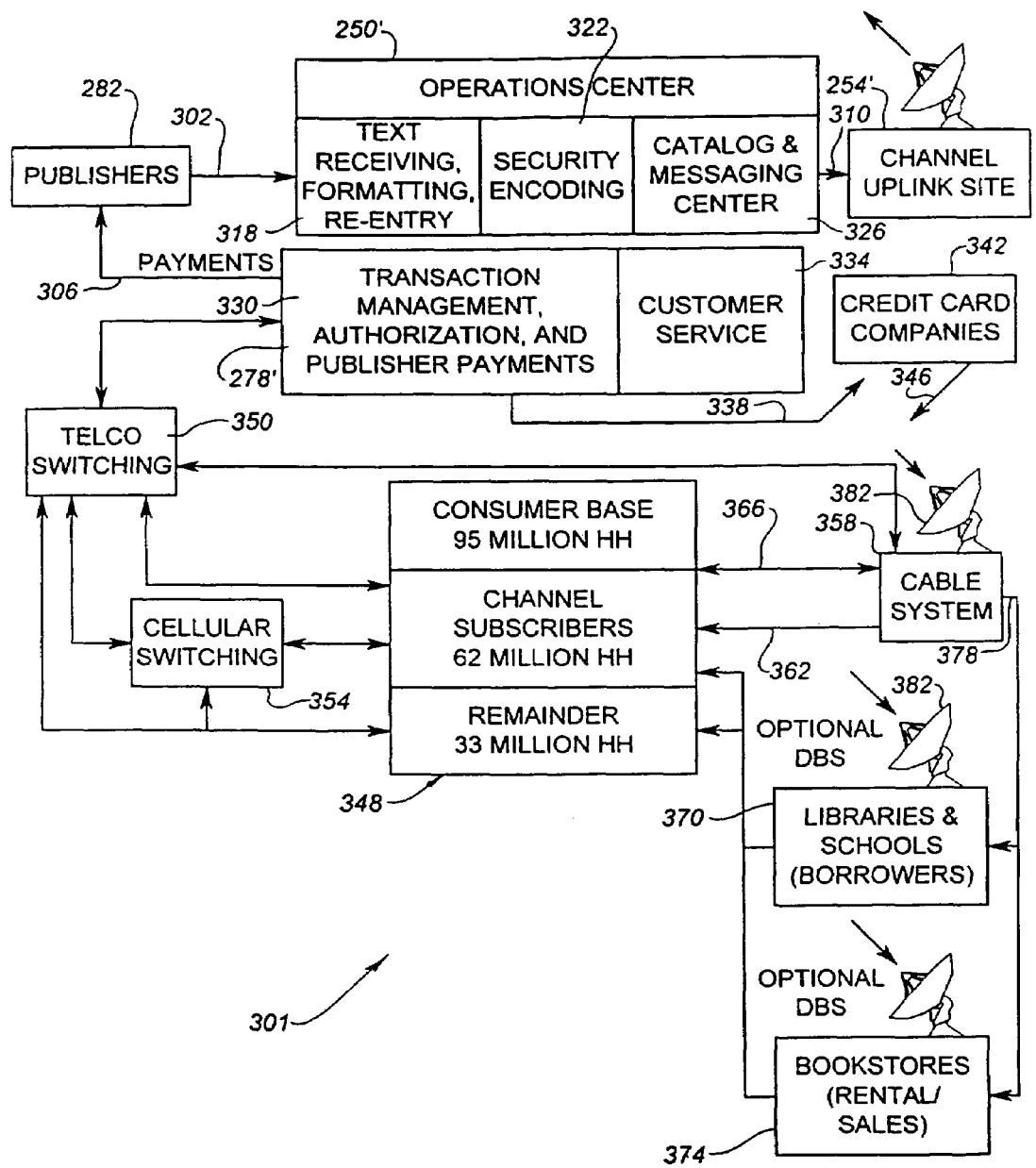
FIG. 3a is a schematic of the delivery plan for the electronic book selection and delivery system.

FIG. 3a is an expanded overview of a delivery plan 301 for the delivery system 200. The delivery plan 301 supports various types of subscribers and various billing systems. FIG. 3a shows that publishers 282 will provide text transfer 302 to the operations center 250' and receive payments 306 from the billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding 322 and a third section for catalog and messaging center functions 326.

The billing and collection system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Three methods for communicating between the subscriber base 348 and the billing and collection system 278' are shown: by telephone switching 350 alone, cellular switching 354 and telephone switching 350 combined, and by use of the cable system 358 and the telephone switching 350. The system shown supports both one-way 362 and two-way cable communication 366 with subscribers. Public libraries and schools 370 as well as bookstores 374 may use the delivery system 301.

Public libraries and schools 370 would have a modified system to allow the viewer 266 to be checked-out or borrowed while bookstores 374 would rent or sell the viewer 266 and sell the electronic books. The bookstores 374 as well as the public libraries and schools 370 may be serviced by cable 378. Optional direct broadcast systems (DBS) 382 can also be used with the delivery system 200. The DBS 382 may provide the electronic books using digital satellite technology, with the electronic books being received via a backyard satellite antenna, for example.

Figure 3B:
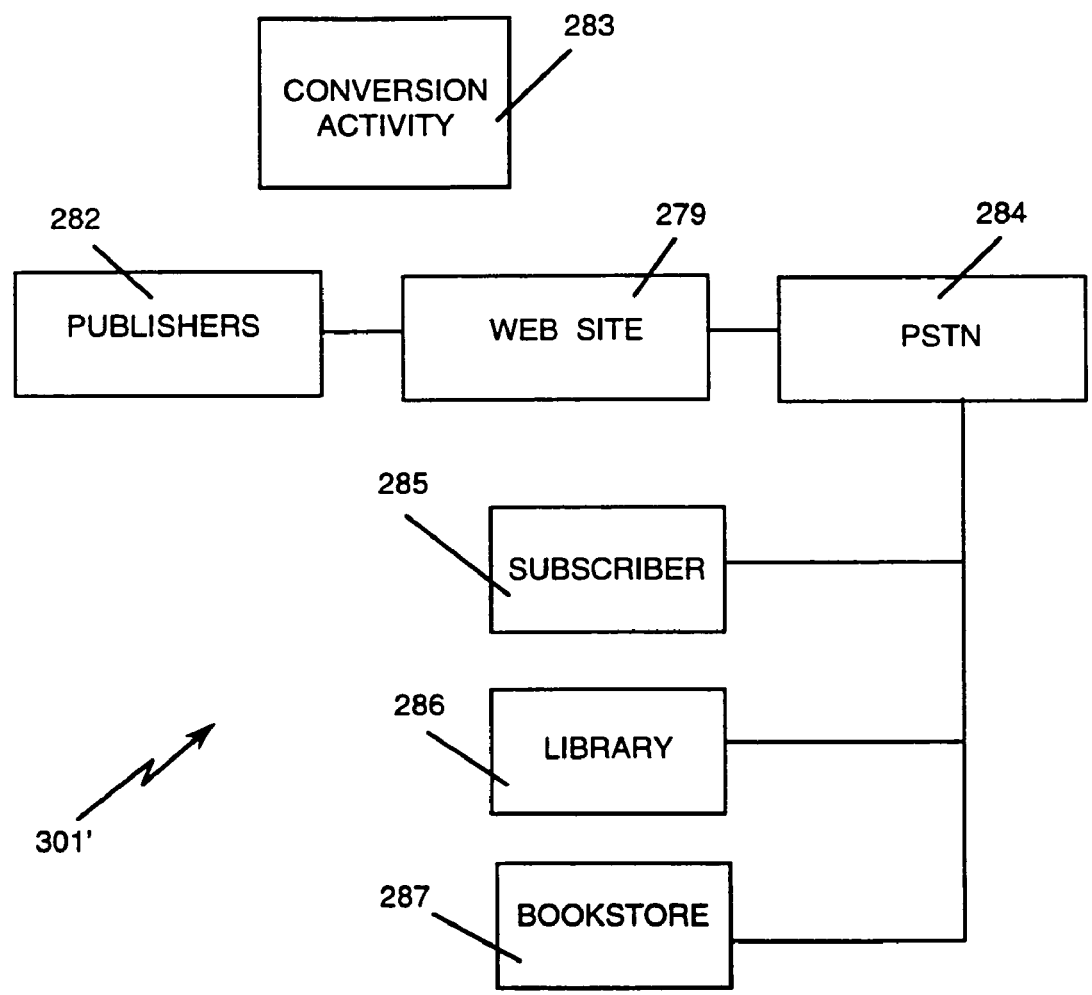
FIG. 3b is a schematic of an alternate delivery plan.

FIG. 3b is an alternate delivery plan 301' that provides for electronic book selection and delivery using the Internet. In FIG. 3b, the publishers 282 provide the electronic books to be posted at the Internet web site 279. The publishers may convert the text and graphical data to digital format, compress the digital data, and upload the compressed digital data to the Internet web site 279. Alternately, the publishers 282 may arrange for an outside conversion activity 283 to convert the text and graphical data to digital format. The conversion activity 283 may then provide the digital data to the Internet web site 279. For example, a large on-line bookstore could gather publications in electronic form from a variety of publishers, or could convert hard-copy books to electronic form, and post the electronic books on the Internet such as at the Internet web site 279.

The electronic books may then be transferred via a public switched telephone network (PSTN), for example, direct to a subscriber 285, a library 286 and a bookstore 287. The library 286 and the bookstore 287 may also provide electronic books to the subscriber 285.

I. The Operations Center

FIG. 4 is a schematic of an operations center 250 which includes an uplink 254. The operations center 250 gathers text or books by receiving, formatting, storing, and encoding. A data stream 302 containing text is received at the operations center 250 by a data receiver 402. The data receiver 402 is under the control of a processor 404. After reception, the data stream is formatted using digital logic for formatting 406 which is also under the control of the processor 404. If any additional text is being generated at the operation center 250 locally for insertion into the distributed signal, the text generation is handled through text generator hardware 410 which may include a data receiver and a keyboard (not shown). Following processing by the text generator 410, the additional text can be added to the text received by the combining hardware 414 that includes digital logic circuitry (not shown).

The processing at the operations center 250 is controlled by a processor 404 which uses an instruction memory 416. The processor 404 and instruction memory 416 may be supplied by a personal computer or mini-computer. To perform the catalog and messaging functions, the operations center 250 uses a catalog and message memory 420 and the text generator 410 if necessary.

The data stream of text, catalog and messages is preferably encoded by security module encoding 424 prior to being sent to the uplink module 254. Various encoding techniques may be used by the security encoding module 424 such as the commercial derivative of NSA's encryption algorithm (Data Encryption System (DES)) and General Instrument's DigiCipher II. Following encoding, the encoded text may be stored in text memory 428 prior to being sent to the uplink 254. A first-in-first-out text memory arrangement may be used under the control of the processor 404. Various types of memory may be used for the text memory 428 including RAM. The operations center 250 may use file server technology for the text memory 428 to catalog and spool electronic books for transmission as is described below.

To transmit textual data (i.e., electronic books), the delivery system 208 uses high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during programming using four lines of the Vertical Blanking Interval at a rate of approximately one book every 1.6 minutes (63,840 bits per second). Alternatively, electronic books may be transmitted over a dedicated channel, which interrupts programming so that 246 lines of video can be used to transmit approximately 2,250 books every hour (3.9 Mbits per second). A teletext type format is the simplest but possibly the slowest text format to use with the delivery system 200. In either event, an encoder 204 is utilized at an uplink site 254 to insert textual data into the analog video signal. In many other respects, the delivery of the textual information is completed using existing cable television plant and equipment.

FIG. 5a is a flowchart of the steps involved in processing text from the publisher or provider 282 that occurs at the operations center 250. As shown in block 500, the publisher 282 processes data files of text for books, compresses, encrypts and sends the data files to the operations center 250 or uplink 254. Text files for books are preferably sent one book at a time. As shown in block 504, the uplink 254 or operations center 250 receives and processes the data stream from the publisher 282. Generally, part of this processing includes encryption and error correction.

As shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data is generally placed either in the VBI or the active video lines. In some instances, it may be preferable to utilize unused portions of bandwidth (such as 5-40 MHZ, 70-75 MHZ, 100-109 MHZ or other guard bands) instead of the video lines.

FIG. 5b is an example of a hardware configuration to perform some of the functions for blocks 508 and 512. A video feed 516 is received and processed through a sync stripper 520. The stripped sync signal 532 is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch 544. The video switch 544 integrates the video feed 516 and analog data stream 548 into a video feed with analog data signal inserted 552.

As an alternative to cable, satellite, broadcast, or other television delivery methods, the public telephone system may be used to transmit books to the subscribers. An average electronic book would take about 7 minutes to transmit over the public telephone system. Using the telephone system, it is not necessary to combine video and text into a composite signal. In most other respects, the operation center would remain similar whether text delivery was by telephone or cable. File server technology (such as that described in U.S. Pat. No. 5,262,875, entitled AUDIO/VIDEO FILE SERVER INCLUDING DECOMPRESSION/PLAYBACK MEANS, issued to Mincer, et al., and, U.S. Pat. No. 5,218,695, entitled FILE SERVER SYSTEM HAVING HIGH-SPEED WRITE EXECUTION, issued to Noveck, et al., incorporated herein by reference) may be used at the operation center with a telephone system text delivery method.

As another alternative to cable, television, and telephone system delivery, the public telephone system may be used to provide access to the Internet, where the Internet web site 279 may be accessed. Electronic books may be ordered, paid for, and delivered directly from the Internet web site 279 over the telephone system.

In any delivery system using the telephone system, individual subscribers may increase the electronic book deliver rate by incorporating high speed modems or other communication devices such as an Integrated Services Digital Network (ISDN) connector, or by use of an Asymmetric Digital Subscriber Line (ADSL)

II. The Home System

Figure 6B:
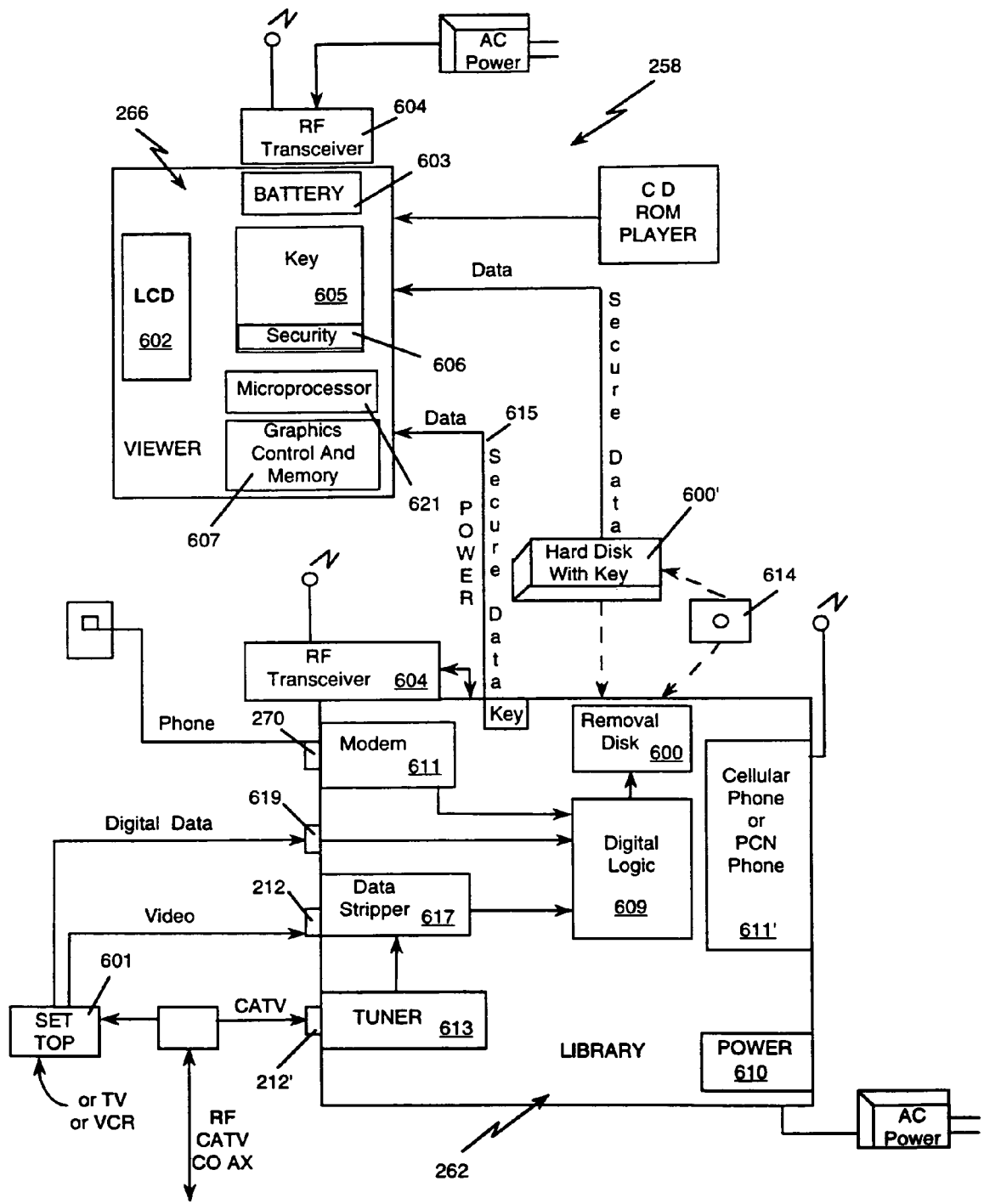
FIG. 6b is a schematic of a two unit home subsystem.

The hardware configuration for a four component home system 258 is shown in FIG. 6a. FIG. 6b shows a hardware configuration for a two component home system. The hardware components may also be incorporated into a single unit that communicates with a terminal in a television delivery system or with a telephone system by use of a modem, for example. The home system 258 performs several functions, such as receiving data and video transmissions, stripping (or extracting) the data from the video signal, screening and storing the data, providing user friendly interface controls and software, displaying menus and text, processing transactions, initiating telephone calls and transmitting billing data. Various hardware configurations may be utilized to achieve the desired functions of the home system 258. For example, as shown in FIG. 6b, the home system 258 can be configured to utilize the reception and channel tuning capability of the current installed subscriber base of cable converter boxes and televisions 601. The home system 258 can also be designed as an advanced set top terminal converter box with menu generation capability, electronic memory and a telephone modem as described in section V below.

The electronic components which make up the home system 258 can be arranged in a variety of ways. In the four unit system of FIG. 6a the viewer 266 and library unit 262 are wired together while the remaining components communicate through RF transceivers 604. In a simple version of the home system 258 there are only two units, the library unit 262 and a viewer 266. FIG. 6b shows a two unit home system 258 with certain optional features. Finally, all the functionality of the home system 258 may be incorporated into one electronic book unit, or viewer.

The viewer 266 is generally equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library unit 262 contains the connector function to the video distribution system 208, connector function to a public telephone communications system, and memory 600 (which may be removable and portable 600'). More specifically, the library unit 262 would include data stripping functions 617, digital logic 609, memory storage 600, power circuitry 610, optional telephone connections 611 (including cellular or PCN 611'), optional battery (not shown), optional tuner module 613 and an optional RF transceiver 604. The video connector 212 and the public telephone system connection 270, as well as the removable portable memory unit 600 of the library unit 262 may be broken out into separate components. (FIG. 6b shows a removable portable hard disk memory 600' with removable cartridges 614.) Finally, the home system 258 may include an attached keyboard 267 or a wireless keyboard 268. Both the attached keyboard 267 and the wireless keyboard 268 may be used to communicate with the viewer 266 (not shown) or the library unit 262.

The wireless keyboard 268 may communicate via radio frequency (RF) signaling, for example. Therefore, the home system 258 may have as many as six separate components which communicate with each other. The two, three, four, five or six separate components which make up the home system 258 can communicate with each other in a variety of ways, including hardwired connection 615, RF transceiver 604, and other wireless methods.

RF communications are preferred in the home because they allow separate components to be located throughout the home without restriction. The data communicated between the units is preferably secure data. In addition, the library unit 262 may provide power to the viewer 266 through the hardwired connection 615.

Alternatively, a single unit may perform all of the home system 258 functions. The single unit should use light-weight materials, including a light-weight battery. A single unit eliminates the need to communicate (externally) between units. The single unit is less expensive and eliminates duplicative processing, memory storage and power circuitry.

To receive and strip the data from the video signal at the consumer's home, either a cable interface device or cable connector 212 is used. The cable connector device includes a tuner 613, while the cable interface device makes use of existing tuning equipment in the home. In either configuration, data is stripped from the video signal and stored at the subscriber's location in the library unit 262. The phone connector 270, and modem 611 initiate telephone calls and transmit ordering and billing information to the operations center 250 or billing and collection system 278. Alternatively, the phone connector 270 and the modem 611 may be used to provide access to the Internet to order and receive electronic books from an Internet web site. A digital connector 619 is provided to communicate digital information with the set top 601. The library unit 262 is the intelligent component of the home system, incorporating the hardware and software necessary to store the text data, generate menus and effect the purchase transactions. In addition to an RF transceiver 604, the library unit 262 also includes the necessary jacks and connections to allow the delivery system 200 to be connected to the viewer 266. As shown in FIG. 6b, the library 262 communicates the text data (electronic book) to the viewer 266 in a secure format which requires a key 605 for decryption. The text is generally only decrypted page by page just before viewing.

a. The Video Connector

Figure 7:
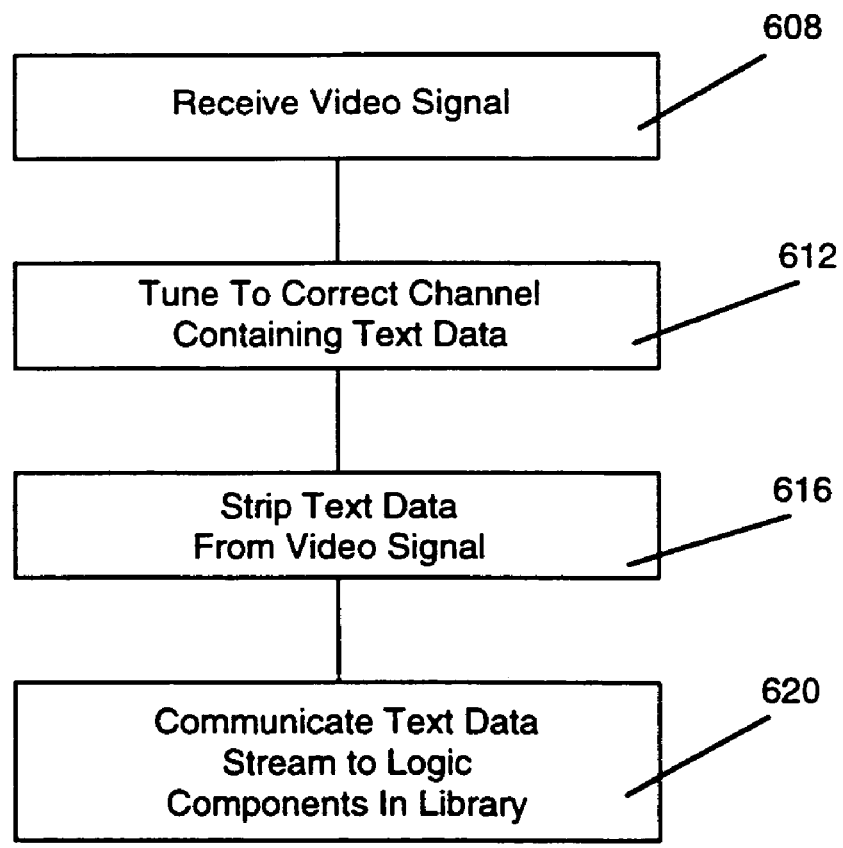
FIG. 7 is a flow diagram of the processes performed by the video connector.

FIG. 7 shows the flow of the processes performed by the video connector 212. The video connector receives the video signal 608, tunes to the channel containing the text data 612, strips the text data from the video signal 616, and communicates the text data stream to logic components in the library 620.

The connection to the video distribution system is preferably a cable connector to a cable television delivery system, as shown in FIG. 6b. The cable connector includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library unit 262. The data is embedded in the video signal either in the vertical blanking interval or the active video portion in an encrypted and compressed format. The data stripper circuit 617 can be placed inside the set top converter box 601, TV, or in the library unit. The data stripper circuit 617 outputs the digital bit stream to be used by the library digital logic 609.

The video connector 212 may also contain a channel tuner module 613 that can tune to the video channel and provide access to the video that contains the data to be stripped. Using the optional tuner module 613, a set top converter, VCR, or TV tuner is not needed in the home system. The optional tuner module 613 would instead receive the CATV signal directly through the cable connector 212.

b. Library

Figure 8:
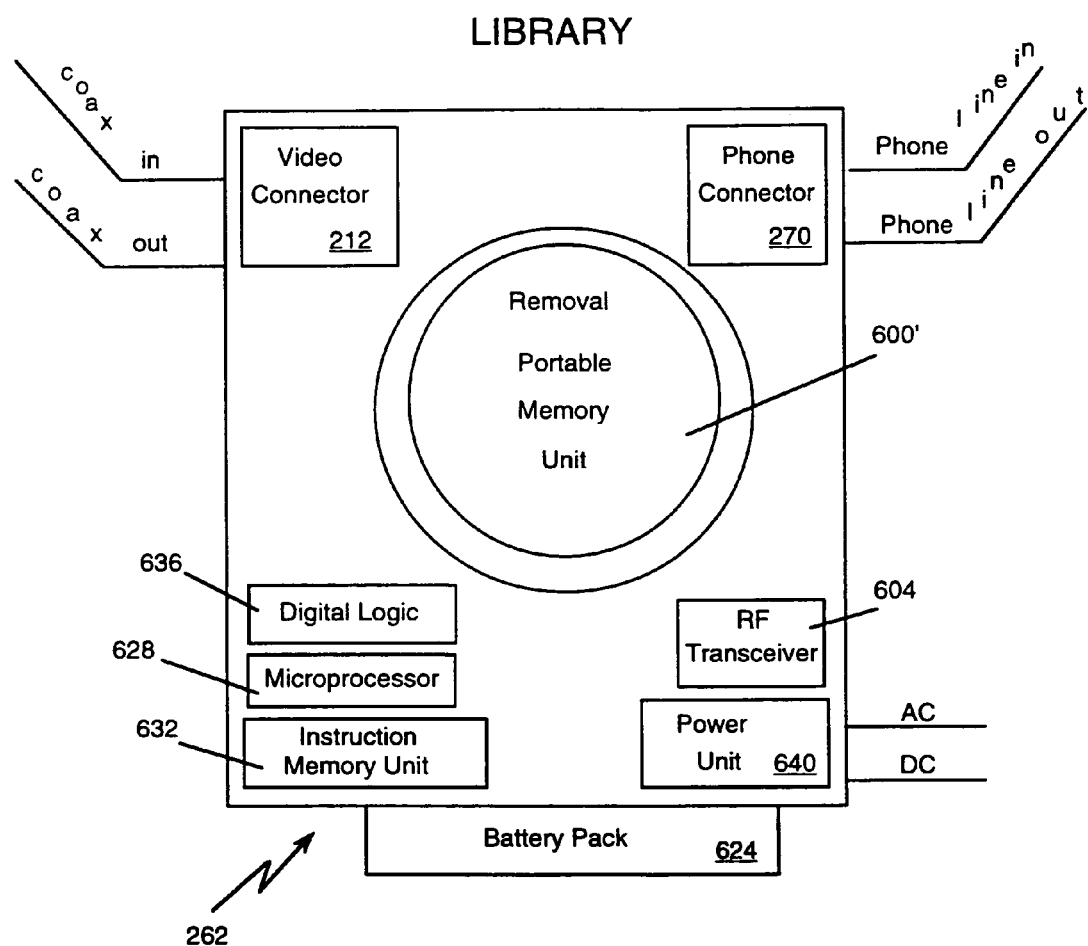
FIG. 8 is a block diagram for an example of a library unit.

An embodiment of the library unit 262 for a two unit home system 258 is shown in both FIG. 6b and FIG. 8. The embodiment shown includes the following optional parts: the video connector 212, phone connector 270, RF transceiver 604, and battery pack 624 in addition to a removal portable memory 600', microprocessor 628, instruction memory unit 632, digital logic 636, and power unit 640.

The library unit 262 contains a digital logic section 609 (not shown in FIG. 8) which includes the microprocessor 628, the digital logic 636 and the instruction memory unit 632. The microprocessor 628 is preferably a secure microprocessor such as the Mot SC21 device sold by Motorola. The digital logic section 609 will receive the serial digital bit stream from the data stripper circuit 617 and process the data. Error correction will also be performed by the digital logic section 609 and the data will be checked for proper address. If the address of the data is correct and the library unit 262 is authorized to receive the data, the data will be transferred to the memory storage unit 600, 600'. Authorization to receive the data is provided by the cable headend or another distribution point. An authorization code may be sent in the serial digital bit stream. The digital logic section 609 will send appropriate text and graphical data to the memory storage unit 600, 600'. It transfers this data in a compressed and encrypted format and the data remains stored in a compressed and encrypted format.

i. Memory Storage Unit

The memory storage unit of the library may be a removable portable memory unit 600' (as shown in FIGS. 6a, 6b and 8). A variety of options are available for memory storage: a hard disk drive, a hard disk with removable platters, and a CD ROM, or a MEMORY STICK™. Referring to FIG. 6b, a hard disk drive unit 600' which contains removable platters may also be used. This would provide virtually unlimited library storage capacity. Data (i.e., electronic book files) may be stored in the memory storage unit in a compressed and encrypted format. As is also shown in FIG. 6b, the data may also contain a key or unique ID number that matches the ID or key of the viewer 266. This matching of a unique key or ID number prevents unauthorized transfer of text data from the memory storage unit to an unauthorized viewer. Small memory devices such as smart cards, electronic memory cards or PCMCIA cards (personal computer memory card industry association) may also be used to store the data.

ii. Power Circuitry

As shown in FIGS. 6b and 8, the library unit 262 may accept power from either AC wall power 610, DC power 640, or optional battery power 624. The power circuitry 610, 640 may provide all the voltage necessary from either the battery 624 or AC unit for the various circuitry in the library. The power circuitry 610, 640 may also provide power to the viewer 266 through a single data cable when connected to the viewer. The power circuitry 610, 640 will recharge the battery using AC power when in operation. With the optional battery unit 624 installed, the library unit 262 becomes a portable unit and can still provide power to the viewer 266. In order to extend battery life, power conservation measures may be utilized, such as shutting down the memory system when not in use. When the viewer 266 is being utilized and the library circuitry is not being utilized, virtually all power may be shut down to the library unit 262.

iii. Connection to the Public Telephone System

The connection to the telephone system may be provided by a modem 611. Various available modems may be used to perform this function. As shown in FIG. 6b, cellular phone or PCN phone connections 611' may also be provided. When the home system 258 is first initialized, the modem may be used to transfer the name and credit card information of the consumer to the billing and collection system 278. The telephone connection 270 may be utilized each time an electronic book is purchased by a consumer to complete and record the transaction. The telephone connection 270 may also be used as a means for receiving the electronic books from the operations center 250 or from an Internet web site, by-passing the video distribution system 208. The phone connection 270 may be a separate unit as shown in FIG. 6b.

iv. Library Processing

Figure 9:
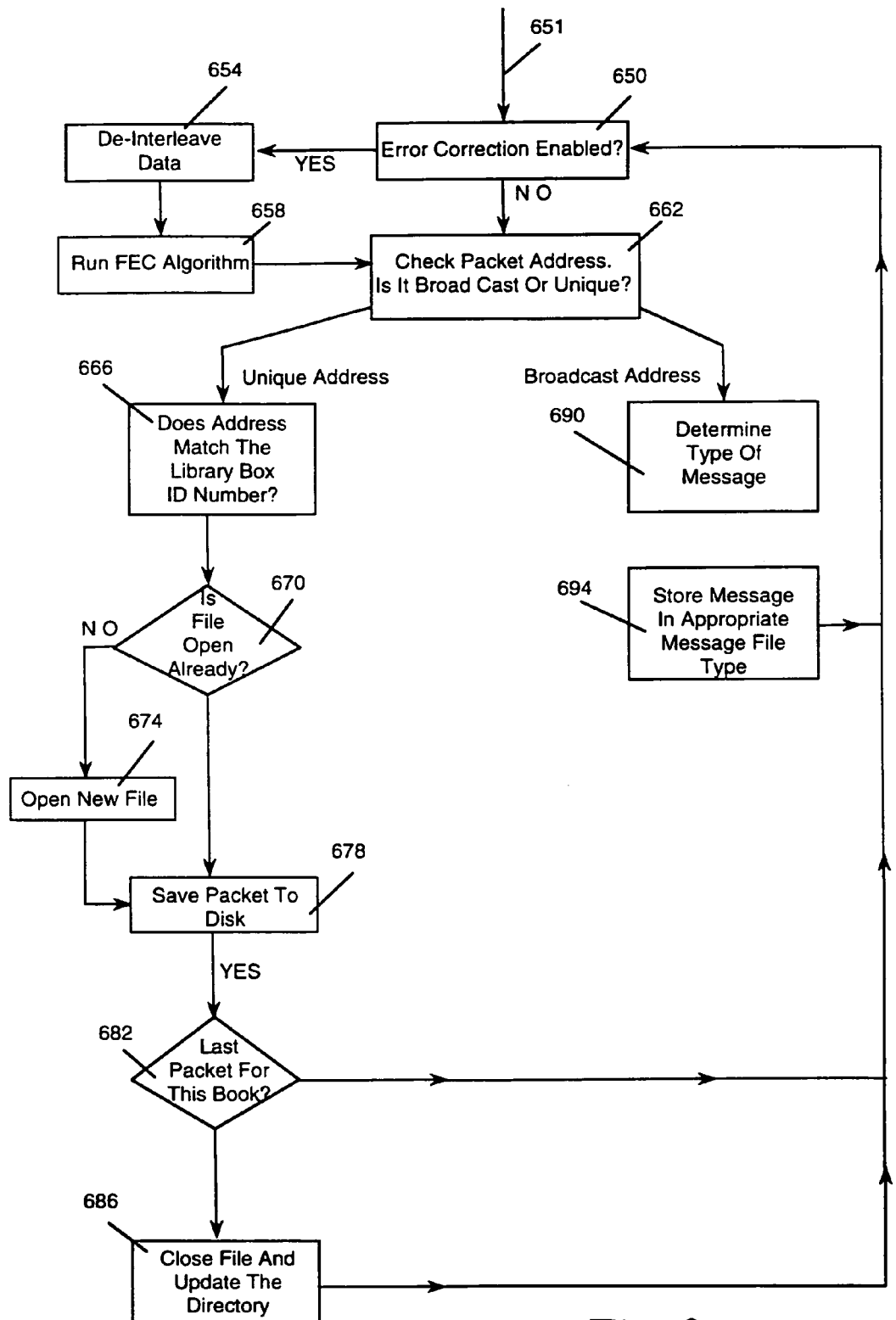
FIG. 9 is a flow diagram of some of the processes performed by the library on the received data stream.

FIG. 9 shows an example of some basic processing performed by the library unit 262 on the data stream 651 received from the video connector 212 or stripper circuit 617. First the data stream 651 is checked for error correction by block 650. If an error is detected, block 654 de-interleaves the data followed by block 658 running a FEC (Forward Error Correcting) algorithm. The combination of block 650, 654 and 658 perform the error correction needed on the data stream. If no error correction is necessary the data proceeds to block 662 where packets are individually checked for packet address.

If the address is a unique address, block 666 checks whether the address of the packet matches the library box ID number. The library box ID number is a unique number associated with that library unit 262 which is used to ensure security of the data. Block 670 determines whether an electronic file has already been opened into which the data packet can be saved. If no data file has been opened then block 674 opens a new data file for that packet. If an electronic file has been opened, then the packet is saved in that electronic file on disk, block 678. Next, the process checks to see if this is the last packet for a particular book for a particular textual data block being received 682. If it is the last packet of information, then the electronic file is closed and the directory of available electronic files is updated 686. Following either block 682 or 686, the process returns to receive another data packet from the data stream received from the data stripper block.

If the packet address is checked and the address is determined to be a broadcast address, the process determines the type of message that is being sent 690. The message may be an index of book titles, menu (and menu graphics) information, announcements, special offerings, discounts, promotions, previews etc. The message is then stored in appropriate electronic message file 694 and the process is returned to block 650 to receive another data packet and perform another error check.

Using the process of FIG. 9, the library unit 262 is able to receive, store and update directories related to the textual data and graphical data (that can be used to depict pictures in a given book or to generate menus). Variations of the processes are possible depending on the format of the data and operating system of the library unit 262.

Figure 10:
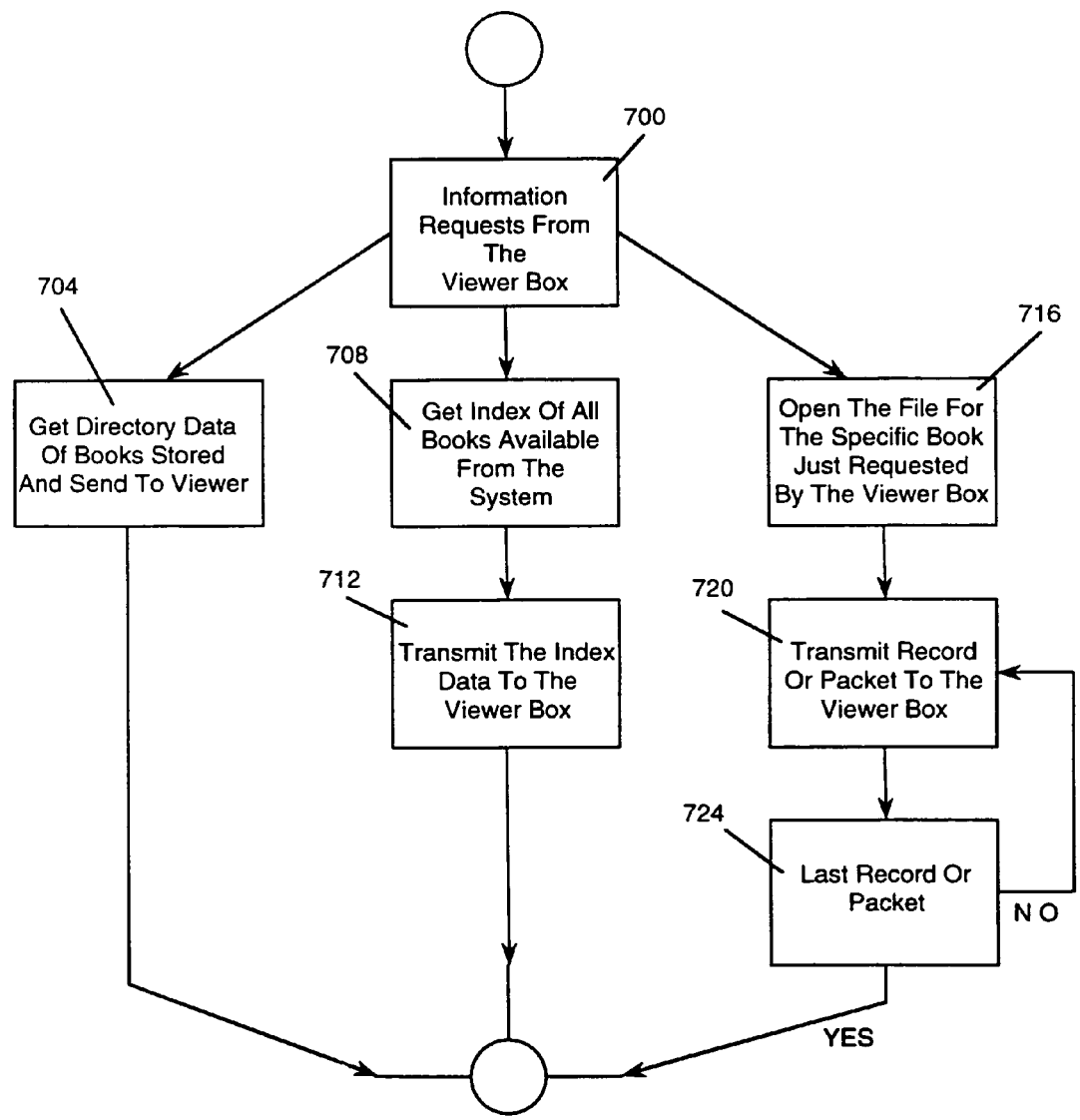
FIG. 10 is a flow diagram of the processes performed by the library unit on information requests from the viewer.

FIG. 10 shows an example of the processing of information requests from the viewer 266 at the library unit 262. Information requests from the viewer 266 are received either through the cable connecting the viewer 266 to the library unit 262 or through wireless transmissions such as RF. It is possible in some embodiments for subscribers' requests to come from a set top terminal 602 (see Section V).

Information requests received from the viewer 266 generally fall into three categories: (1) directory data of electronic books stored in the library unit 262, (2) index of all available electronic books on the system, and (3) requests for a specific electronic book (Block 700). A get directory process 704 answers a request from the viewer 266 for a directory of data showing the electronic books stored at the viewer 266. The directory of data is sent to the viewer 266 so that it may be displayed to the subscriber. A get index process 708 handles requests from the viewer 266 for an index of all available electronic books on the home system 258. The library unit 262 will obtain an index of all the available books on the system and transmit that index, process 712, with menu information to the viewer 266. An open file process 716 replies to a request from the viewer 266 for a specific electronic book. The library unit 262 opens an electronic file for the specific electronic book requested by the viewer 266 and transmits the record or transmits the information 720 on a packet-by-packet basis to the viewer 266. This process of transmitting the specific electronic book, record, or packets to the viewer 266 continues until the last record or packet has been sent, 724.

In addition to the processes shown on FIG. 10 in handling a request for a specific electronic book, the library unit 262 also orders and receives specific electronic books from the operations center 250 using the process as described in the open file process 716. Following a request for a specific electronic book which is not stored at the library unit 262, the library unit 262 will proceed to determine the next available time the electronic book will be on the video distribution system 208 and ensure reception and storage of that electronic book (process not shown). In performing this process the library unit 262 will transmit to the viewer 266 information on when it will obtain the text data for the electronic book so that the subscriber may view the electronic book. In addition to timing information, price and other ordering information may also be passed by the library unit 262 to the subscriber.

c. The Viewer

Figure 11:
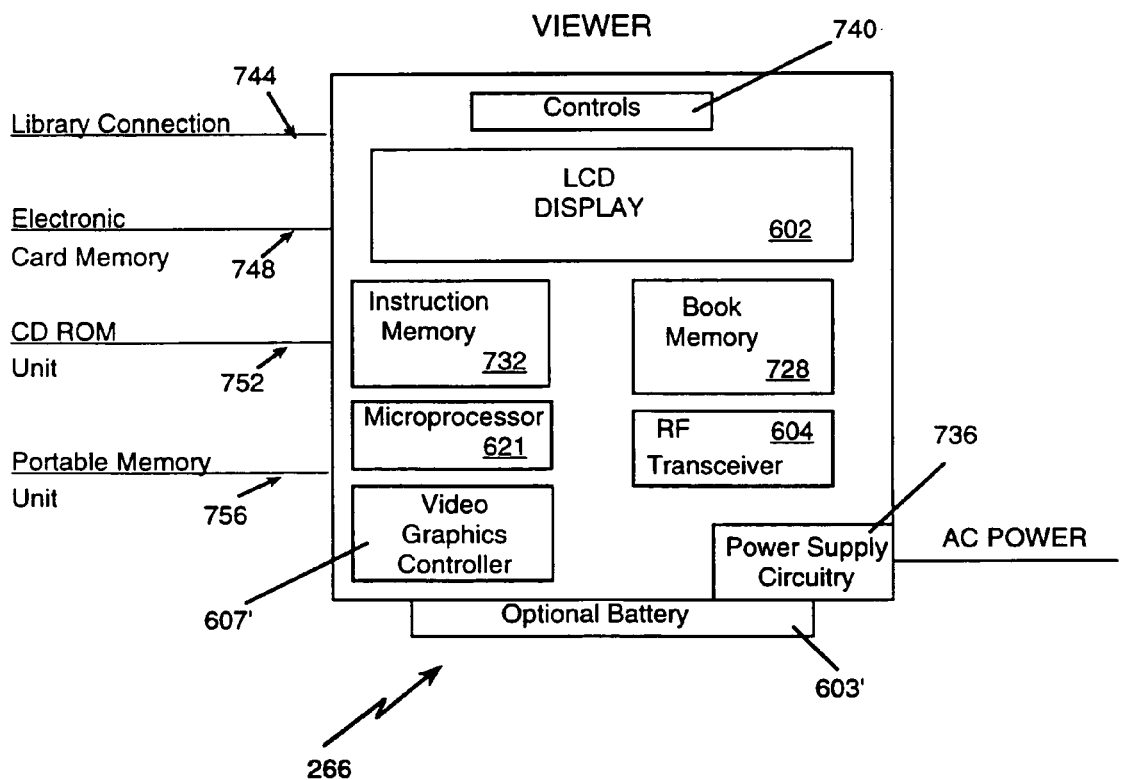
FIG. 11 is a block diagram showing the components for an example of a viewer.

FIG. 11 is a block diagram of the viewer 266 showing its internal components. The viewer 266 of FIG. 11 is similar to the viewer 266 depicted in FIG. 6b. The viewer 266 is designed to physically resemble a bound book. The viewer 266 is made up of five primary components and six optional components: (1) LCD display 602, (2) digital circuitry (not shown), (3) video graphics controller 607', (4) controls 740, (5) book memory 728, (6) optional power supply circuitry 736, (7) optional battery 603', (8) optional RF transceiver 604, (9) optional cellular or mobile communicator (608), (10) optional keyboards 267 and 268, and (11) a speaker/microphone 608'.

(1) A high resolution LCD screen 602, preferably of VGA quality, is used by the viewer 266 to display text and graphic images. The screen is preferably the size of one page of a book. A two page screen or two screens may also be used with the viewer 266.

(2) Digital circuitry that includes a secure microprocessor 621, instruction memory 732, and digital logic. Data is transferred to the viewer 266 in compressed and encrypted format. The secure microprocessor 621 compares the ID number of the viewer 266 with the incoming data stream and only stores the text data if the ID number of the viewer 266 matches that within the incoming data stream. It is preferred that the viewer 266 not output text data or other data and that the data is decompressed and decrypted only at the moment of viewing and only for the current page being viewed. These measures are preferred because they provide additional security against unauthorized access to data.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. These unique and novel controls 740 allow the consumer to select stored electronic books and electronic books from catalogues, move a cursor, and turn pages in a book. Typically, preferred controls 740 include forward and reverse page buttons 742, 741, a ball (or trackball) 743 for cursor movement, one or more selection buttons 745, a current book button 747 and a bookmark button 749 (see FIG. 14a).

Figure 14A:
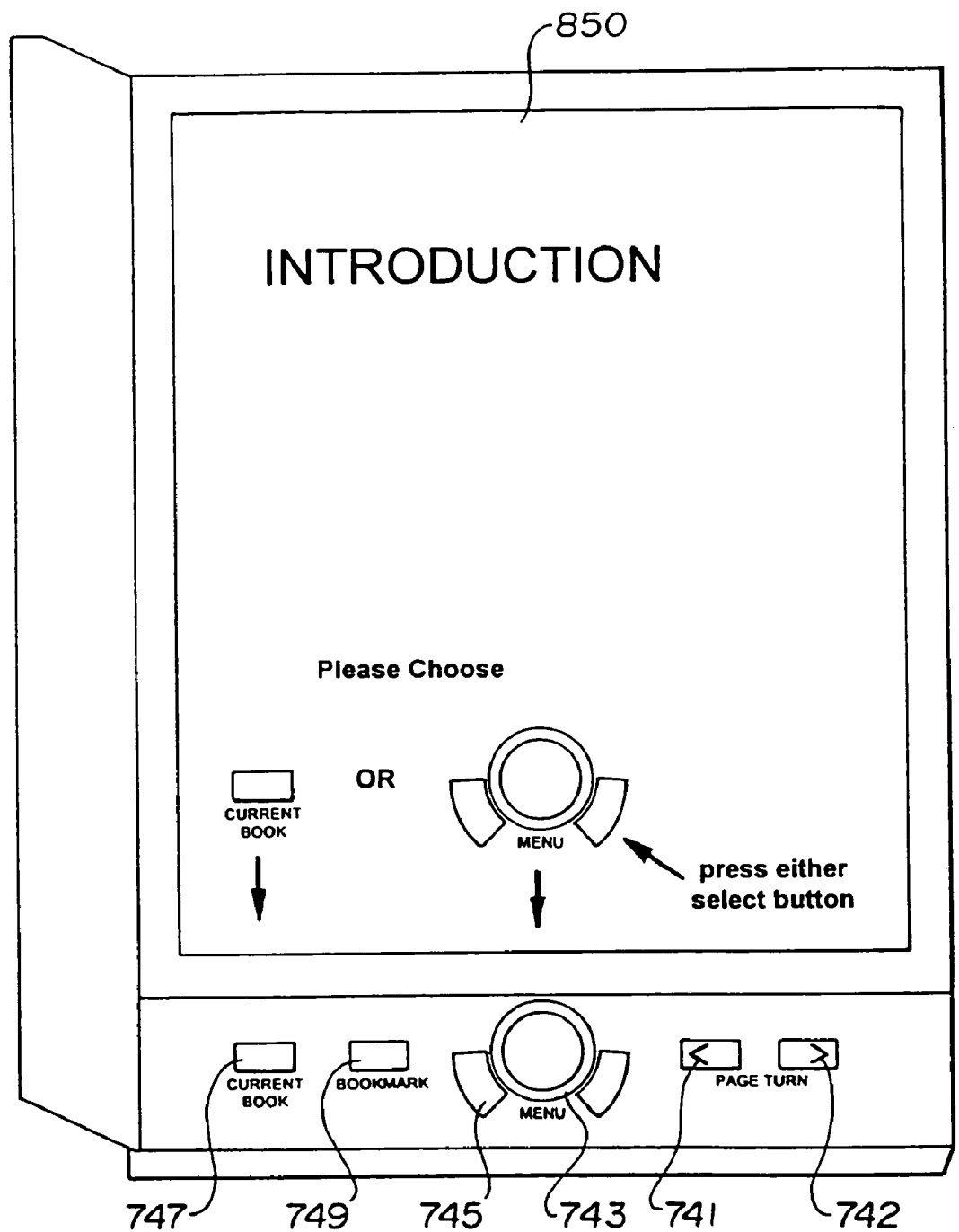
FIG. 14*a* is a schematic of an introductory menu.

The controls 740 should be easy to use and conveniently located. Referring to FIG. 14a, the controls for the viewer 266 may be located below the screen 602 at the bottom portion of the viewer 266. The next page turn button 742 is the most used button 740 and may be located towards the right edge of the page. The subscriber is likely to use right hand thumb movements to work the controls particularly the page turn buttons 741, 742. Therefore, it is preferred that the buttons be arranged in such a manner that the buttons are easily controlled by a subscriber's right thumb. Generally, this can be accommodated either on the lower portion of the viewer 266 (as shown) or along the right hand margin of the viewer 266 (not shown). The current book button 747 and bookmark button 749 are usually the least used of the controls 740. Therefore, in the example shown those buttons 747, 749 are located on the inside portion towards the binder of the viewer 266.

Locating the ball 743 or other cursor movement device (such as four pointer arrows—not shown) in the bottom center of the viewer 266 is both easier for the subscriber to use and easier in manufacturing the viewer 266. The selection buttons for the cursor 745 are preferably located below the middle diameter of the cursor ball 743 on the right and left sides of the ball as shown. If pointer arrows are used for cursor movement, a selection button 745 may be located in the center of the four arrow buttons (not shown). Again, the most used controls should be located where a subscriber's right hand thumb would normally rest.

(5) Book memory 728 for at least one electronic book or more of text is included in the viewer 266. The memory 728 stores text and any graphics which represent pictures in a book. The memory 728 can also store menu graphics data. Two different memory 728 devices may be used in the viewer 266, one for the instructions for the microprocessor 621 in the digital circuitry and a second type of memory may be used for the book memory 728 (and graphics). Various memory devices available on the market may be used such as, ROM, RAM or a small hard disk. Since an electronic book requires approximately 0.6 megabytes of storage, a small hard disk providing approximately 60 MBytes of storage provides memory to store approximately 100 electronic books. The large hard disk drives currently available allow for storage of thousands of electronic books.

Text for books may be displayed in various font sizes. To accommodate various fonts for display, a variety of fonts are stored in instruction 732 or book memory 728. Thus larger or smaller fonts may be recalled from memory 621, 728 to create displays desired by the subscriber.

(6) Power supply circuitry 736 in the viewer 266 will accept power from either an AC power source or from an optional battery 603', or the library unit 262. The power supply circuitry 736 provides the necessary voltages to accommodate the various systems within the viewer 266.

(7) An optional battery 603' is provided in a preferred embodiment. The battery 603' is automatically recharged when AC power is available.

(8) An optional RF transceiver 604 which provided two-way data link between the viewer 266 and other components of the home system can also be included in the viewer 266.

(9) Also, the viewer 266 may include a cellular transceiver for mobile communications.

(10) The optional wired (attached) keyboard 267 and wireless (e.g., RF) keyboard 268 (see FIG. 6a) may be used with the viewer 266 to provide communications between the subscriber and the viewer 266.

(11) The speaker and microphone 608' allow the viewer 266 to provide audio signals to the subscriber, and allow the subscriber to provide an audio input. The speaker and microphone 608' may be used in conjunction with the cellular transceiver 608 or other telecommunications equipment to provide for reception and transmission of telephony and data.

The viewer 266 of FIG. 11 has parts available for providing connections to: a library 744, electronic card memory 748, CD ROM units 752, and a portable memory unit 756 (such as that shown in FIG. 6b 600'). Various electronic memory cards such as PCMCIA can be used with this viewer 266.

Security, low power consumption and excellent display technology are desired features of the viewer 266 design. The viewer 266 should be lightweight and portable. The viewer 266 contains a software operating system that allows electronic books to be stored, read and erased and includes the capability to order electronic books and retain them in memory 728 for a predefined period of time determined by the system operator. The software can be configured to allow the electronic book to be read during a period of time (i.e., two weeks) and then automatically erased, read once and erased, or held in memory permanently. Each viewer 266 has a unique key 605. All of the data storage is encrypted with the key 605 for an individual viewer 266 to prevent more than one viewer 266 accessing the text file or electronic book file.

Figure 12:
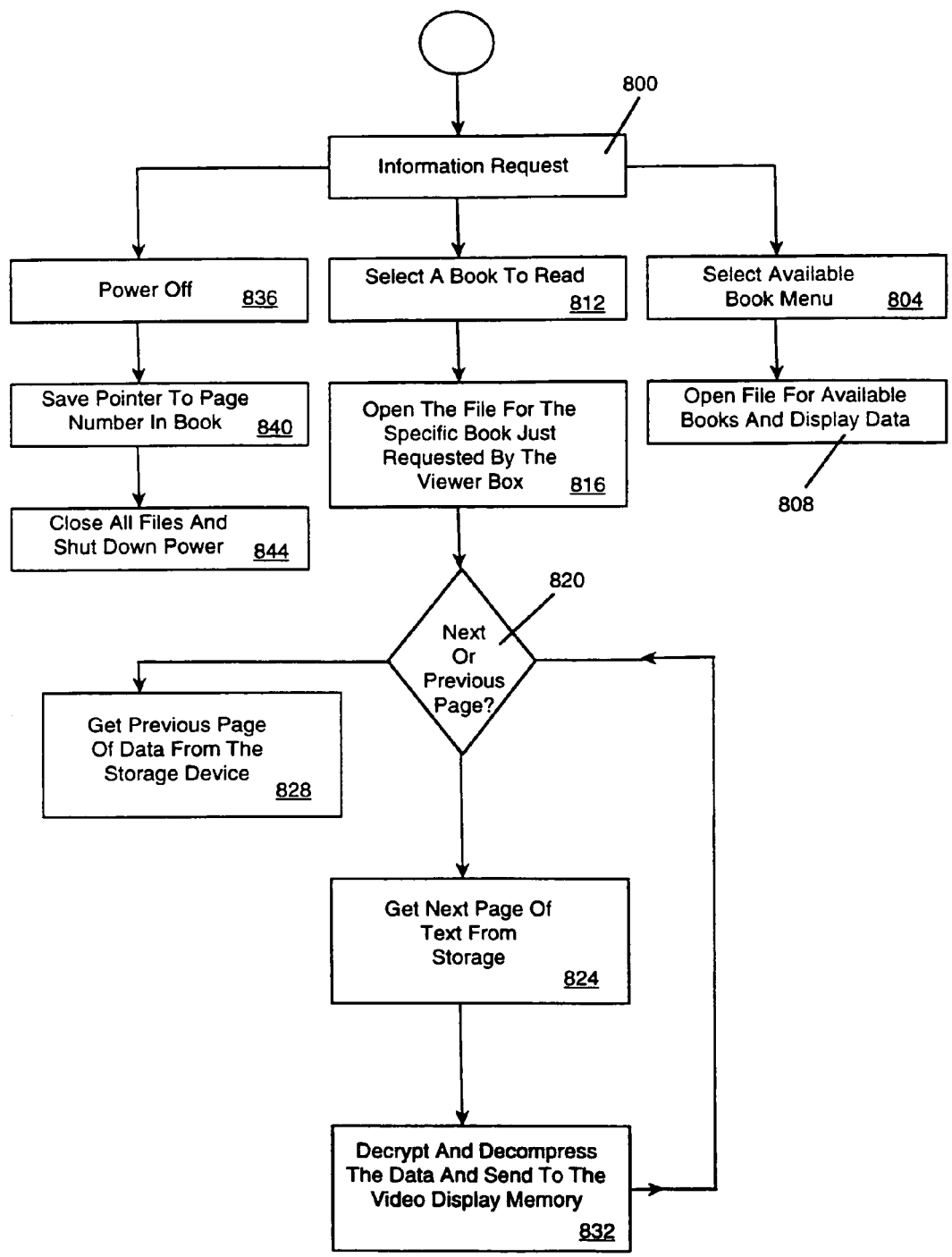
FIG. 12 is a flow diagram of some of the processes performed by the viewer on an information request from a subscriber.

FIG. 12 is a flow diagram of some of the processes executed by the viewer 266. Generally, the viewer 266 receives inputs from the subscriber through touch panel controls 740. Alternately, the viewer 266 receives inputs from a touchscreen display, the attached keyboard 267, or the remote keyboard 268. The subscriber's information requests are then processed through an information request process 800 by the viewer 266.

If the subscriber requests a menu of available electronic books, a select available book process 804 will select a book menu. An open file process 808 will open the electronic files which list the electronic books that are available (related to the category of topic of the menu) and display the menu with the names of the available electronic books.

If the subscriber selects a particular electronic book to read, then a select a book process 812 will process the selection and determine the electronic file that contains the specific electronic book. An open file process 816 will open the file for that specific book and normally access the first page. (If a pointer has already been set in that electronic book's file, the process may default to that page.) A decision process 820 will then determine which page needs to be displayed. The decision process 820 will determine whether a next page, previous page or a book marked page needs to be displayed. If the pointer for the electronic file is not in the correct location then a get previous page process 828 will move the pointer and obtain the previous page of data from the stored file. Otherwise, a get next page process 824 will normally obtain the next page of text from the stored electronic file. A decrypt and decompress process 832 will decrypt and decompress the text data and send the data to the video display. The video display will generally have a video display memory associated with it and the decrypt and decompress process 832 will send the data directly to that video display memory. The circuitry for the display then completes the process of displaying the page of text.

If the subscriber, through the controls 740, requests (from the information request process 800) that the power be turned off, then a process, 836, of turning the power off will be initiated. A save pointer process 840 saves the pointer in memory to the page number in the book that the viewer 266 is currently reading. A close files process 844 closes all the electronic files and signals the power circuitry to shut down the power to the various circuits in the viewer 266. The subscriber may also use the controls 740 to access other electronic files using electronic links embedded in a particular electronic file. An electronic link system will be described later in detail.

With these examples of basic processes the viewer 266 is able to display book selections and display text from those books.

d. Menu System

Figure 13:
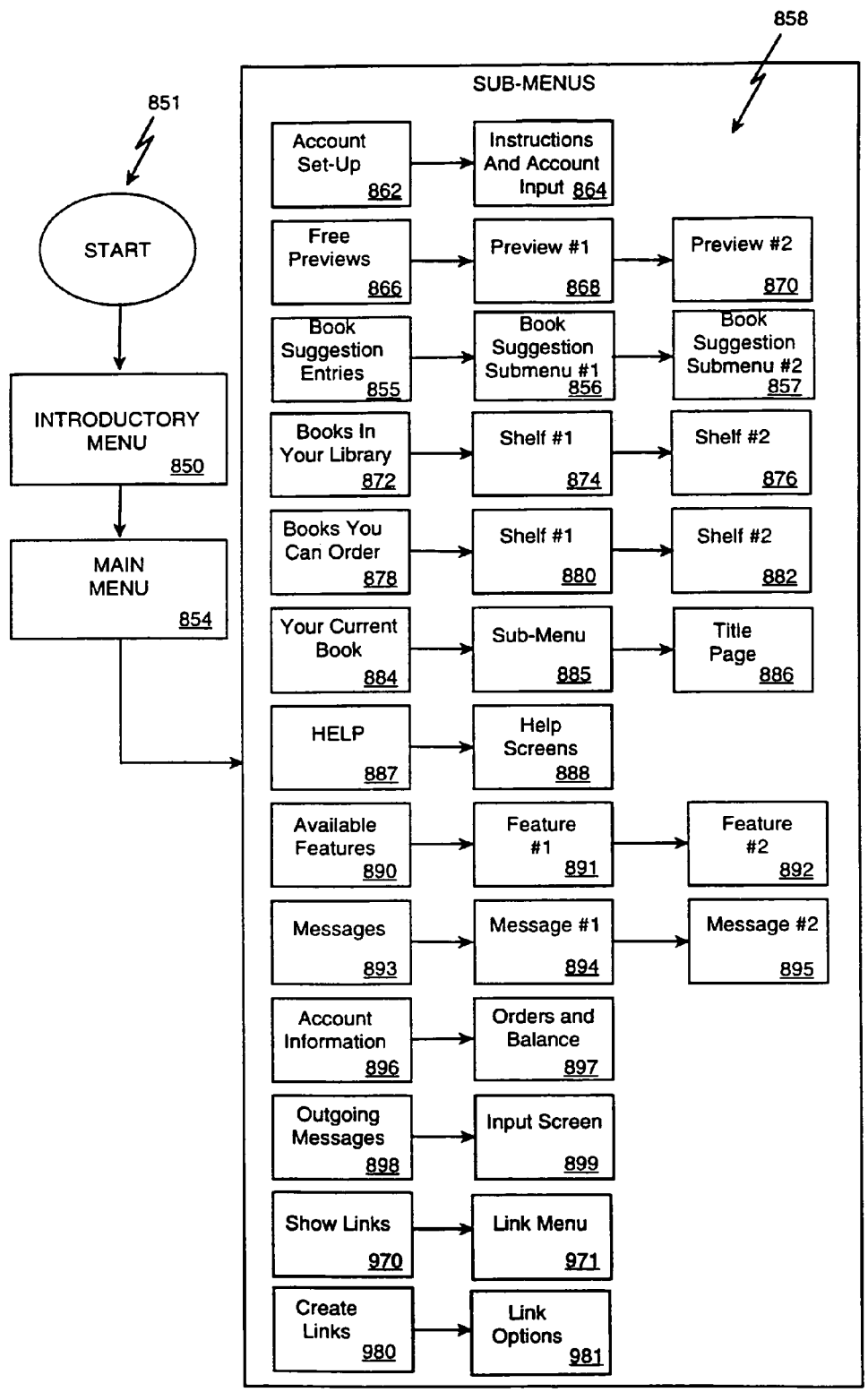
FIG. 13 is a chart depicting the menu structure and sequencing of menus in the menu system.

Referring generally to FIG. 13, the delivery system 200 may have a menu system 851 for selecting features and electronic books from the delivery system 200. The operating software and memory required for the menu system 851 may be located at the viewer 266 (e.g., the instruction memory 732 and/or book memory 728). However, it may also be located at the library unit 262 (e.g., the instruction memory 632) or the library unit 262 and the viewer 266 can share the software and memory needed to operate the menu system 851. Since the menus are usually displayed on the viewer 266 and it is preferred that the viewer 266 be capable of operating in the absence of the library unit 262, the basic software and memory to create the menus is more conveniently located at the viewer 266.

The menu system 851 allows sequencing between menus and provides menu graphics for graphical displays such as on the LCD display 602 of the viewer 266. In a system which uses a set top converter these menus may also be displayed on a television screen. In the simplest embodiment, the menus provide basic text information from which the subscriber makes choices. In more sophisticated embodiments, the menus provide visual displays with graphics and icons to assist the subscriber.

FIG. 13 depicts a menu system 851 with sequencing. The primary menus in the system are an introductory menu 850, a main menu 854 and various submenus 858. In the embodiment shown, there are three levels of submenus 858. In certain instances one or two submenus 858 is sufficient to easily direct the subscriber to the selection or information requested. However, there are features in which three or more submenus 858 make the user interface more friendly for the subscriber. Each level of submenus 858 may consist of multiple possible menus for display. The particular menu displayed depends on the selection by the subscriber on the previous shown menu. An example of this tree sequence of one to many menus are the help submenus 887, 888. Depending upon the specific help requested, a different level two help menu is displayed to the subscriber.

Figure 14B:
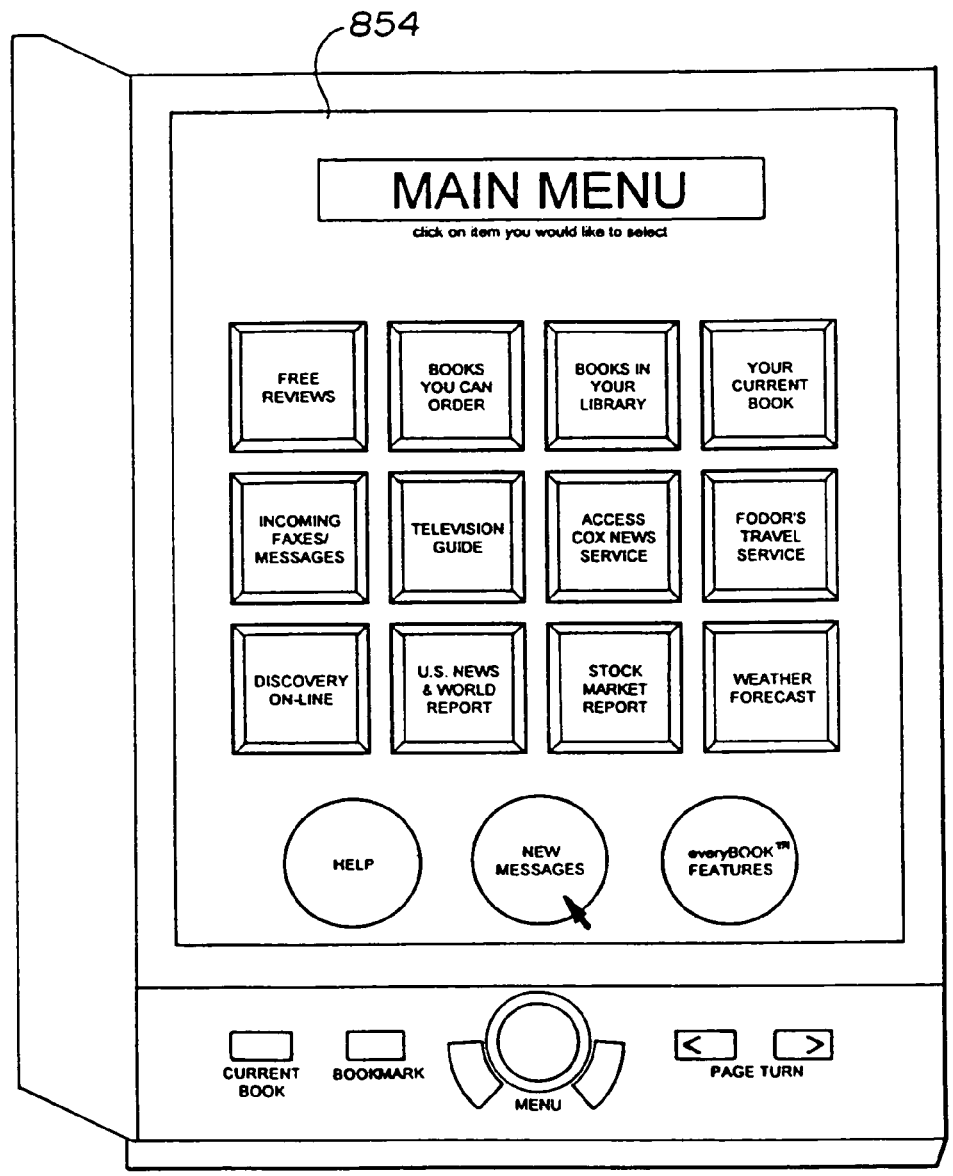
FIG. 14*b* is a schematic showing an example of a main menu.

An example of an introductory menu 850 is shown on FIG. 14a. Generally the introductory menu 850 introduces the viewer 266 to the system and provides initial guidance, announcements and instruction. The introductory menu 850 is followed by a main menu 854, an example of which is shown in FIG. 14b. The main menu provides the viewer 266 with the basic selection or features available in the system. FIG. 14b is an example of a main menu 854 offering many additional features and submenus 858 to the subscriber. For example, FIG. 14b shows that the viewer 266 is able to choose by a point and click method, many options including: (1) free previews, (2) books you can order, (3) books in your library, (4) your current book, (5) help, (6) on-line services and (6) other system features. Following a selection on the main menu 854, a corresponding submenu 858 is shown.

Figure 14C:
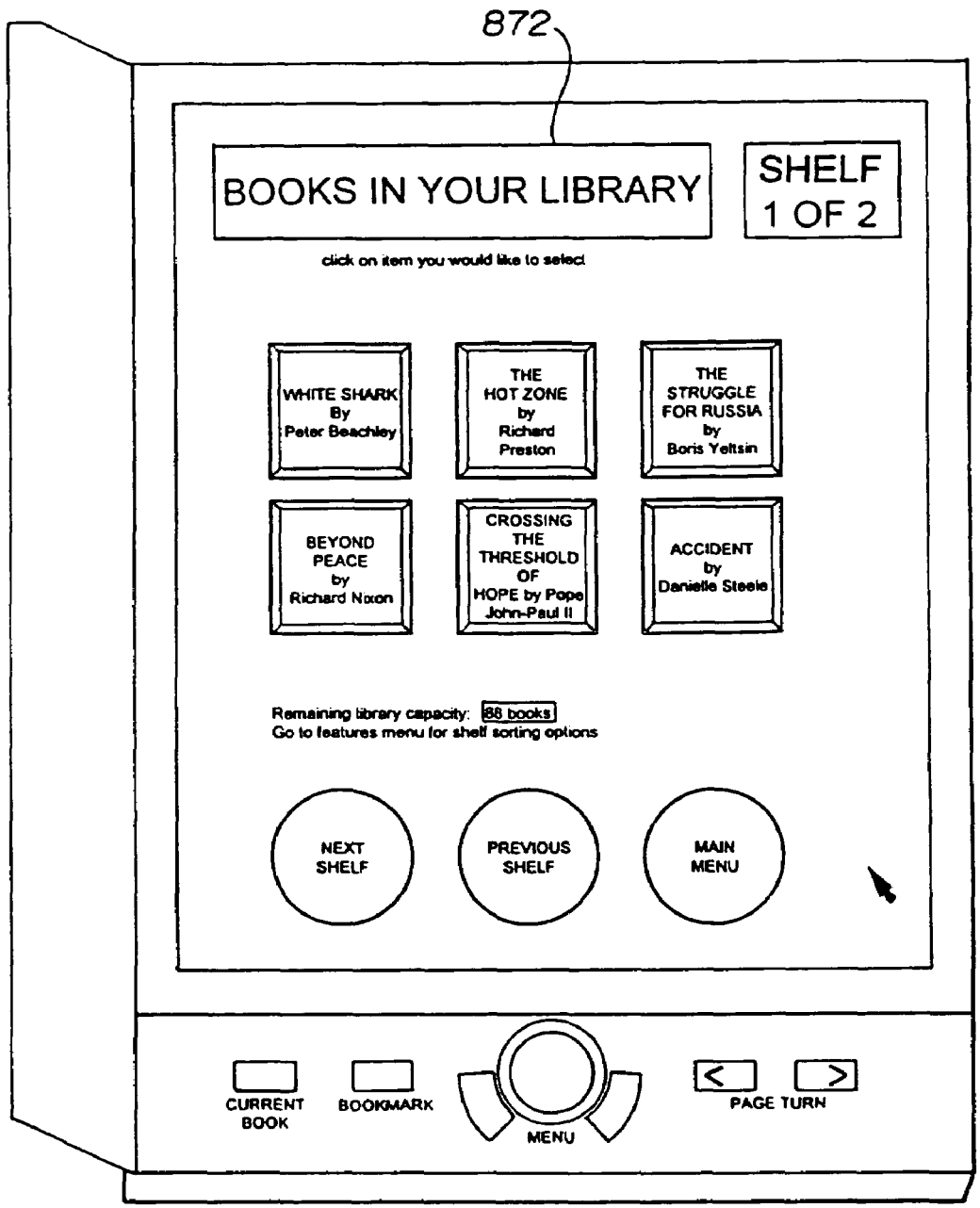
Figure 14D:
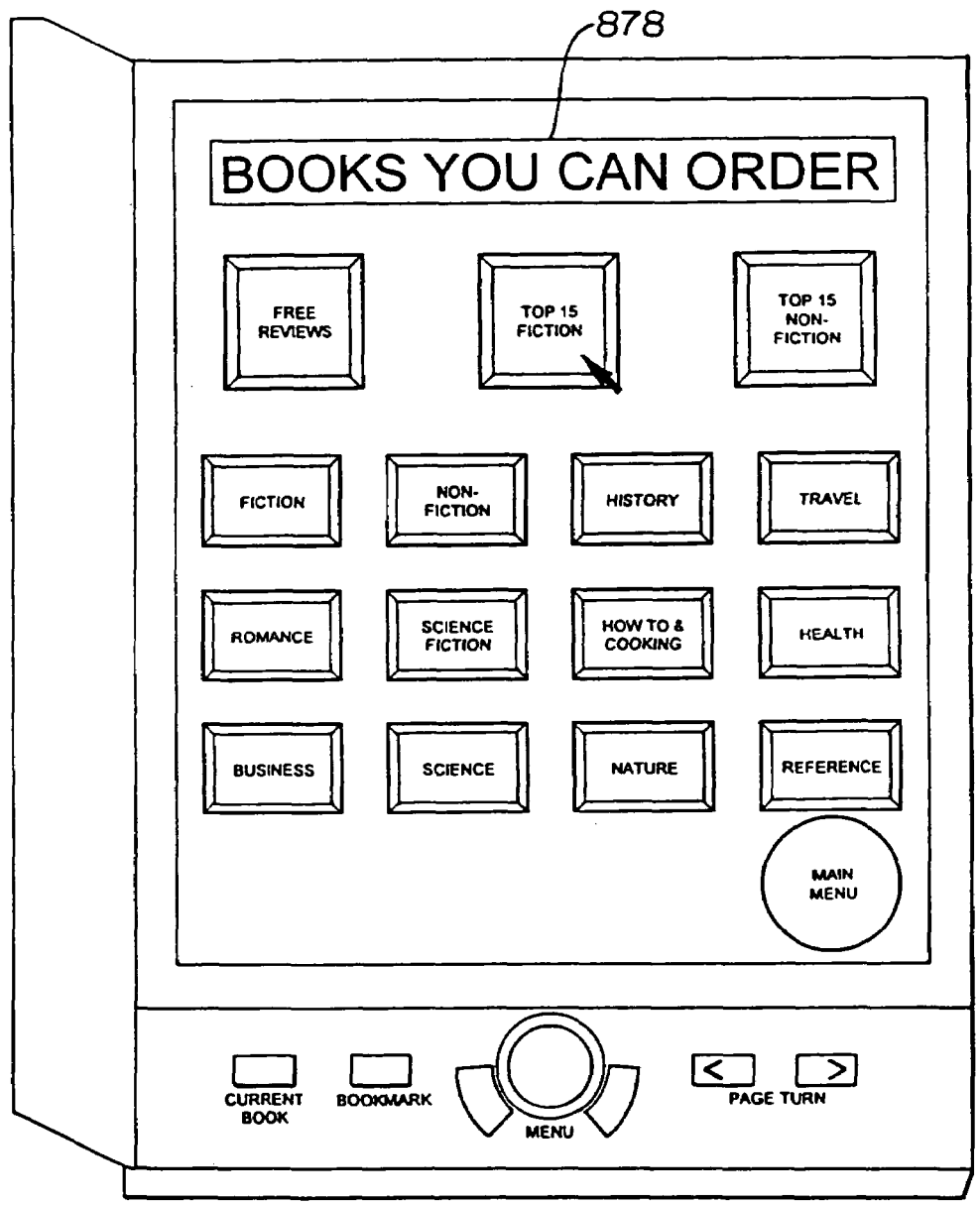
Figure 14E:
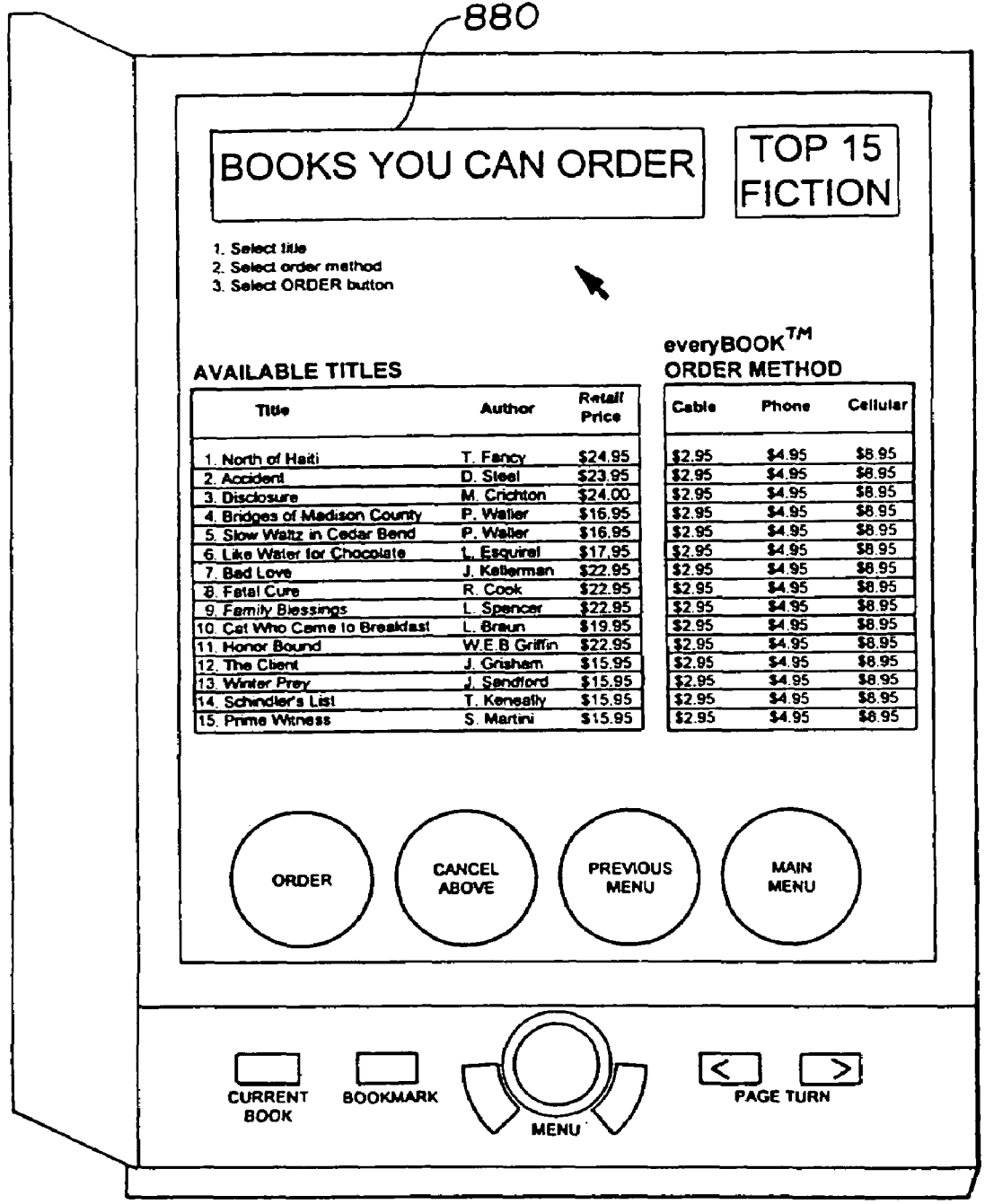

FIG. 13 shows thirteen available primary or first level submenus. They are (1) account set up 862, (2) free previews 866, (3) book suggestion entries 855, (4) books in your library 872, (5) books you can order 878, (6) your current book 884, (7) help 887, (8) available features 890, (9) messages 893, (10) account information 896, (11) outgoing message submenu 898, (12) show links 970, and (13) create links 980. FIG. 14c is an example of a first level submenu for electronic books in your library 872. This "Book In Your Library" example submenu 872 shows six available electronic books by title and author and provides the subscriber with the ability to check a different shelf of books 874 or return to the main menu 854. FIGS. 14d and 14e show example submenus 858 for electronic books that may be ordered using the "Books You Can Order" submenu 878.

FIG. 14f is an example of an order selection and confirmation menu 880', which provides a "soft keyboard" 975 for the subscriber to use in placing an electronic book order and which confirms the subscriber's order. In this particular example, the subscriber is required to enter a PIN number to complete the subscriber's order. The "soft keyboard" 975 could be configured as a full alpha-numeric keyboard, and may be used by the subscriber to add additional information related to a book order. An alpha-numeric or similar password may be used to ensure the subscriber is an authorized subscriber. In an embodiment, the subscriber confirms an order with a PIN or password and then receives a final confirmation screen. The final confirmation screen is primarily text and may state: Your book order is now being processed via CABLE.

Your book will be delivered overnight and your VISA account will be charged $2.95.

Your book will be available for reading at 6:00 AM EST tomorrow. Make sure that:
1. your Library Unit and Cable Connection Unit are plugged in with aerials up tonight; and
2. you tune your cable converter to THE BOOK Channel. The TV set does not have to remain on.

or similar language.

Figure 14G:
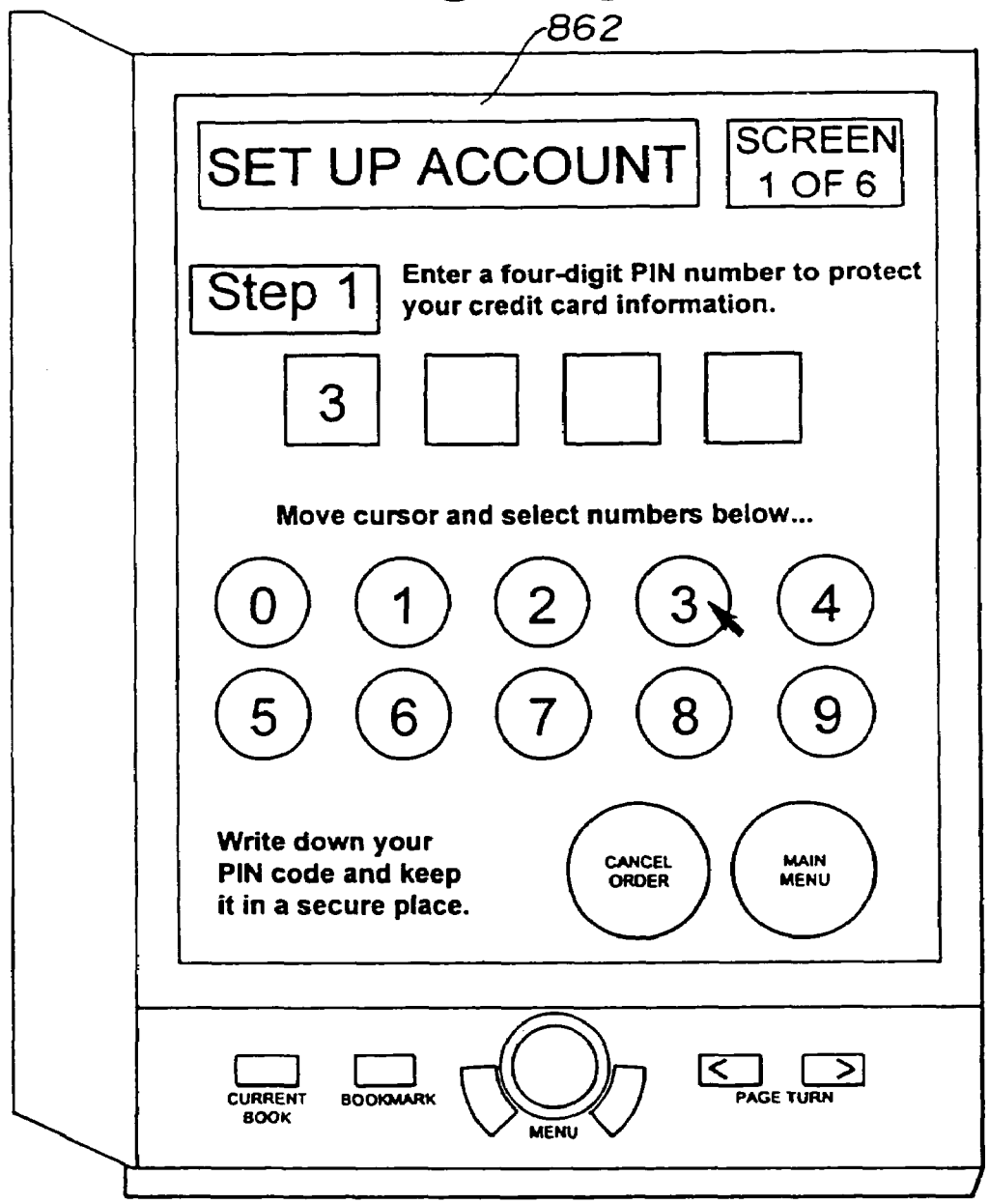
Figure 14H:
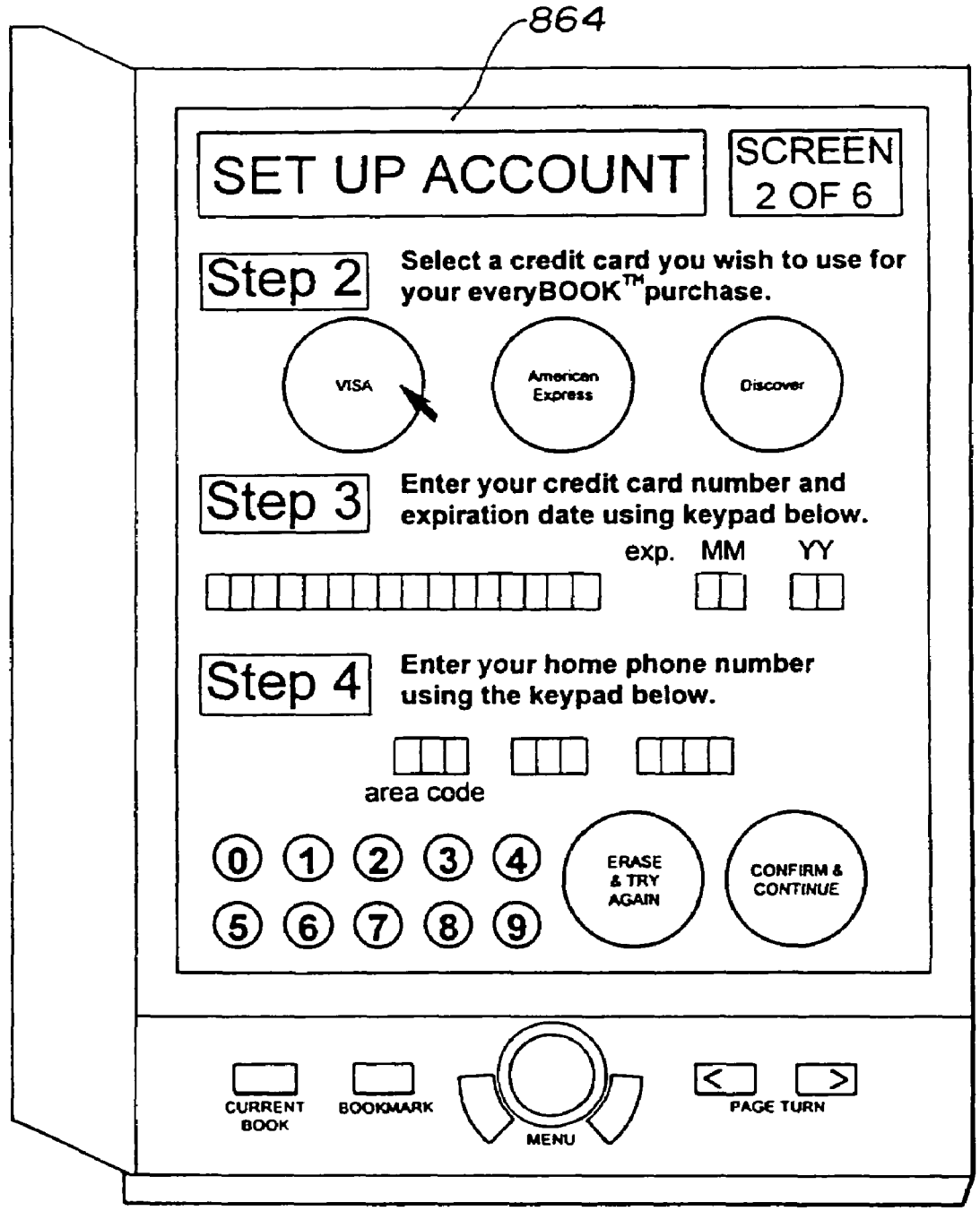

Examples of the "Account Set Up Menu" 862 and further submenus 858 related to account set up (which provide instructions and account input 864) are shown in FIG. 14g and FIG. 14h. These submenus 858 allow initialization of an account at the operations center 250 and orders to be charged to credit cards. The submenus 858 include the ability to enter data related to your desired PIN number or password, credit cards, phone numbers, etc. It is preferred that the account set up be performed using the telephone system. A confirmation menu verifies that the account has been properly set up with the desired PIN or password and credit card.

Figure 14I:
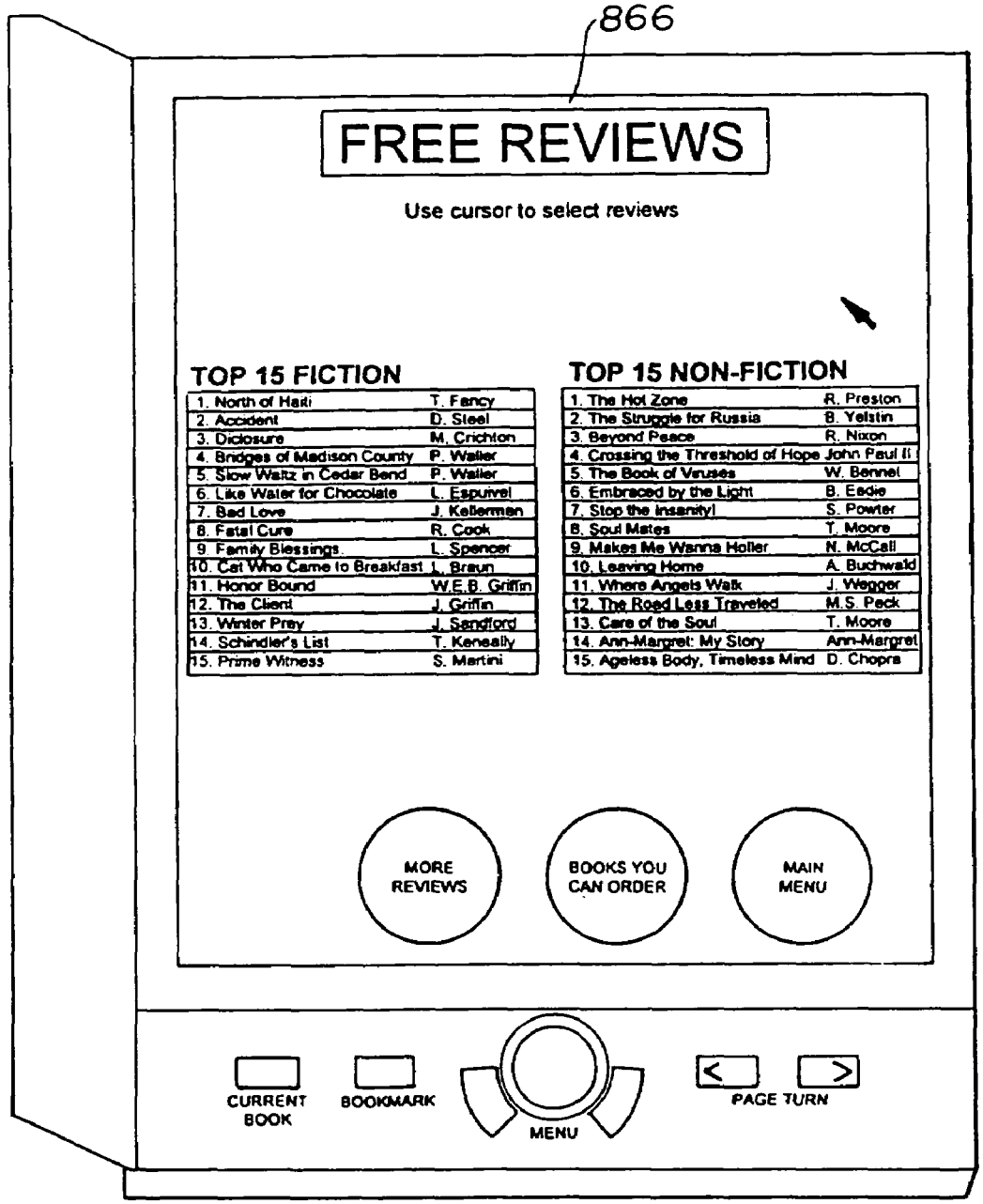
Figure 14J:
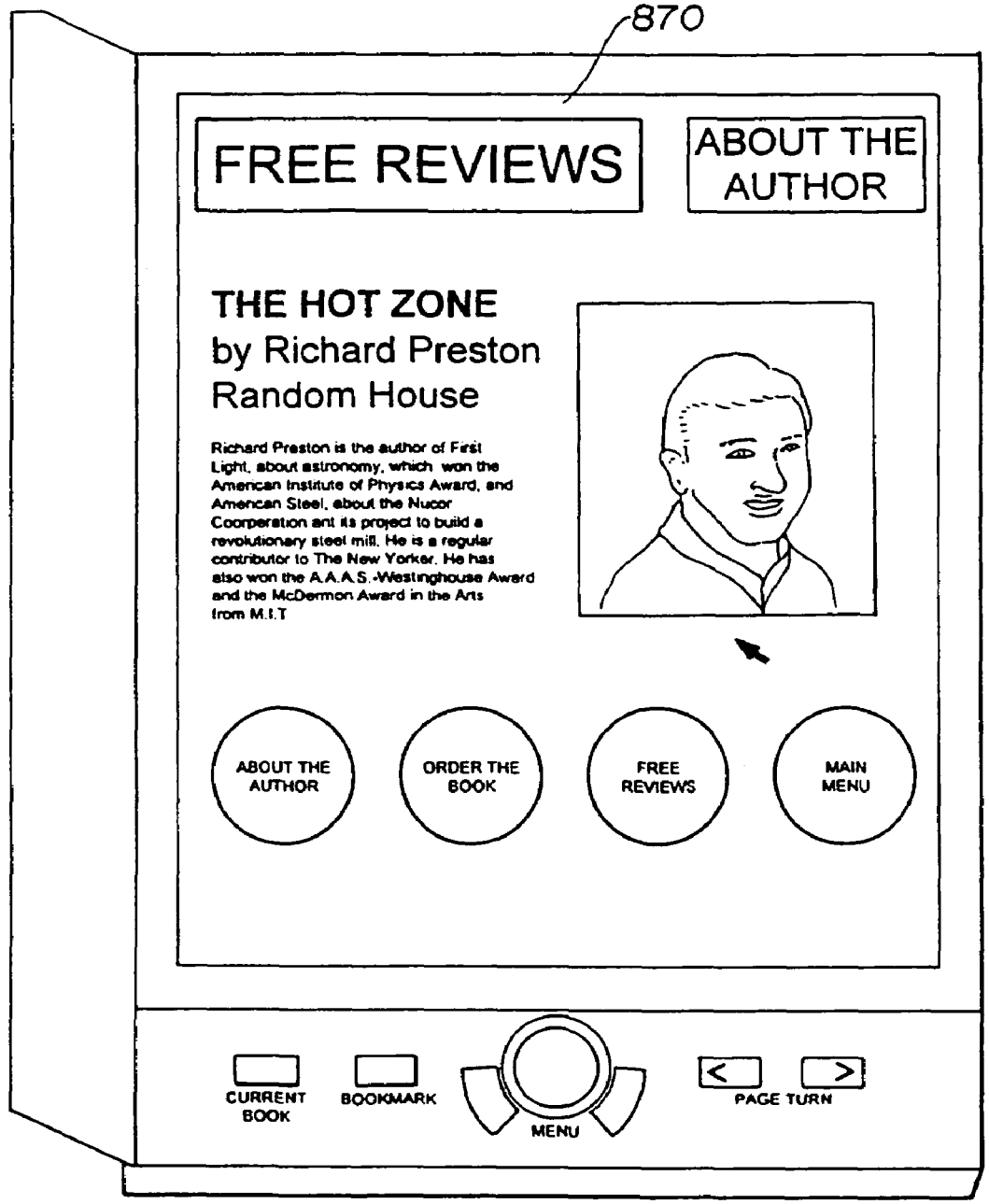

Free previews for books 866 are also provided by submenus (868, 870). Examples of the free preview menus are shown in FIG. 14i and FIG. 14j. FIG. 14i shows a menu depicting various electronic books for which previews are available for viewing. Following an electronic book selection, a screen submenu showing an excerpt of the selected electronic book cover's description is provided along with an excerpt from a critic's review of the selected electronic book. In a preferred embodiment, this preview screen for a particular electronic book also allows the subscriber to select a submenu which provides information about the author. The book preview submenu may also include a still video picture or graphics portraying a book cover or a scene from the electronic book. An example of such a still video picture or graphics is shown in FIG. 14j which depicts a preview screen 870 about the author. The video may also be provided according to MPEG standards as a short moving video clip. Such a clip could be an interview with the author, for example. The author's preview screen 870 shows a picture of the author, provides a short biography, and may allow the subscriber to order the author's books. The price for ordering the authors various electronic books may also be shown on the menu. Alternatively, the previews may be provided through an electronic link system, which is described in detail in copending U.S. application Ser. No. 09/237,828, filed on Jan. 27, 1999, entitled ELECTRONIC BOOK ELECTRONIC LINKS, the disclosures of which is hereby incorporated by reference.

In addition to free previews, in more sophisticated embodiments, the delivery system 200 provides the subscriber with an electronic book suggestion feature (see 855). This is accomplished using the menu system 851 and the processor with associated memory located at the viewer 266, library unit 262 or at the distribution point (1020 or 250). When necessary, information for the program suggestion feature is sent in the text data of the composite or video signal to the home system 258. With this feature, books or authors are suggested to a subscriber based upon historical data of the subscriber's previous orders, demographics or mood of the subscriber, other indicators, and/or by text word searches.

In a book suggestion embodiment, text word searches of preview information (such as book cover descriptions, critics reviews and biographies about the author) and/or text of books or other titles are performed by the library unit 262 using databases stored in the library memory 600. Personalized book or author suggestions are made to the subscriber by obtaining information from the subscriber indicative of general subscriber interests. Subscriber entries are solicited from the subscriber preferably using the electronic book suggestion entries submenu 855. The system uses these subscriber entries either directly or indirectly to search for books or authors to suggest to the subscriber.

Generally, the book suggestion methods may be categorized into two categories, either responsive methods (which respond to a series of subscriber menu entries), or intelligent methods (which analyze data to suggest an electronic book). Using a responsive or intelligent method, the delivery system 200 determines a list of suggested titles or authors and creates a second or third level submenu 856, 857 to suggest the titles for subscriber selection.

Responsive methods of suggesting titles include, for example, the use of mood questions, searching for authors, and keyword searching. Using the instruction memory 732 and menu generation hardware (e.g., 607) of the viewer 266, a series of mood questions can be presented on menus to determine a subscribers interest at a particular time. For this methodology, the operations center's 250 processor 404 and instruction memory 416 assign each title mood indicators (and subindicators) from a group such as light, serious, violent, short, long, dull, exciting, complex, easy-read, young theme, old theme, adventure, romance, drama, fiction, science-fiction, etc. These indicators are sent to the home system 258 with the text data and are stored in library memory 600. Based upon the subscriber entries, the processor 404 associates a set of indicators with the subscriber's request and a set of electronic books with matching indicators are located for suggesting to the subscriber.

Responsive searches for authors or keywords (a search word provided by the subscriber) are generally performed by the library processor 628 and instruction memory 632 on data stored in the library memory 600. For example, a keyword given by the subscriber may be searched for a match in library memory 600 storing the book reviews, critics and previews databases. Thus, if a subscriber provided an entry of the word "submarine" on an appropriate submenu, the title "Hunt For Red October" may be located by the library processor 628 using instruction from a routine in the instruction memory 632.

Intelligent methods of suggesting programs include analyzing personal profile data on the subscriber and/or historical data about the subscriber such as past books ordered by the subscriber (or buy data). This method is preferred in a book on demand system and can be performed at the distribution point or operations center 250 by the on-site processor 404 using subscriber databases stored in memory 428. The home system 258 receives the text data including program suggestion information from the distribution point or operations center 250 and generates the program suggestion submenus 855, 856, 857 using the same text data receiving 212 and viewer menu generation hardware (e.g., 607, 621) described above. Software routines and algorithms stored in instruction memories (e.g. 632, 732) are used to analyze historical data and book ordered data to determine a line of books to suggest to the subscriber.

The algorithms for this powerful feature of suggesting books or authors to subscribers are disclosed in great detail in U.S. Pat. No. 5,559,549, entitled REPROGRAMMABLE TERMINAL FOR SUGGESTING PROGRAMS OFFERED ON A TELEVISION PROGRAM DELIVERY SYSTEM, issued Sep. 24, 1996, and are incorporated herein by reference.

Referring to FIG. 13, submenus 858 are shown on the "Books In Your Library" submenu 872 and are preferably broken into shelf numbers with submenus for each shelf 874, 876. The submenus 858 for the "Books You Can Order" submenu 878 is similarly broken out into submenus by shelves 880, 882. These shelves may each be a category or genre of books. Electronic books may be grouped into categories such as best sellers, novels, fiction, romance, etc. See FIG. 14d.

Referring to FIG. 13, the submenu 858 for "Your Current Book" 884 allows a subscriber to select a current book 884 and then determine what page to view. This selection is confirmed with a level two submenu 885. The help submenu 887 provides the subscriber with additional help screens 888. The submenus 858 for available features 890 are preferably broken out into a sequence of separate submenus for each feature 891, 892.

Referring to FIG. 13, messages can also be sent with the delivery system 200. A level one message screen provides the subscriber with the ability to select from various messages the subscriber has pending 893. Each message is then shown on a separate submenu screen 894, 895. The message may contain text and graphics.

Referring to FIG. 13, account information is shown on a level one submenu 896 and then follow-on submenus 858 show the recent orders and your account balance 897. There is also a level one submenu for outgoing messages 898 which has a follow-on submenu used as an input screen 899.

In addition to the specific features and submenus described in FIG. 13 and FIG. 14a through FIG. 14j, many other variations and features are possible. When a book is finally selected for viewing the title page 886 will appear on the screen followed by a page of text.

III. The Billing and Collection System

The billing and collection system 278 (shown in FIGS. 2 and 3) utilizes the latest technology in electronic transaction and telephone switching to track orders, authorize deliveries, bill consumers, and credit publishers automatically. The telephone calls initiated by the phone connector 270 are received by the billing and collection system 278 which responds immediately without human intervention by placing the order and charging the consumers credit card account. Data is compiled periodically and publishers 282 are credited for sales of their books or other text. The billing and collection system 278 may also connect with subscribers through two-way cable connections, cellular, or other communication means.

In an embodiment, the billing and collection system 278 communicate with the operations center 250 to track changes in available books and to provide statistical data to the operations center 250.

IV. Public Library, School, and Bookstore System

Figure 15:
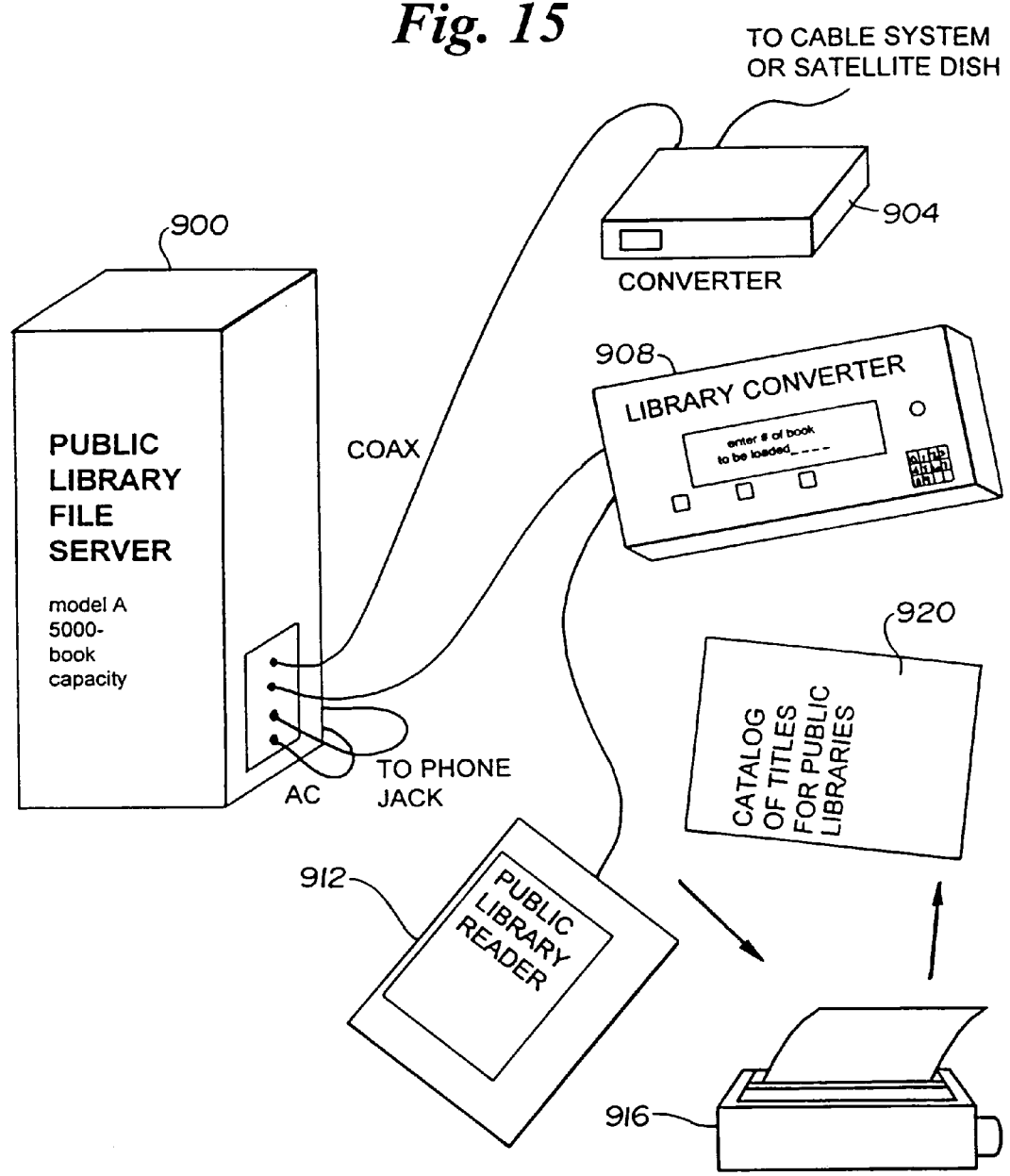
FIG. 15 is a schematic diagram of an electronic book system for a bookstore or public library.

The electronic book system can be modified to be used at public libraries, schools and bookstores. FIG. 15 shows one possible arrangement of components for a public library, school or bookstore location. The main unit at a public library, school or bookstore is the file server 900. The file server 900 is a large electronic memory unit that can store thousands of electronic books. Various electronic storage means may be used in the file servers, such as hard disks, read-write CD ROMs and read-only CD ROMs.

The system comprises five components; the file server 900, a converter or video connector 904, a controller 908, a viewer 912, and a catalog printer 916. The software for controlling the system is primarily located in the controller 908. The converter or video connector 904 is similar to those described above. In this configuration the controller unit 908 monitors the data being transferred to the file server 900 by the converter 904. The controller 908 is preferably provided with a viewing screen and several control buttons. When it is necessary to have a larger screen to perform more sophisticated controlling of the system a viewer 266 may be connected to the controller 908 and the viewer screen and controls 740 may be used.

The controller 908 is only able to download books to public viewers 912 which are authorized to receive books from the particular file server 900. For security reasons it is not desirable that the public viewer 912 have access to more than one file server 900. In this way, security can be maintained over the text data for books. It is preferred that the public viewer 912 be limited to receiving one or two electronic books at a time from the controller 908. When the subscriber of the public viewer 912 needs a new or additional electronic book, the subscriber returns the viewer 912 to the school or public library where the subscriber receives a new electronic book from the controller 908.

In order to track the electronic books that are available on the file server 900, the titles of the available books may be printed on a catalog printer 916. The catalog printer 916 is connected to the library controller 908 and the titles of the electronic books are downloaded to the catalog printer 916. None of the coded text for any of the electronic books can be printed using the controller 908 and catalog printer 916 of this system. In order to maintain security over the data, none of the electronic book data is allowed to be downloaded to the printer 916. Once a complete printout of available electronic book titles, magazines, or other textual material is complete, a hard copy of the catalog 920 can be maintained at the file server 900.

The system shown may also be used at bookstores. The bookstores can rent the public viewer 912 to customers with the text for one or two electronic books loaded onto the public viewer 912. The public viewer 912 may be provided with an automatic timeout sequence. The timeout sequence would erase the textual data for the books after a certain period of time, for example, two weeks. It is expected that after a period of time (perhaps within two weeks) the renter would return the public viewer 912 to the bookstore and receive additional electronic books for viewing. Using this arrangement, it is also possible for the bookstore to (permanently) sell a viewer 912 to a regular customer. The customer then returns to the bookstore from time to time to receive textual data for an electronic book which the customer can then store permanently on the customer's own viewer 912. Various other configurations are possible for bookstores, schools and public libraries using the file server 900 and public viewer 912 described.

V. Use of a Set Top Converter

Existing set top converters such as those made by Scientific Atlanta or General Instruments are presently unequipped to handle the delivery system 200 of the present invention. Although set top converters may be built which include the library functions, hardware modifications are necessary in order to use the delivery system 200 with existing set top converter technology.

Figure 16A:
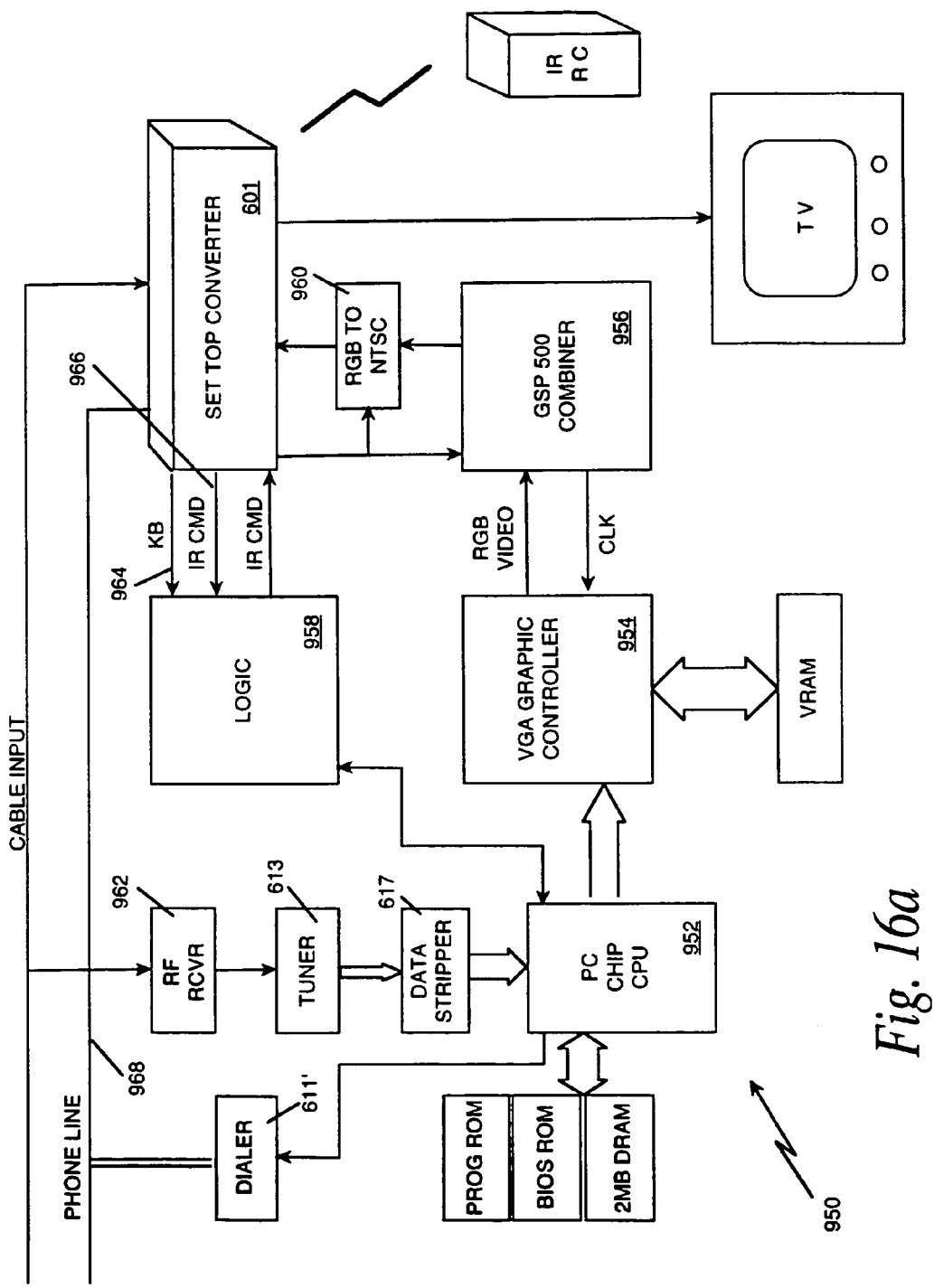
FIG. 16*a* and FIG. 16*b* are schematics of hardware modifications or upgrades to a set top converter.
Figure 16B:
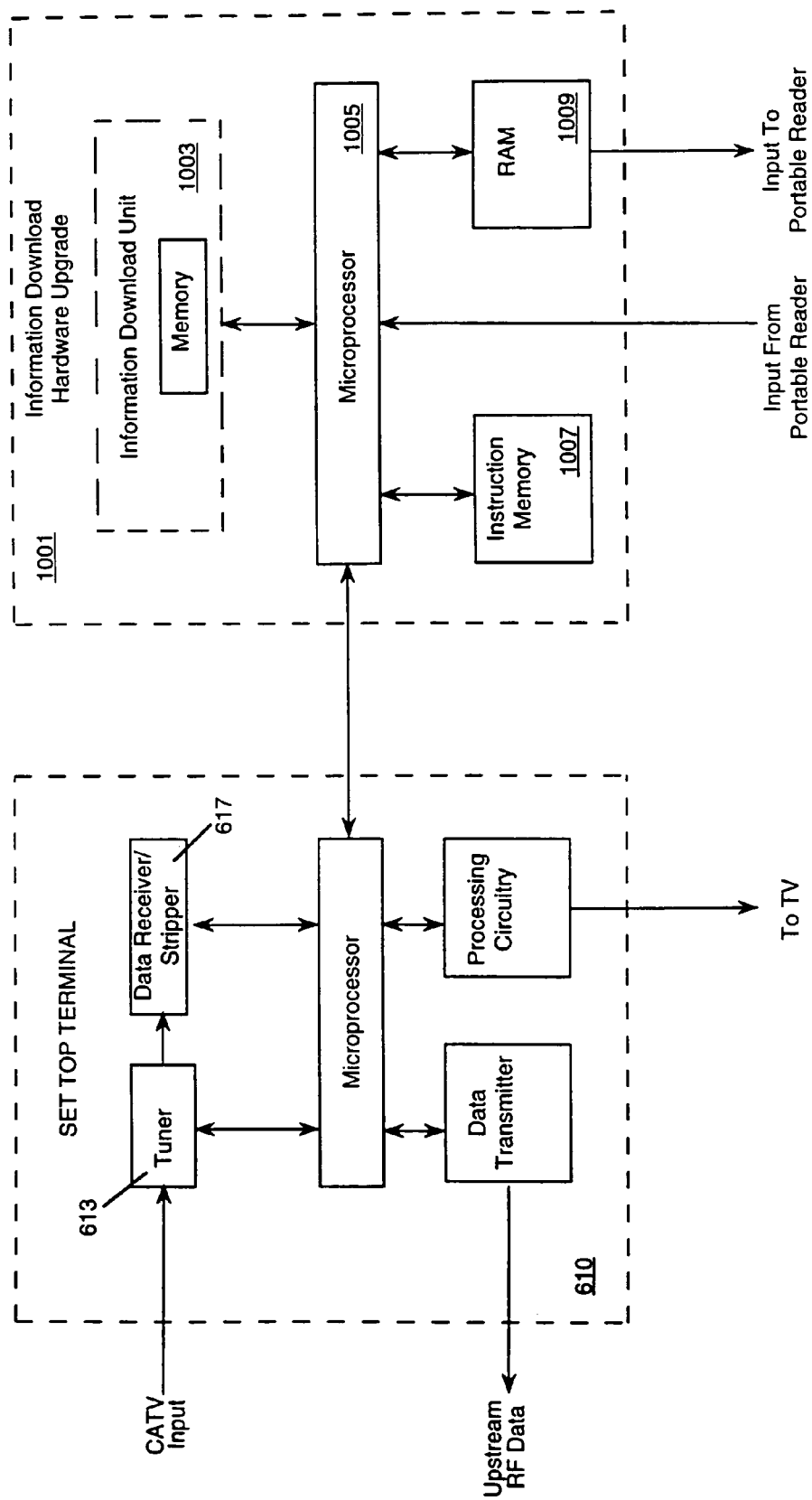

FIGS. 16a and 16b are examples of hardware modifications or upgrades. A port is used to attach hardware upgrades described below to a set top terminal. Two upgrades are possible to set top converters 601 to assist in receiving and selecting electronic books. A menu generation card upgrade (FIG. 16a) and an information download unit (FIG. 16b). Each of these upgrades may be connected to the set top terminal unit through an upgrade port. A four wire cable, ribbon cable, IEEE 1394 firewire interface, USB interface, or the like may be used to connect the upgrade to the set top converter 601.

A card addition 950 to a set top converter 601 is depicted in FIG. 16a. The card 950 shown provides the additional functionality needed to utilize the book selection system with existing set top converter 601 technology. The card 950 may be configured to slip inside the frame of a set top terminal and become part of the set top terminal, an advanced set top terminal. The primary functions the card 950 adds to the set top converter 601 are the interpreting of data signals, generating of menus, sequencing of menus, and, ultimately, the ability of the subscriber to select an electronic book using either the television or a viewer 266. The card 950 also provides a method for a remote location, such as the cable headend, to receive information on electronic books ordered. The electronic books ordered information and control commands may be passed from the cable headend to the card 950 using telephone lines.

The primary components of the card 950 are a PC chip CPU 952, a VGA graphic controller 954, a video combiner 956, logic circuitry 958, NTSC encoder 960, a receiver 962, demodulator (not shown), and a dialer 611'. The card 950 operates by receiving the data text signal from the cable headend through the coaxial cable. The logic circuitry 958 of the card 950 receives data 964, infrared commands 966, and synchronization signals (not shown) from the set top converter 601. Menu selections made by the viewer 266 on the remote control are received by the set top converter's 601 IR equipment and passed through to the card 950. The card 950 interprets the IR signal and determines the electronic book (or menu) the subscriber has selected. The card 950 modifies the IR command to send the information to the set top converter 601. The modified IR command contains the channel information needed by the set top converter 601. Using the phone line 968 and dialer 611', the card 950 is able to transmit electronic books ordered information to the cable headend. It is also possible to receive the electronic books over the telephone lines and by-pass the video distribution system. In this embodiment, the telephone system may be used to provide access to an Internet web site to order and receive electronic books.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In a preferred embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

The information download hardware upgrade 1001 (shown in FIG. 16b) allows the subscriber to download large volumes of information from the operations center 250 or cable headend using the set top converter 601. The hardware upgrade 1001 will enable subscribers to download data, such as electronic books and magazines, to local storage. Primarily, the hardware upgrade 1001 is an additional local storage unit 1003 (e.g., hard disk, floppy, optical disk or magnetic cartridge and may include a microprocessor 1005, instruction memory 1007, and a random access memory 1009, as shown in FIG. 16b). Preferably, a small portable viewer 266 is also provided with the upgrade 1001 to enable downloaded text to be read without the use of a TV.

The downloadable information may be text or graphics supplied by the operations center 250 or cable headend. With this upgrade, electronic books may be downloaded and read anywhere with the portable viewer 266. Using this upgrade, books may be downloaded and stored in compressed form for later decompression. The electronic books would be decompressed only at the time of viewing. Important text that the public desires immediate access may made available through this system. Text such as the President's speech, a new law, or a recent abortion decision rendered by the Supreme Court may be made immediately available.

In an embodiment, electronic book ordering information is stored at each set top terminal until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used.

Figure 17:
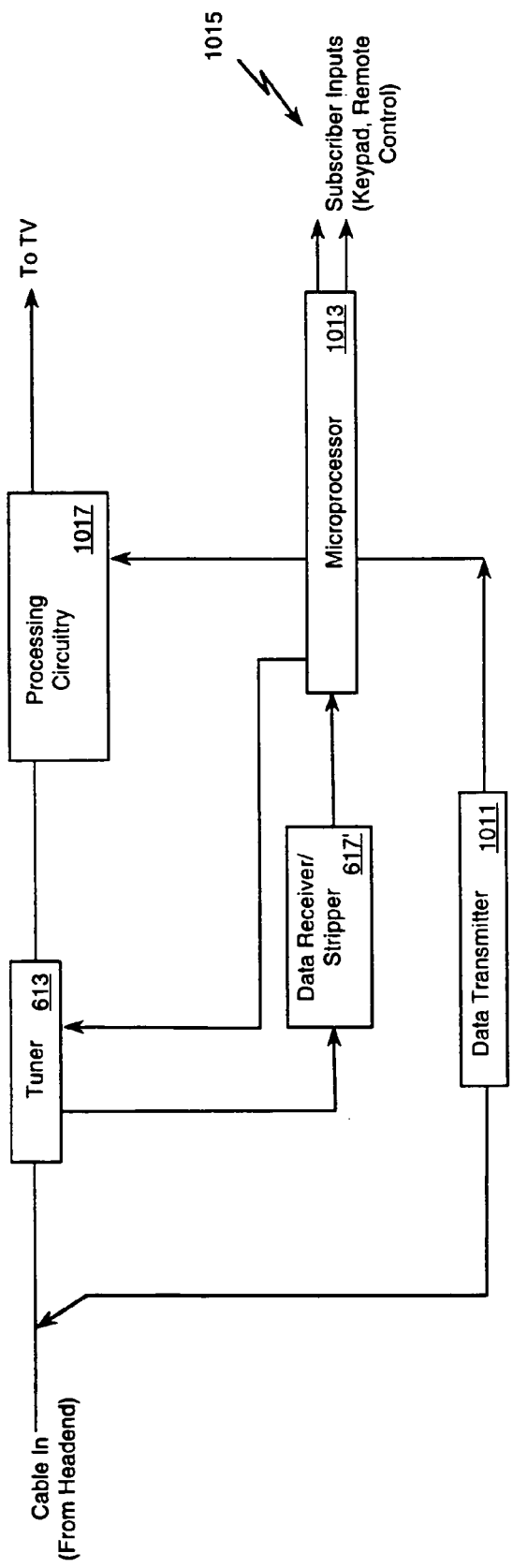
FIG. 17 is a schematic showing a set top terminal that includes a data receiver and data transmitter.

FIG. 17 shows a preferred set top converter that includes a data receiver 617' and a data transmitter 1011. The data transmitter provides upstream data communications capability between the set top converter 601 and the cable headend. Upstream data transmissions are accomplished using the polling system described and, using a data transmitter 1011. Both receiver 617' and transmitter 1011 may be built into the set top converter 601 itself or added through an upgrade module. Regardless of the specific hardware configuration, the set top terminal's data transmission capabilities may be accomplished using the hardware shown in FIG. 17.

FIG. 17 shows RF signals, depicted as being received by a data receiver 617' and tuner 613 working in unison. Both of these devices are interfaced with the microprocessor 1013, which receives inputs 1015, from the subscriber, either through a set top converter's keypad, a remote control unit or the viewer 266. All cable signals intended for reception on the subscriber's TV are accessed by the tuner 613 and subsequently processed by the processing circuitry 1017. This processing circuitry 1017 typically includes additional components (not shown) for descrambling, demodulation, volume control and remodulation on a Channel 3 or 4 TV carrier.

Data targeted to individual set top converters is received by the data receiver 617' according to each set top converter's specific address or ID. In this way, each addressable set top converter only receives its own data. The data receiver 617' may receive set top converter 601 specific data in the information field of the signal frame described or on a separate data carrier located at a convenient frequency in the incoming spectrum.

The received data includes information regarding electronic books and menus available for selection. The subscriber may enter a series of commands 1015 using a keypad or remote control in order to choose an electronic book or menu. Upon receipt of such commands, the microprocessor 1013 instructs the tuner to tune to the proper frequency of the channel carrying data and subsequently instructs the processing circuitry 1017 to begin descrambling of this data.

Upon selection of the electronic book, the microprocessor 1013 stores any selection information in local memory (not shown) for later data transmission back to the cable headend. The microprocessor 1013 coordinates all CATV signal reception and also interacts with various upstream data transmission components. Typically, the data transmitter 1011 operates in the return frequency band between 5 and 30 MHZ. In an alternative embodiment, the frequency band of 10 to 15 MHZ may be used. Regardless, however, of the frequency band used, the data transmitter 1011 sends information to the cable headend in the information field of the response frame described. Those skilled in the art will recognize that a number of variations and combinations of the above-described set top terminal hardware components may be used to accomplish upstream data transmissions.

VI. Books-on-Demand System

Figure 18A:
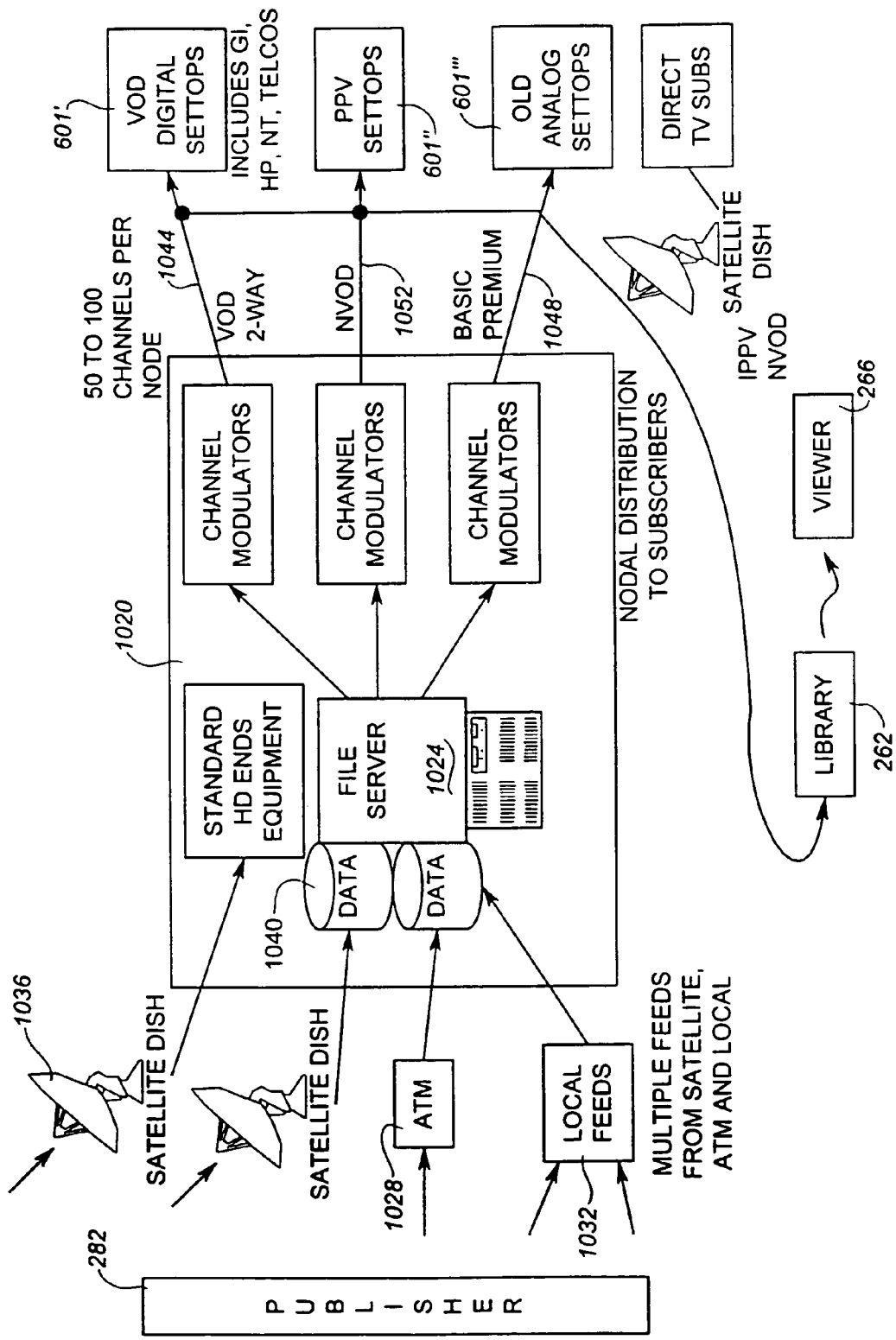
FIG. 18*a* is a schematic of a book-on-demand system.

The electronic book system 200 described may also be configured in a book-on-demand style. FIG. 18a shows one example of a configuration for a books-on-demand system. A books-on-demand system requires more powerful two-way communications between the consumer's home, bookstore, school or public library and either the operations center 250 or a distribution site 1020 such as the cable headend. This type of two-way communication can be provided by the hardware shown in FIG. 17 and described above.

Referring to FIG. 18a, in a books-on-demand system, the subscriber selects the electronic book to be download from an available menu of electronic books (see for example FIGS. 14d and 14e). The data for menus of available books is usually sent to the subscriber location by the distribution site 1020. After the subscriber's menu selection, information about the subscriber selection (or request) is then communicated to either a distribution point 1020 (such as a cable headend or an Internet web site) or the operations center 250. Upon receipt of this request, the needed textual and graphical information for the book is spooled and sent to the subscriber. In this manner, books are only sent when requested by the subscriber and are sent immediately upon demand for the book (or text).

In order to support such a books-on-demand system, the text delivery and distribution must be conducted on a strong nodal architectured distribution system, such as, a video-on-demand cable or telephone television system, an Internet web site, or through use of individual telephone access on the public telephone system.

The books-on-demand system allows for a greater selection of electronic books to the subscriber and limits the amount of communicated book data that is unnecessary or unneeded. It also provides the electronic book to the subscriber in a much timelier fashion.

In addition to a stronger distribution system, a books-on-demand system requires a distribution point 1020 to have more sophisticated equipment to access and "spool out" the textual information. This can be accomplished using file server technology 1024 for storing the electronic books and ATM 1028 or telephone-type switching (not shown) to distribute the textual information. The file server 1024 and distribution technology that can be used in configuring such a books-on-demand system is described in U.S. Pat. No. 5,262,875 and U.S. Pat. No. 5,218,695, cited above.

FIG. 18a shows an embodiment for a books-on-demand system that utilizes file server technology. In addition to electronic books, the embodiment of FIG. 18a will support distribution of nearly any digital data. Electronic books or textual files are received from publishers 282 and other sources through local feeds 1032, ATM 1028, or by satellite dish 1036. The data is then stored in memory 1040 at the file server 1024. The distribution point 1020 may be a cable headend that receives requests from subscribers and delivers text to subscribers over a two-way communication system (such as a video-on-demand system (VOD) 1044). Alternately, an Internet web site may serve as the distribution point 1020.

The library unit 262 can be connected to either a basic premium-type service cable system 1048, a near video-on-demand type cable system (or pay-per-view (PPV) 1052) or a video-on-demand cable system 1044. In connecting with either of these three systems the library unit 262 may access the cable directly or may access the system through a set top terminal 601', 601", or 601'''.

Using the two-way video-on-demand system 1044, a subscriber is able to request a specific electronic book title and receive that text immediately following its request. To accomplish this, the distribution point 1020 transmits a list of available electronic books through the cable delivery system to the library unit 262. The library unit 262 displays the list of available electronic books on a menu or similar format. As described earlier, it is preferred that the library unit 262 use menus which list categories of available electronic books to form its request from the distribution point 1020. After selecting an electronic book, the library unit 262 sends a request signal on the two-way communication system 1044 back to the distribution point 1020. This request signal can be handled in two ways. The library unit 262 either initiates the request or the distribution point 1020 polls the various libraries on to the two-way system 1044. Upon receiving the request for the electronic book title, the text associated with that book title is transmitted to the library unit 262 using the two-way cable system 1044.

Figure 18B:
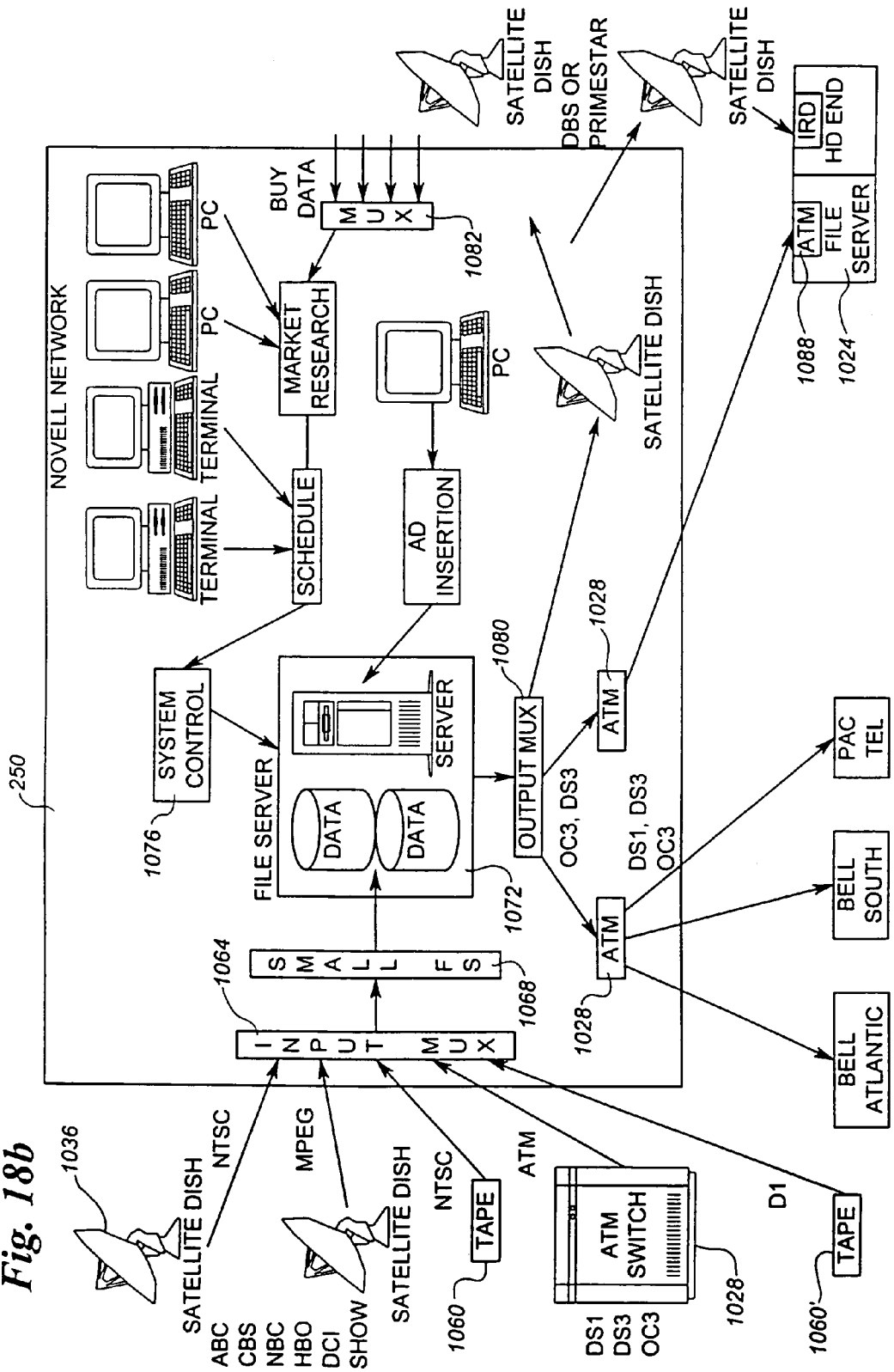
FIG. 18*b* is a schematic of an operations center supporting a book-on-demand system.

FIG. 18b is an expanded view of a preferred operations center 250 that supports a regional or national books-on-demand system. In fact, the operations center 250 shown supports distribution of nearly any digital data. The operations center 250 supports multiple feeds to receive digital information by tape 1060, 1060', ATM 1028, or satellite 1036. The information is processed through an input MUX 1064 and a small file server 1068 before reaching the master file server 1072. Digital data such as electronic books received from publishers 282 is then stored on the master file server 1072. It is preferred that the digital data is stored compressed in a standard format such as MPEG2.

A system controller 1076 provides control over the regional or national books-on-demand system. Electronic books may be packaged into groups to provide feeds to various cable headends. In addition, scheduling and marketing research are conducted at the operations center 250. In order to handle the scheduling and market research, electronic book buy data is received at the operations center 250 through a multiplexer 1082. Electronic book buy information can be provided by the operation center 250 to the billing and collection system 278.

The operations center 250 is also equipped to insert messages or advertisements into the file server. These messages or advertisements will eventually be received by the subscribers.

The master file server 1072 uses an output multiplexer 1080 and ATM 1028 as well as satellite connections to distribute digital data. In a preferred embodiment, cable headends receive text data on electronic books from the master file server 1080 through the output multiplexer 1028 and an ATM system 1028. After receiving the electronic book data, the cable headends store the books in a local file server 1024. FIG. 18a's distribution point 1020 is an example of a cable headend which may receive data from the operations center 250 of FIG. 18b through an ATM hookup 1088 or satellite hookup.

VII. Information Manipulation Features for Electronic Books

An electronic book may include various features for manipulating text or other information within it. As discussed below, those features include highlighting, copying and pasting, cutting and pasting, and annotating information. Other features include simultaneously displaying multiple pages selected by a subscriber, displaying one or more pages on a viewer having multiple screens, rotating images and sizing images.

Figure 19:
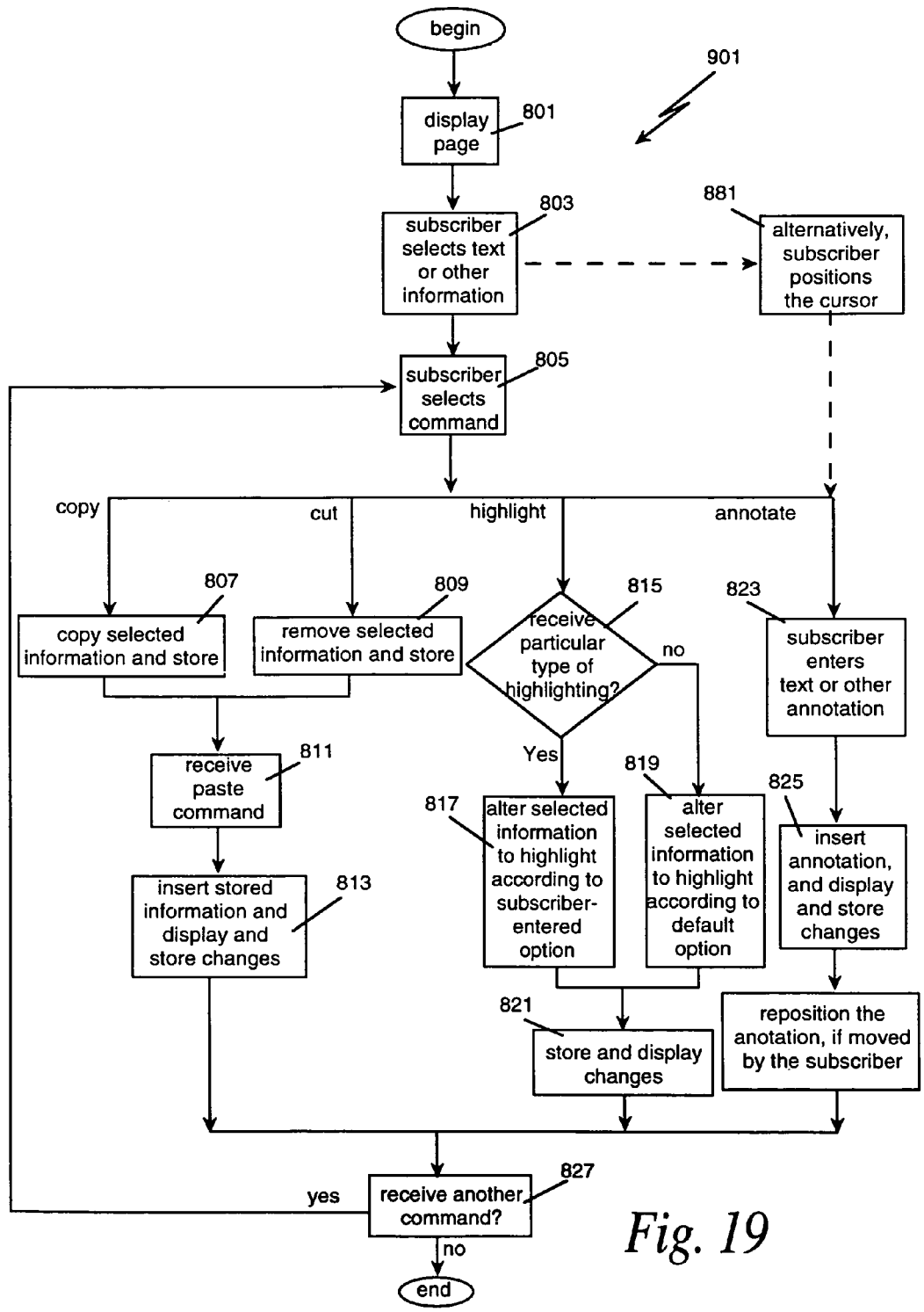
FIG. 19 is a flow chart of a process for highlighting, cutting and pasting, copying and pasting, and annotating text in an electronic book.

FIG. 19 is a flow chart of an information manipulation process 901 for highlighting, cutting and pasting, copying and pasting, and annotating text or other information in an electronic book. The information manipulation process 901 may be implemented within the viewer 266, the library 262, or a combination. For example, the image manipulation process 901 may be implemented by software modules residing within the instruction memory unit 632 for execution by the library processor 628 or within the instruction memory 732 for execution by the viewer processor 621, or a combination. Within the information manipulation process 901, the display page module or process 801 provides for displaying a page on the viewer 266. The page display may be accomplished using the process shown in FIG. 12 in which the subscriber selects a particular electronic book for viewing. The description that follows assumes the viewer processor 621 performs all software module execution steps.

In the select text process 803, a subscriber selects text or other information, which may be accomplished by using controls 740 to manipulate the curser to select a portion of text. In particular, the subscriber may select displayed text or other information by moving the cursor across the information to be selected using a trackball 743 while depressing a selection button 745 (see FIG. 11). Other types of selection are possible, such as using a touch-sensitive screen and permitting the subscriber to select information by touching the appropriate part of the screen, or using other types of cursor-control devices, including peripheral devices, and selection buttons to manipulate a cursor over information to be selected.

The viewer 266 may provide an indication of the selected text or other information by showing the text or other information shaded, showing the text in an alternate color, or using another type of indicator. If the subscriber selects a command process 805, such as a highlight command, a highlight decision process 815 is executed and the processor 621 determines if the subscriber has requested any particular type of highlighting. The term highlighting refers to providing an indication of text or other displayed information in order to distinguish the highlighted text from other displayed information. If the subscriber has selected a highlighting option using the process 817, the processor 621 alters the selected information to highlight the information according to the subscriber-entered option. Otherwise, the processor 621, using a default process 819, alters the selected information to highlight it according to a default option. The highlighted information is then stored and displayed by the processor 621 using a store process 821.

If the subscriber entered a copy command, the processor 621, using a copy process 807, copies and stores the selected information as identified by the subscriber during the select text process 803. If the subscriber entered a cut command, the processor 621 executes a remove process 809 and removes and stores the selected information. Upon receiving a paste command, as determined during execution of a paste process 811, the processor 621, using an insert process 813, inserts the stored information, typically at a location of the cursor, and displays and stores the changes.

If the subscriber entered an annotate command, the processor 621, using text process 823, permits the subscriber to enter a text or other annotation. An annotation may include, for example, text, graphical information, still images, video clips, multi-media information or an electronic link identifier. A subscriber may indicate a location to enter an annotation by, for example, using the controls 740 (see FIG. 14a) to select text or other information to annotate under control of the processor 621 executing the select text process 803. Alternatively, the subscriber, using controls 740 to position the cursor, may create an annotation under control of the processor 621 using the subscriber position cursor process 881.

Using an insert process 825, the processor 621 inserts the annotation, and displays and stores the changes. The annotation is typically inserted at a location of the cursor identified using the positions cursor process 881, or proximate to the selected information identified using the select text process 803, so that the subscriber may choose where to enter the annotation within a particular displayed page of the electronic book. The subscriber may alternatively move a location of the annotation elsewhere within the page by using the controls 740 to select the annotation and move the annotation to a new location. The subscriber can cut, copy, and paste the annotation. Using a reposition process 826, the processor 621 repositions the annotation, if moved by the subscriber.

Using a receive another command process 827, the processor 621 determines if the subscriber has entered another command. If the subscriber has entered another command, the process repeats. In addition, if the subscriber selected information to annotate, the processor 621 may indicate the selected information along with the annotation by, for example, highlighting the selected information or displaying the selected information within a box or other type of border.

Figure 20:
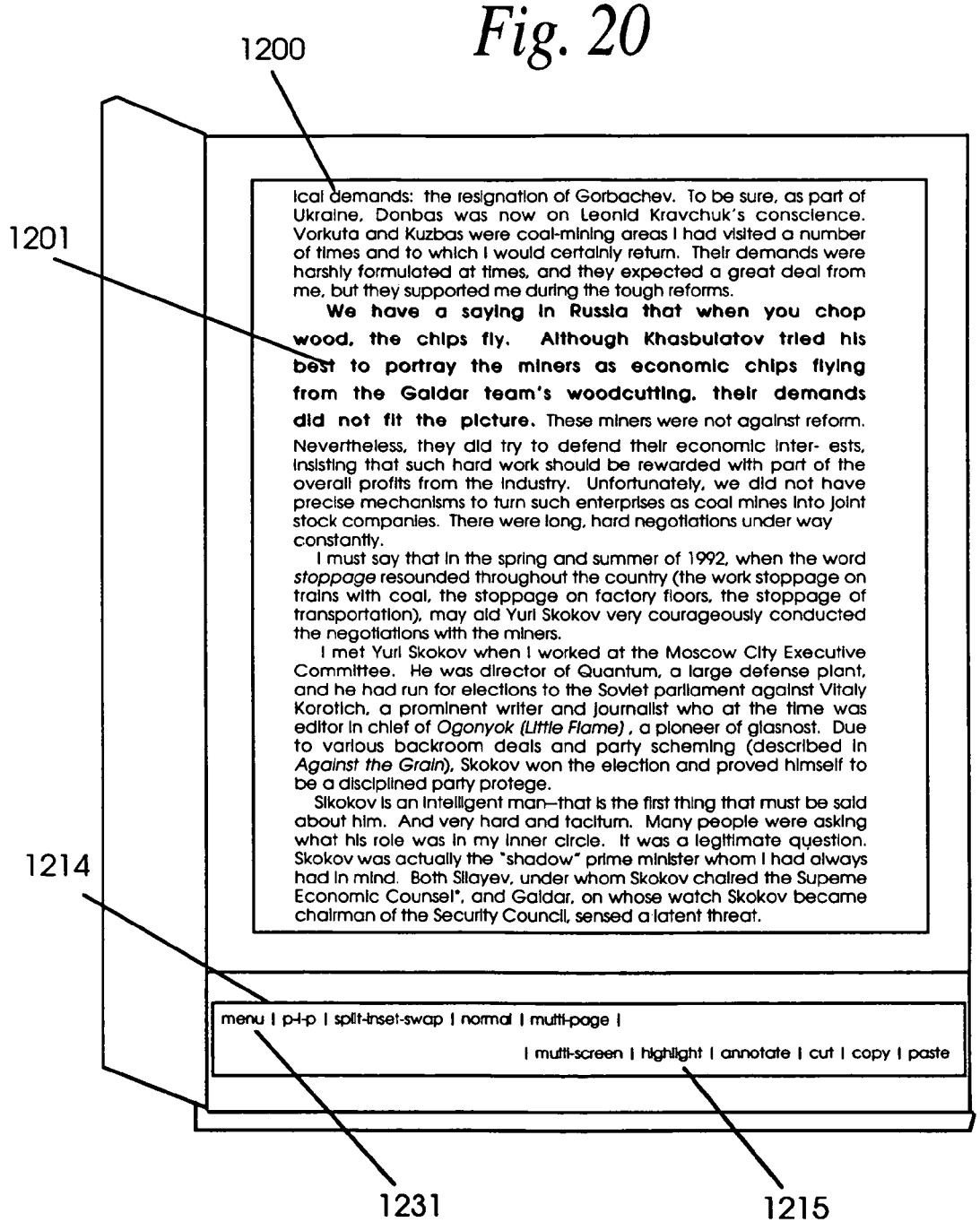
FIG. 20 is a schematic illustrating an example of highlighting text in an electronic book.
Figure 21:
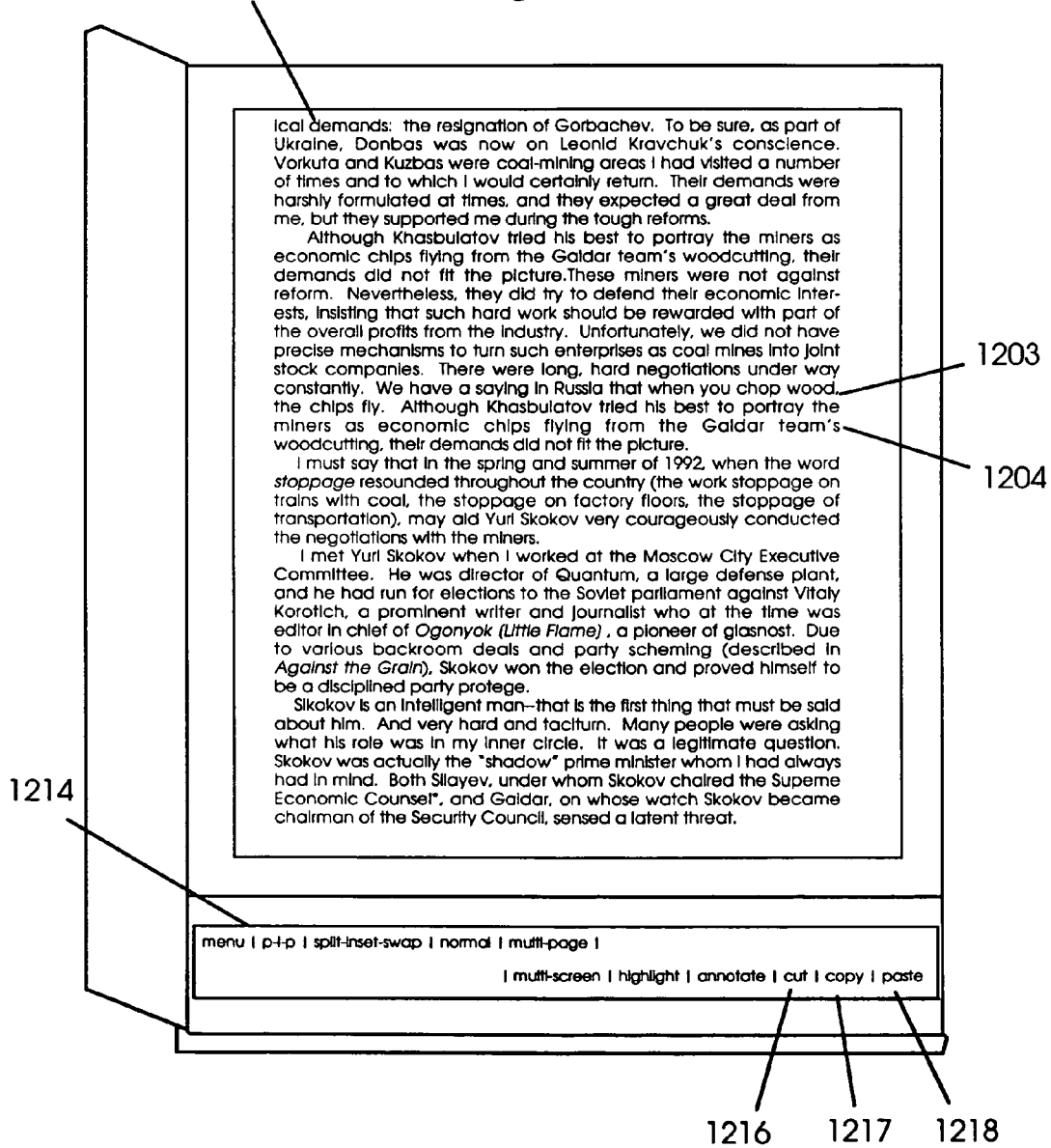
FIG. 21 is a schematic illustrating an example of cutting and pasting, and copying and pasting, text in an electronic book or between electronic books.
Figure 22:
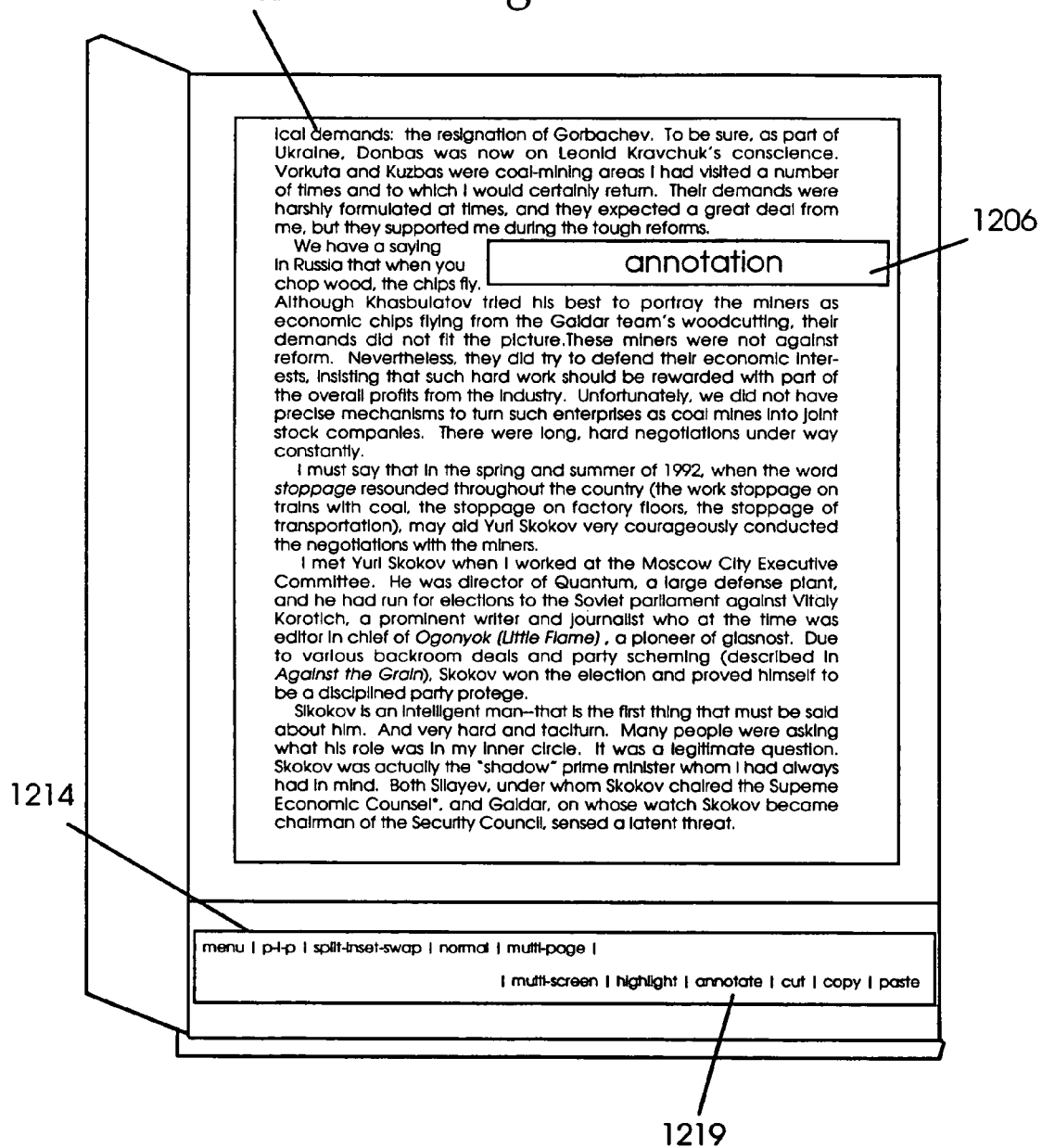
FIG. 22 is a schematic illustrating an example of annotating text in an electronic book.

FIGS. 20-22 are examples of text screens illustrating use of the commands in the information manipulation process 901. FIG. 20 is an example of a text screen 1200 on the viewer 266 displaying highlighted text 1201. In an embodiment, the text screen 1200 includes a task bar 1214 having a number of sections 1215-1227 and 1231 for selecting particular commands. The term section (1215-1227 and 1231) refers to a definable portion of the screen, and the phrase task bar (1214) refers to a collection of sections for permitting selection of various commands. For instance, a subscriber may select a highlight command by manipulating the controls 740 to select the highlight section 1215 using the cursor or by using a particular key stroke. A subscriber also may select a menu section 1231 in task bar 1214 in order to view menus on the viewer 266, such as the menus identified in FIG. 13, and then may select an electronic book for viewing from the menus. The act of selecting a section may involve, for example, positioning the cursor or a pointer over the section using the trackball 743 and depressing the selection button 745 to "click on" the section. Other cursor-control devices, including peripheral devices, may be used to select a section.

In this example, highlighted text 1201 is shown as shaded. Other types of highlighting may be used such as, for example, illustrating the text or other displayed information in a different color, in a box, in a different font, in bold, in italics, underlined, or in reverse video. In addition, the subscriber may highlight other types of information in addition to text. The viewer 266 may present highlighting options by presenting a section with options when the subscriber selects the highlight section 1215. Alternatively, the viewer 266 may include a screen for setting various display and other controls, which may include a section for setting highlighting options. In addition, although the task bar 1214 includes the sections 1215-1227 and 1231 in contiguous horizontal form, the sections of the task bar 1214 may be displayed vertically on the left or right margin, scattered among the screen, or in some other geometric representation.

Typical cut, copy, and paste commands are illustrated by a text screen 1202 shown in FIG. 21. A subscriber may select cut, copy, and paste commands by manipulating the controls 740 (the trackball 743 and the selection button 745) to select, respectively, sections 1216, 1217, and 1218 using the cursor, or by using particular key strokes. The text screen 1202, which may be displayed on the viewer 266, corresponds to the text screen 1200 shown in FIG. 20. In this example, the highlighted text 1201 has been cut, copied, and pasted. In particular, the first sentence in highlighted text 1201 has been cut and pasted at location 1203. The second sentence in highlighted text 1201 has been copied and pasted at location 1204. Although these commands are illustrated with text, they may apply to other information such as, for example, graphical information, still images, or video clips. Although the example in FIG. 21 is shown as cutting and pasting, and copying and pasting, text within one electronic book, the viewer 266 typically may cut and paste, and copy and paste, text or other information between two or more electronic books, or between electronic books and other data sources such as word processing programs. When text is added or deleted from an electronic book, the electronic book typically automatically repaginates.

FIG. 22 is an example of an annotated screen 1205 on the viewer 266 displaying an annotation 1206 within the text. The subscriber may select an annotate command by manipulating the controls 740 (the trackball 743 and the selection button 745) to select an annotate section 1219 using the cursor or by using a particular key stroke. Upon selection of the annotate section 1219, the viewer 266 may present section 1206 at a location of the cursor and permit the subscriber to enter text or other information into section 1206. The annotation may include text, graphical information, still photos, video clips, or multimedia information. The information may include subscriber-entered information, default information provided by the viewer 266, or a combination. The annotation may be displayed, for example, in a box, highlighted, or as codes or symbols. The annotation may cover the text beneath it, or the text beneath the annotation may scroll around the annotation. Text for annotation may be created using the remote wired keyboard 267 or wireless keyboard 268 shown in FIG. 6a. Text may also be created using a soft keyboard displayed on the viewer 266. The soft keyboard may be displayed during the annotation step and may be hidden at other times.

Figure 23:
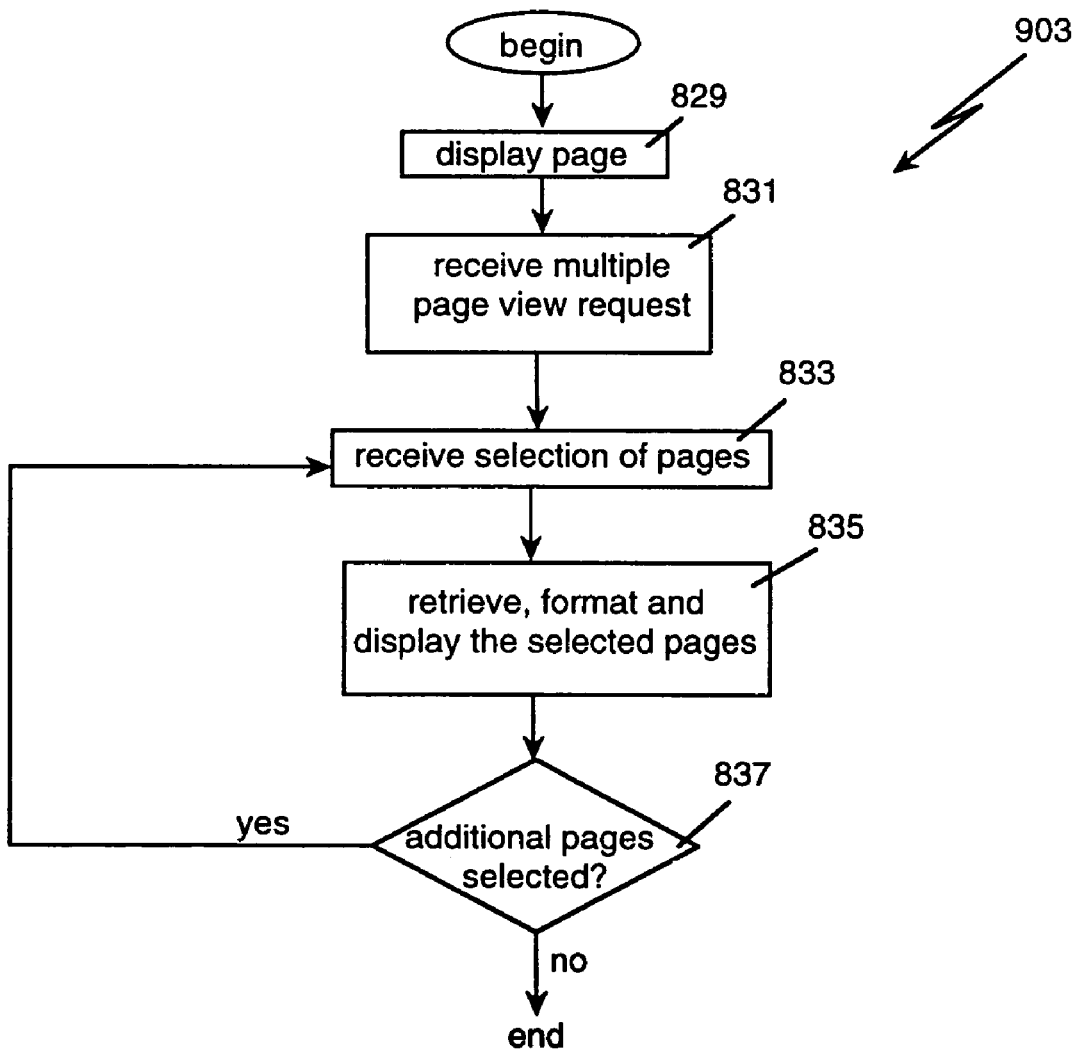
FIG. 23 is a flow chart of a process for displaying multiple pages of an electronic book.

FIG. 23 is a flow chart of a multiple display process 903 for displaying multiple pages. The process 903 may be implemented within the viewer 266, the library 262, or a combination. For example, the process 903 may be implemented by software modules residing within the instruction memory unit 632 for execution by the library processor 628 or within the instruction memory 732 for execution by the viewer processor 621, or a combination. The process 903 may be used by the subscriber to view a plurality of pages within an electronic book. For example, instead of viewing consecutive pages, as typically presented on the viewer 266, the subscriber may wish to view non-consecutive pages, such as those having related information. Therefore, the viewer 266 may display, for example, on a split screen, two or more pages selected by the subscriber.

In the multiple display process 903, the processor 621, executing a display page module or process 829, displays a page. Using a request process 831, the processor 621 receives a multiple page view request. A receive process 833 is used by the processor 621 to receive a selection of pages. In response, using a display process 835, the processor 621 retrieves, formats, and displays the selected pages of the electronic book. Formatting may involve reducing the size of the pages and appending them together to display as one image on the viewer 266. A decision process 837 determines if additional pages are selected. If so, the display process 835 again retrieves and displays the newly selected pages.

Figure 24:
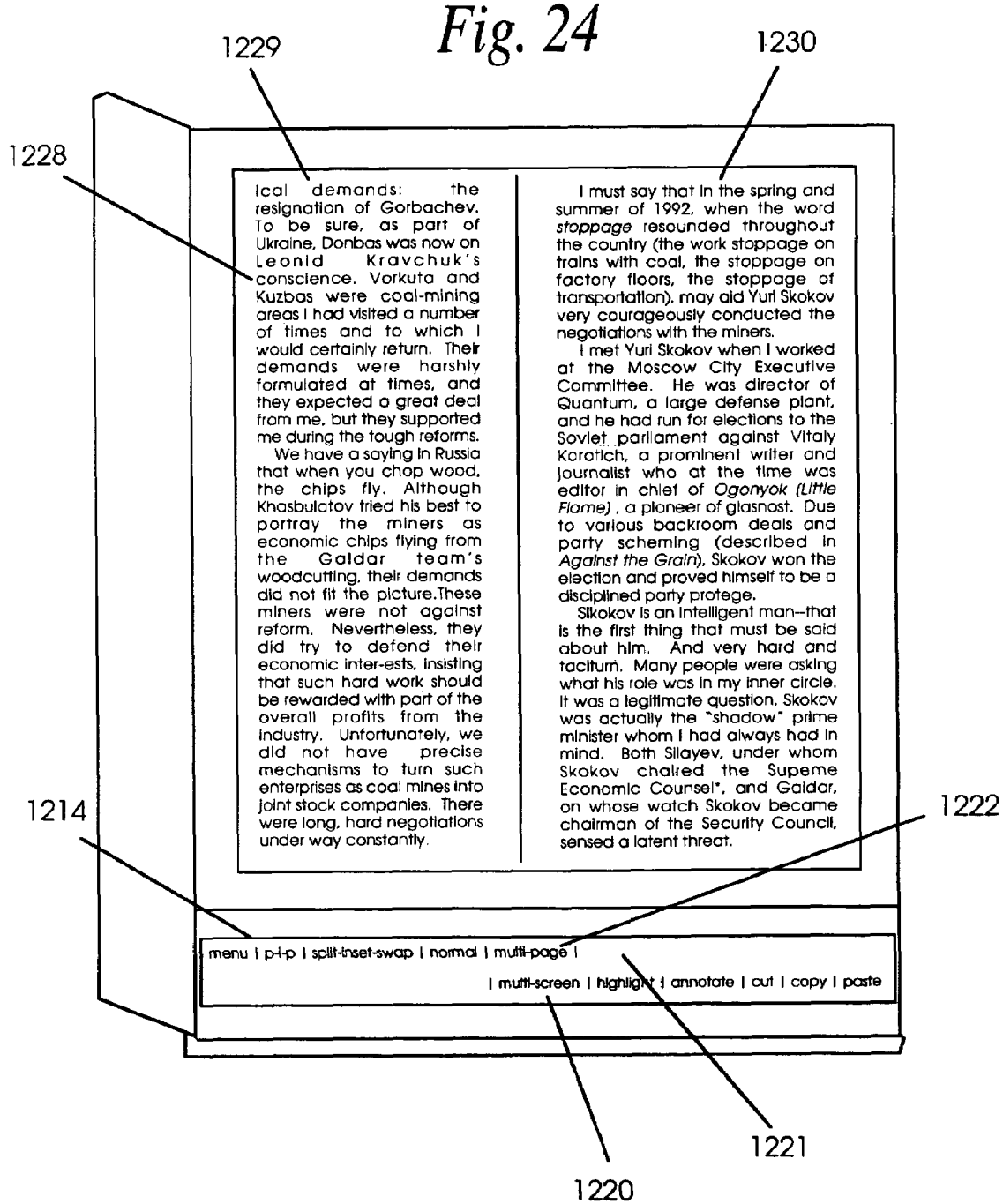
FIG. 24 is a schematic illustrating an example of viewing multiple pages in an electronic book.

FIG. 24 is an example illustrating how two pages 1229 and 1230 may be displayed simultaneously on the viewer 266 within one split-screen 1228. The subscriber may select multiple page view by manipulating the controls 740 (the trackball 743 and the selection button 745) to select a multi-page section 1220 in the task bar 1214, and the subscriber may enter pages to view within a page section 1221 of the task bar 1214. In addition, the subscriber may select pages from different electronic books for simultaneous viewing by selecting the menu section 1231 to select another electronic book or other information source and, if necessary, select a page by entering a page or pages in the page section 1221.

Therefore, the subscriber may select which particular pages among any of the pages in the electronic book are to be displayed on the viewer 266. Although the pages are shown displayed as a side-by-side image, the pages may be displayed vertically. In addition, although only two pages are shown displayed, the viewer 266 may format varying number of pages to be displayed. For example, the viewer 266 may receive a selection of four pages and display the four pages in four equally sized sections of the viewer 266. In addition, the viewer 266 may display the page numbers along with the page content. Although only text is shown, pages may contain other types of information such as, for example, graphical, video, or multimedia information. When multiple pages are displayed, information contained on each of the multiple pages may be manipulated as described herein. For example, if four pages from an electronic book are displayed simultaneously, the subscriber may elect to manipulate information on the third page. To do so, the subscriber may operate the controls 740 (the trackball 743 and the selection button 745) to select the third page and to then manipulate information on, or associated with, the third page. For example, the subscriber may select a paragraph of text in the third page, copy the text, and then scroll or drag the copied text to the first page of the four displayed pages.

Figure 25:
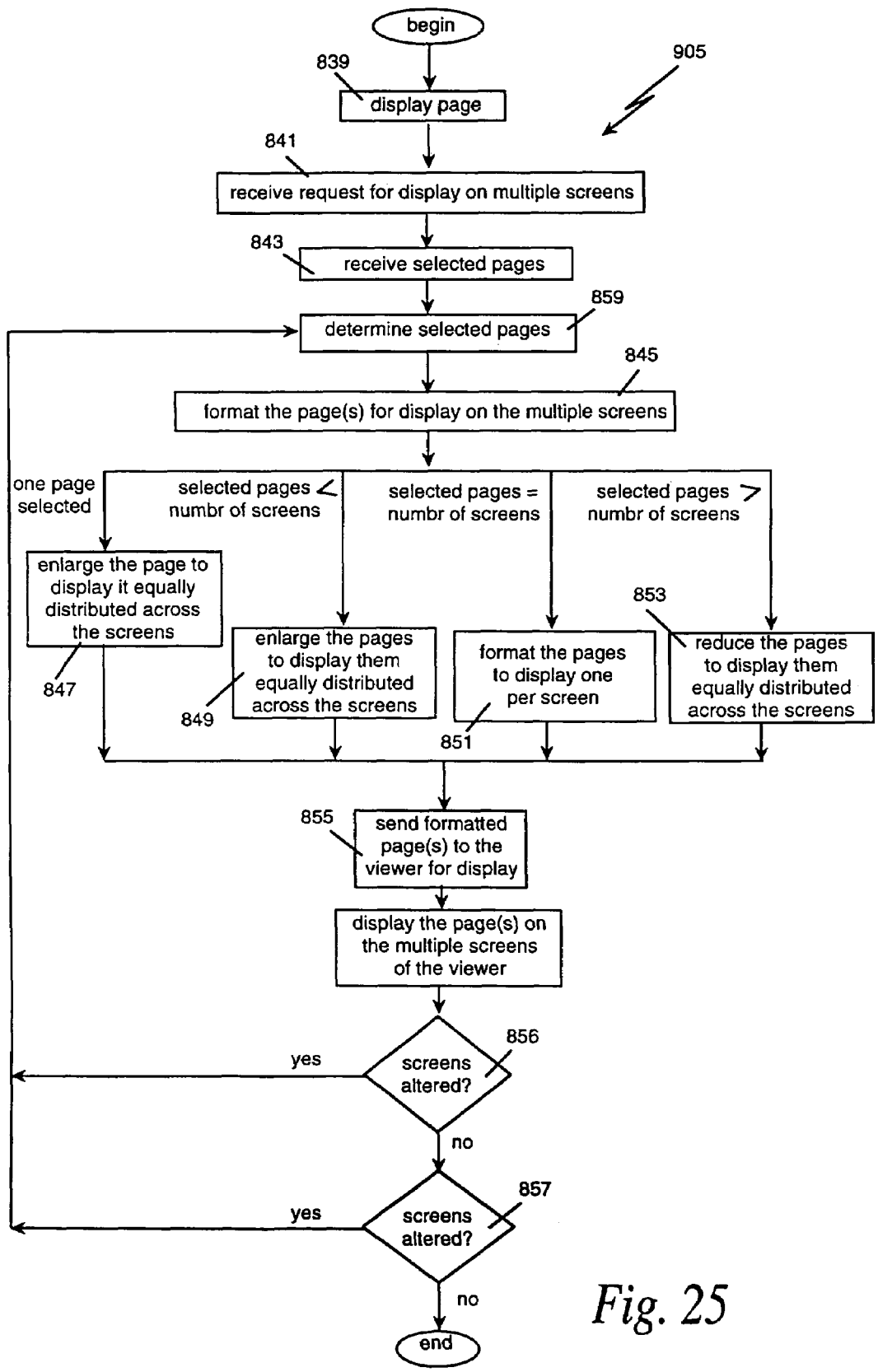
FIG. 25 is a flow chart of a process for displaying one or more pages of an electronic book on a viewer having multiple screens.
Figure 26A:
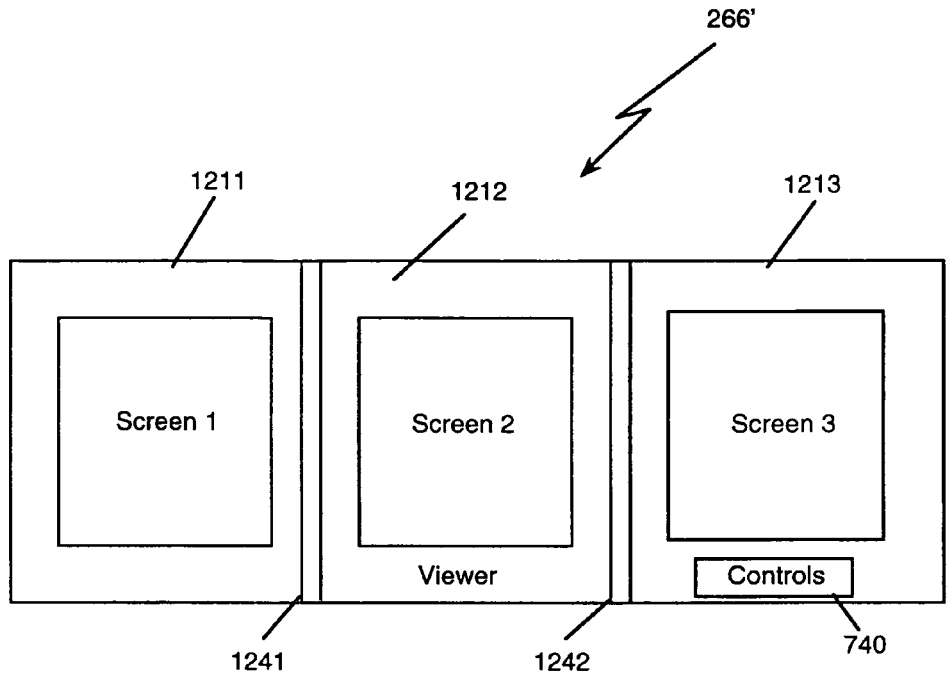
FIG. 26*a* is a schematic illustrating a first viewer having multiple screens.

FIG. 25 is a flow chart of a multiple screen display process 905 for displaying pages on an electronic book viewer having multiple screens. The process 905 may be implemented within the viewer 266, the library 262, or a combination. For example, the process 905 may be implemented by software modules residing within the instruction memory unit 632 for execution by the library processor 628 or within the instruction memory 732 for execution by the viewer processor 621, or a combination. Displaying images on multiple screens involves formatting one or more pages to be displayed on a number of associated screens. For example, as shown in FIG. 26a, an electronic book viewer 266' may include three screens, 1211, 1212, and 1213. The screens may be connected in a variety of positions, such as horizontally, vertically, T-shape, rectangular, square, or some other geometric configuration.

Figure 26B:
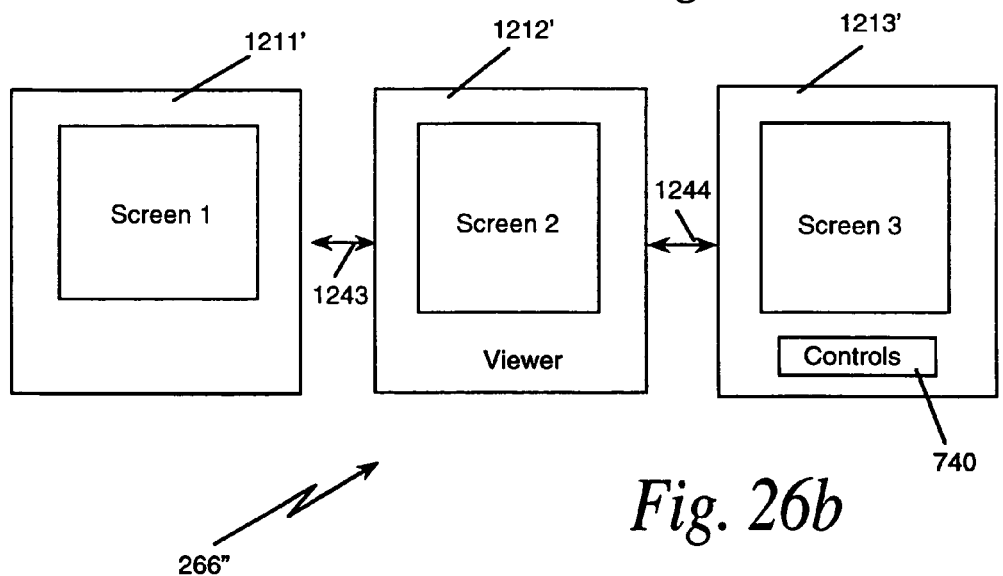
FIG. 26*b* is a schematic illustrating a second viewer having multiple screens.

The screens 1211, 1212, and 1213 may be physically connected by hinges 1241 and 1242, including electrical connections between screens for transmitting electronic book content and commands. As another example, as shown in FIG. 26b, a viewer 266" may include three screens 1211', 1212', and 1213' that snap together, or become otherwise joined together, by physical and electrical connectors, as represented by arrows 1243 and 1244. The subscriber may select a multiple screen view by manipulating the controls 740 (the trackball 743 and the selection button 745) to select a multi-screen section 1222 in the task bar 1214, as shown in FIG. 24, or by using a particular key stroke, and the subscriber may enter pages to view within the page section 1221 of the task bar 1214. At least one of the screens 1211-1213 and 1211'-1213' may include the task bar 1214 for selecting a command and entering pages.

Referring to FIG. 25, in the multiple screen display process 905, the processor 621, executing a display page module or process 839, displays a page. Next, using a request process 841, the processor 621 receives a request for display on multiple screens. Using a receive process 843, the processor 621 receives selected pages, which the subscriber may specify by manipulating the controls 740. Next, in a determination process 859, the processor 621 determines a number of screens in the viewer 266, which may be accomplished by electronically interrogating the connections between screens to determine how many screens are interconnected.

The processor 621 next uses a format process 845 to format the page or pages for display on the multiple screens. Using the format process 845, the processor 621 determines the number of pages for display and compares that number with the number of screens available for displaying the page or pages. If only one page was selected, the processor 621 uses a first format process 847 to format the selected page for display across all screens in the viewer 266. If the number of selected pages is less than the number of screens, the processor 621 uses a second format process 849 to format the selected pages for display. One method of formatting is to equally distribute the selected pages across the screens, which involves resizing and scaling up or scaling down the pages for display among the available screens. If the number of selected pages equals the number of screens, the processor 621 uses a third format process 851 to format the selected pages to display one page per screen. If the number of selected pages is greater than the number of screens, the processor 621 uses a fourth format process 853 to format the selected pages to display them equally distributed across the screens, which involves resizing and reducing the pages to fit among the screens.

The processor 621 uses known techniques for sizing a page to fit an available screen. For example, the processor 621 may apply sub-sampling routines to create a thumbnail image of a page, and then may display the thumbnail image in a reduced size window on a screen. For example, an electronic atlas may include many full page maps. A select number of the maps may be displayed on the viewer screen by first creating thumbnail images, and then arranging their display on the viewer screen. In this way, several full page images may be viewed and compared in a convenient manner. For example, nine full page maps from the electronic atlas may be displayed simultaneously on the viewer screen. Digital data compression techniques for images (including text and images) are well known and need not be repeated here. For example, *Data Compression In Digital System*, by Ray Hoffman, (Chapman & Hall, 1977), the disclosure of which is hereby incorporated by reference, describes such data compression techniques.

An image displayed on the viewer 266 may be scaled down by dropping, or decimating, rows and columns of pixels within the image. Alternatively, each pixel in the reduced-size image may be created by averaging neighboring pixels in the original image.

To make an image larger, the existing pixels in the original image may be replicated in two dimensions. However, such a scaled-up image is likely to be "blocky." To avoid the blocky appearance, each pixel in the scaled-up image is created by applying a color smoothing or dithering algorithm to pixels in the original image.

The scaling up and down may be performed with text and graphic images, and with still (for example, JPEG) and moving (for example, MPEG 2) images. These and other techniques may be used to display multiple images on a single screen, multiple images on multiple screens and multiple images on multiple screens.

Once the selected pages have been resized, the processor 621, using a display process 855, sends the formatted page or pages to the viewer screen(s) for display. Then, using display process 883, the processor 621 displays the formatted page or pages on the multiple screens of the viewer 266. The processor 621 uses decision process 856 to determine the number of screens changes. This may occur by the subscriber adding additional screens to the viewer 266 or removing screens from the viewer 266, if the viewer 266 contains removable screens or the capability to deactivate particular screens. If this occurs, the processor 621 returns to the determination process 859 to determine the number of screens and then formats the page or pages accordingly. Otherwise, the processor 621 determines if additional pages are selected using decision process 857.

FIGS. 26*c*, 26*d*, and 26*e*, in which each box represents one screen, illustrate the display of a page or pages on multiple screens. If a single image 1245 represents one page, FIG. 26*d* illustrates enlargement of the page to display the page as a first image 1246 and a second image 1247. FIG. 26*e* illustrates enlargement of the page to display the page as a first image 1248, a second image 1249, a third image 1250, and a fourth image 1251. In comparison, if the first image 1248, the second image 1249, the third image 1250, and the fourth image 1251 together represent one page, FIG. 26*d* illustrates reduction of the pages to display the pages as the first image 1246 and the second image 1247, and FIG. 26*c* represents reduction of the pages to display the pages as the single image 1245. If the first image 1248, the second image 1249, the third image 1250, and the fourth image 1251 each represent one page, FIG. 26*e* illustrates display of one page per screen, alternatively, FIG. 26*e* shows an enlargement of a single page to four screens.

VII. Picture-in-Picture Feature for Electronic Books

Picture-in-picture viewing permits the subscriber to simultaneously display on the viewer 266, pages or portions of two different electronic books, or content from an electronic book and another information source, such as video or multimedia information. The electronic book for viewing may be selected from electronic books stored in the viewer 266 or an associated library viewer 262, or may be obtained from a received signal. The other information source, when used, may be received using an electronic or electromagnetic signal such as a television signal, video signal, cable television signal, or wireline or wireless telephone or data source signal. For example, while viewing an electronic book the subscriber may want to simultaneously view a television program or a particular video.

When electronic content is obtained from memory, a system for picture-in-picture viewing formats the two or more electronic books, or electronic books and other electronic information, for simultaneous display. When electronic content is obtained from a received signal, the viewer 266 performs necessary decoding or other processing for simultaneously displaying a page of an electronic book along with the other electronic information.

a. Picture-in-Picture Process

Figure 27:
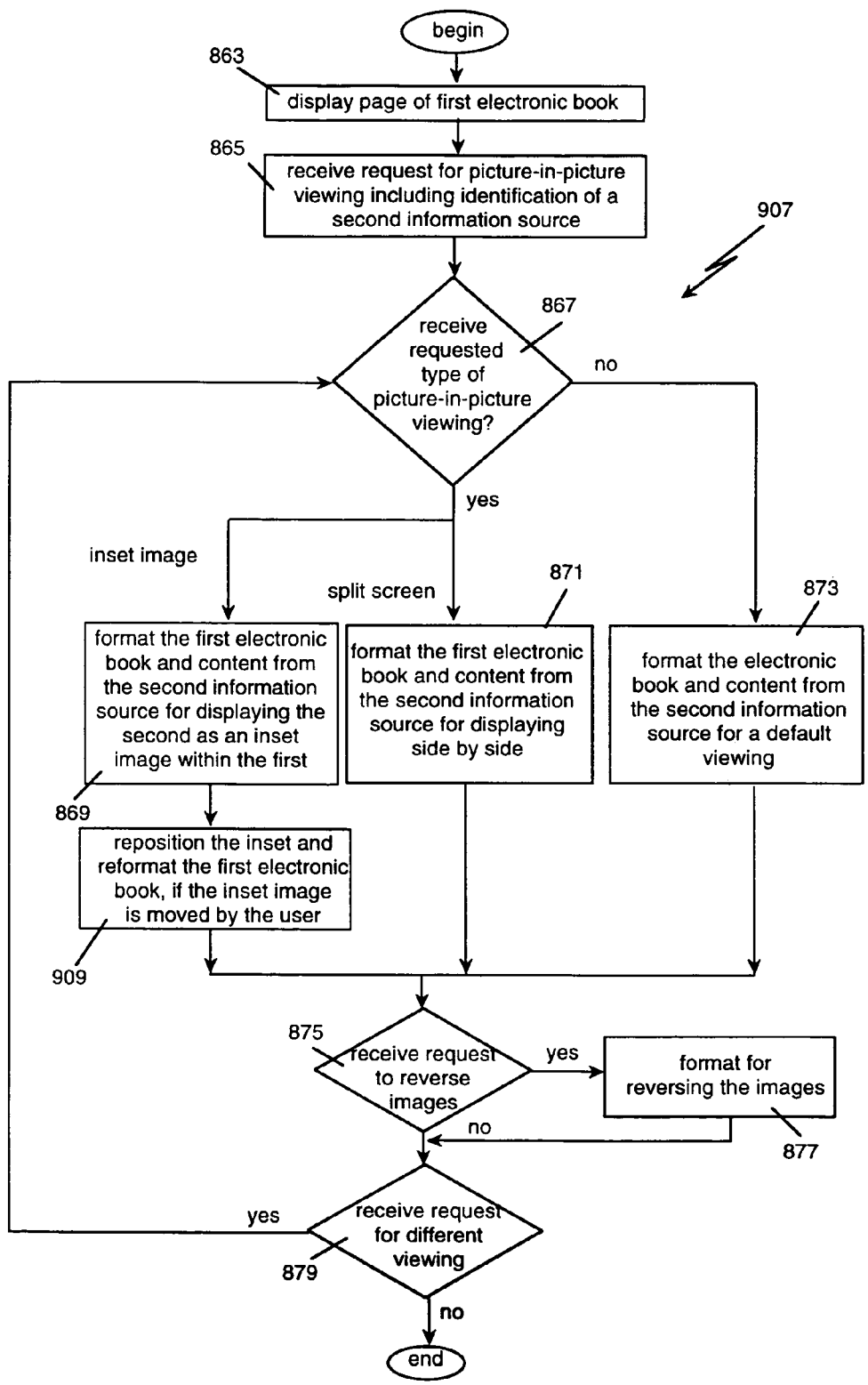
FIG. 27 is a flow chart of a process for displaying picture-in-picture images of electronic books.

FIG. 27 is a flow chart of a picture-in-picture viewing process 907 for picture-in-picture viewing of electronic books and other electronic information. The process 907 may be implemented within the viewer 266, the library 262, or a combination. For example, the process 907 may be implemented by software modules residing within the instruction memory unit 632 for execution by the library processor 628 or within the instruction memory 732 for execution by the viewer processor 621, or a combination. In the picture-in-picture viewing process 907, the viewer 266, using a display page module or process 863, displays a page of a first electronic book. Using the receive request process 865, the processor 621 receives a request for picture-in-picture viewing from the subscriber along with an identification of a second information source, such as a second electronic book, a television signal, a video signal, still photos, content from the Internet, electronic book electronic links, or multi-media information. Using a decision process 867, the processor 621 determines if the subscriber entered a request for a particular type of picture-in-picture viewing format, which may include, for example, use of an inset image or side-by-side images. If the subscriber did not enter a particular type of picture-in-picture viewing format, the processor 621 uses a default process 873 to format the first electronic book and content from the second information source for picture-in-picture viewing according to a particular default format setting.

Otherwise, the library 262 or the viewer 266 formats the first electronic book and the content from the second information source according to the subscriber-entered option. In particular, if the subscriber requested an inset image, the processor 621, using an inset image process 869, formats the first electronic book and the content from the second information source for displaying content from the second information source as an inset image within the first displayed electronic book. Using a reposition process 909, the processor 621 then repositions the inset image and reformats the first electronic book, if the inset image is moved by the subscriber. If the subscriber requested side-by-side images, the processor 621 uses a split screen process 871 to format the first electronic book and content from the second information source for display as side-by-side images. After displaying the picture-in-picture images, each display functions independently, permitting the subscriber to advance pages in the first electronic book, for example, by selecting the displayed image of the first electronic book. Using reverse images decision process 875, the processor 621 determines if the subscriber entered a request to reverse the displayed images. If so, the processor 621 executes a reverse format process 877 to reverse the display. The processor 621 then uses a decision process 879 to determine if the subscriber entered a request for different viewing. If the subscriber entered a different viewing request, the processor 621 returns to the decision process 867. Various multimedia experiences, programs, and displays may be created using two or more images.

Figure 28B:
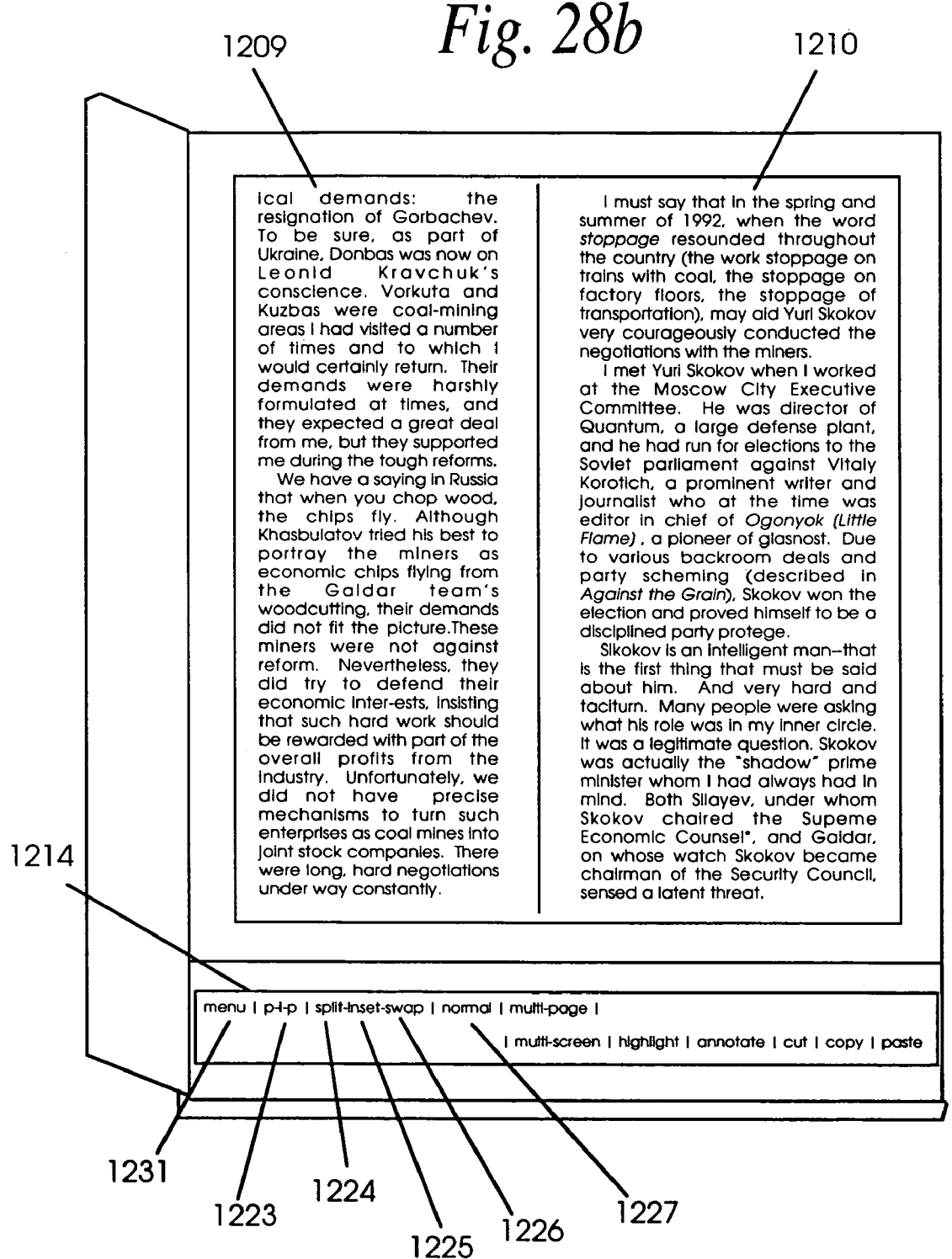
FIG. 28*b* is a schematic illustrating use of a side-by-side images for picture-in-picture viewing of electronic books.
Figure 28C:
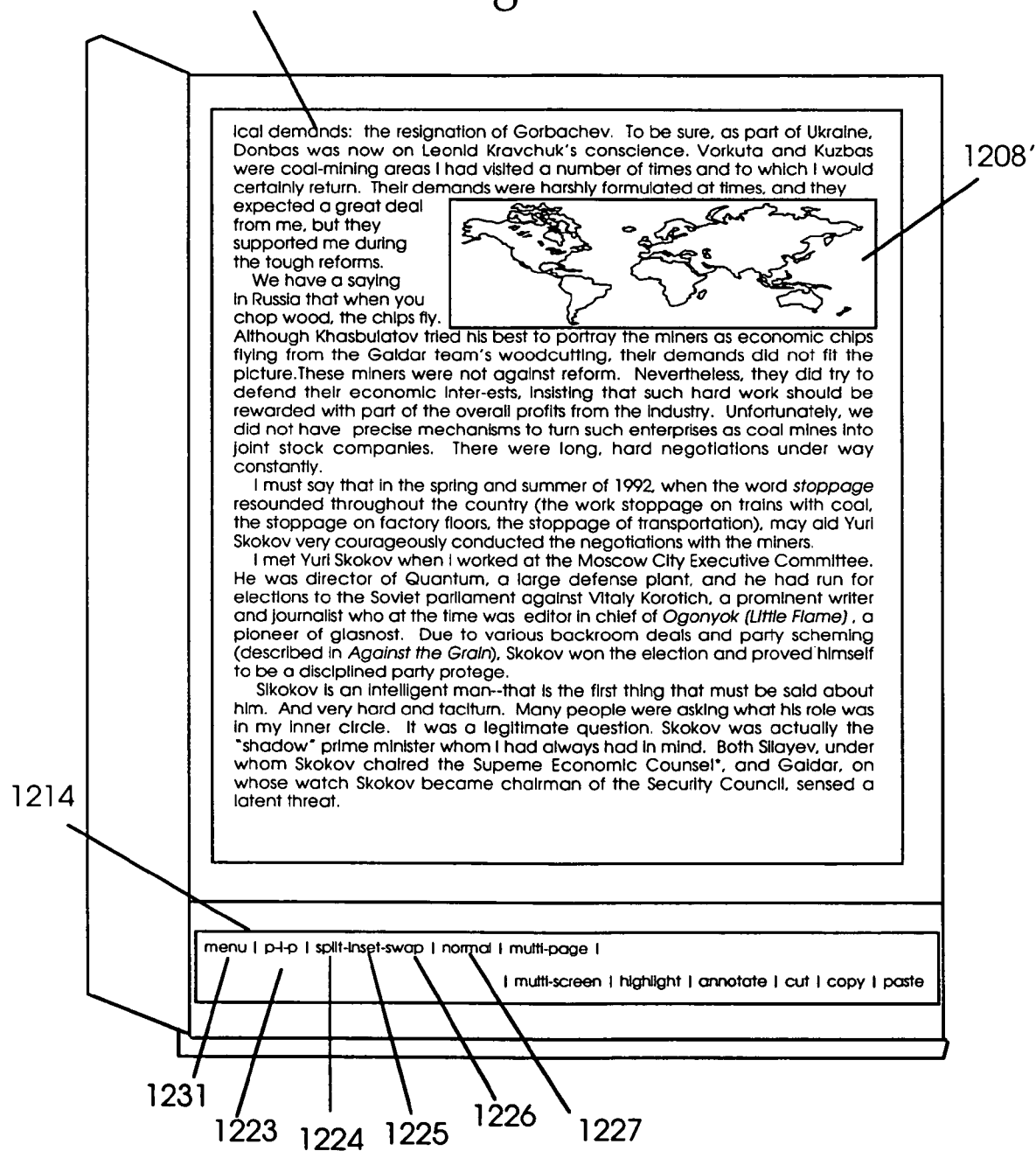
FIG. 28*c* is a schematic illustrating use of an inset image within a main image for picture-in-picture viewing of an electronic book and other information such as graphical images or video.

FIGS. 28a, 28b, 28c, and 28d are examples of displays for picture-in-picture viewing. In the display of FIG. 28a, a portion of a first electronic book is displayed as a main image 1207, and a portion of a second electronic book is displayed as an inset image 1208. In the display of FIG. 28b, side-by-side images display a portion of a first electronic book 1209 adjacent a portion of a second electronic book 1210. In the display of FIG. 28c, a portion of a first electronic book is displayed as a main image 1207', and content from a second information source, such as a television or video signal, is displayed as an inset image 1208'. In the display of FIG. 28d, side-by-side images display a portion of a first electronic book 1209' adjacent to content 1210' from a second information source such as a television or video signal.

As shown in FIGS. 28a and 28c, the viewer 266 typically formats the content 1207 and 1207' from the electronic book so that the content 1207 and 1207' wraps around the inset images 1208 and 1208', respectively, in order to display a portion of the content 1207 and 1207' that would otherwise be concealed by inset images 1208 and 1208'. In this manner, content from the electronic book is not obstructed because the inset image does not overlay the main image. This is particularly well-suited for text. In addition, if the subscriber moves a location of the inset image 1208 or 1208', the processor 621 uses the reposition process 909 to reformat the content 1207 and 1207' to display the portion concealed by the new location of the inset image 1208 or 1208', respectfully.

In an alternative embodiment, the main image 1207 and 1207' may be formatted so that the inset images 1208 and 1208', respectively, overlay and obstruct the portion of the main image at the location of the inset images. If the main image 1207 or 1207' is a television or video signal, then the viewer 266 typically overlays the inset image 1208 or 1208' to avoid distortion of the main image as may occur with wrapping the main image around an inset image. In addition, the subscriber may typically position the inset image anywhere within the main image by using the cursor and the controls 740 to select and move the inset image to a new location. The size of the inset image may also be changed.

The subscriber may select picture-in-picture viewing by manipulating the controls 740 (the trackball 743 and the selection button 745) to select a p-i-p section 1223 in the task bar 1214, or by using a particular key stroke. In order to display an inset image, as shown in FIG. 28a, the subscriber may select an inset section 1225. To display the electronic books as side-by-side images, as shown in FIG. 28b, the subscriber may select a split section 1224. The subscriber may switch between the inset view and the split image view by selecting the split section 1224 and the inset section 1225 for the desired view. The subscriber may reverse or swap the displayed images by selecting a swap section 1226 in the task bar 1214. Upon selecting the swap section 1226, the viewer 266 switches positions of the images. By selecting a normal view section 1227, the subscriber may exit the picture-in-picture mode and return to normal viewing, in which case the main image 1207 or left image 1209 becomes the sole displayed image, for example. The subscriber may select the first and second electronic books, or the first electronic book and the second information source, for viewing by selecting the menu section 1231 on the task bar 1214 and selecting particular electronic books or other information sources from the displayed menu.

b. Picture-in-Picture Tuning: Electronic Book and an Information Source

Figure 29A:
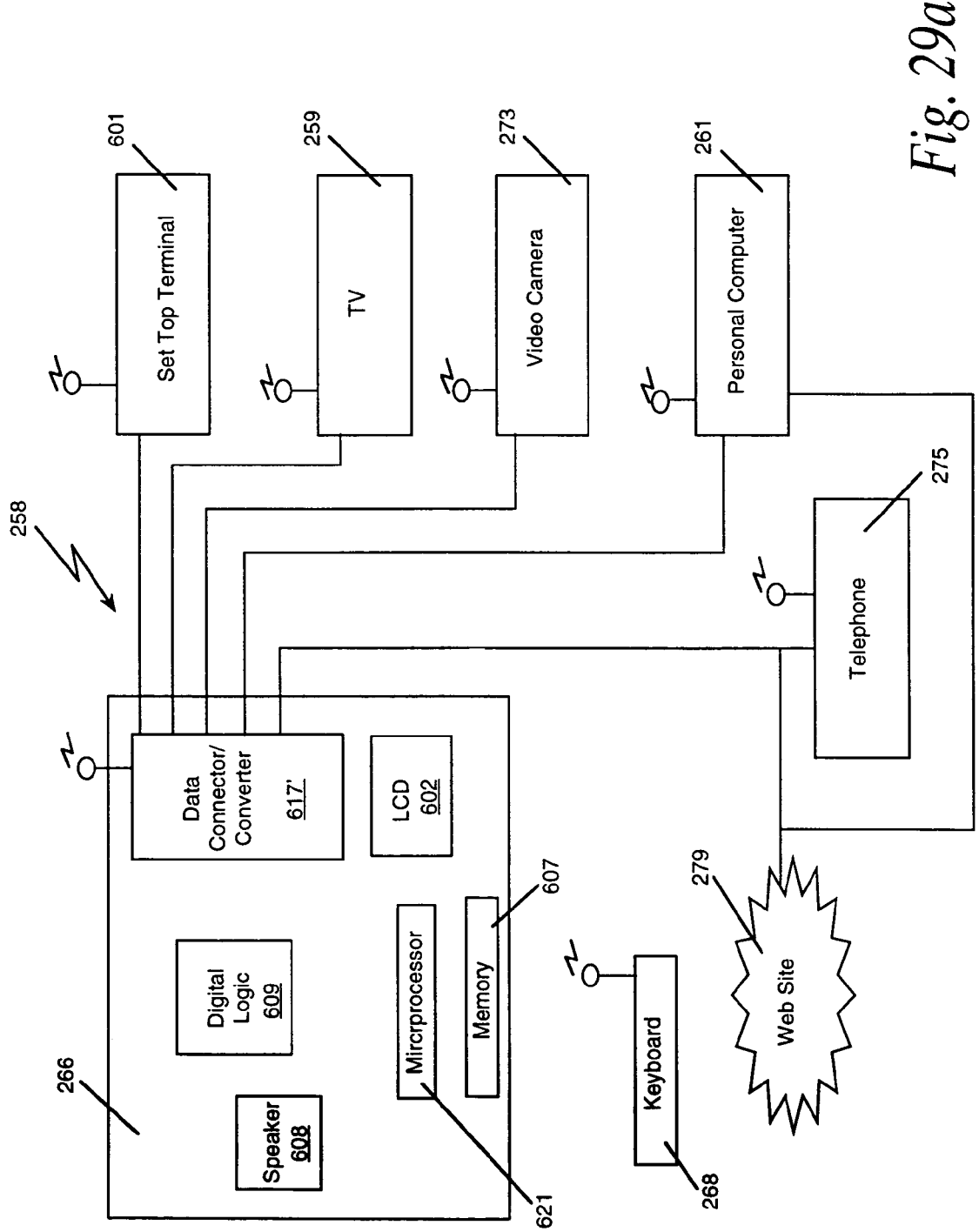
FIG. 29*a* is a schematic diagram of an electronic book home system for receiving and displaying multiple signals in a picture-in-picture format.

The viewer 266 or the home system 258 may be used to provide picture-in-picture capability with one or more signals coming from an information source or a component that is external to the home system 258. FIG. 29a shows an embodiment of the home system 258 that is intended to display multiple images in a picture-in-picture format. In FIG. 29a, the home system 258 comprises a single unit, namely the viewer 266. The viewer 266 includes the digital logic 609, the microprocessor 621, the memory 607, and the LCD 602. The functions of these components have been described previously. Also included in the viewer 266 is a data connector/converter 617'. The data converter 617' includes the functions of the tuner 613, data stripper 617, modem 611 and RF transceiver 604 described in connection with FIG. 6b. The data converter 617' receives data signals from wired or wireless communications paths and passes the signals to the digital logic 609 for processing and display on the LCD 602. The data converter 617' may for example receive signals from a wireless keyboard 268, a telephone 275, a personal computer 261, a video camera 273, a television 259 or a set top terminal 601. As shown in FIG. 29a, all of these components may communicate with the viewer 266 using either wired or wireless communication paths. The viewer 266 may also receive data signals from the Internet web site 279. Data signals from the Internet web site 279 may be received directly from the Internet or by using the personal computer 261, for example. The data converter 617' receives the data signals from one or more of the multiple sources shown in FIG. 29a and converts the signal into an appropriate format for display on the LCD 602. The received signal may be displayed as text, a JPEG image, or an MPEG image, for example. The data converter 617' may also receive audio and output the audio to a speaker 608. Alternately, the audio may be converted to text and displayed on the LCD 602. Text information displayed on the personal computer 261, using for example a word processing program, may be sent to the data converter 617' and displayed as text on the LCD 602. Television signals received at either the set top terminal 601 or the television 259 may be displayed as video signals on the LCD 602. The video camera 273 may provide a live video feed to the viewer 266 for display on the LCD 602. Commands or text typed in using the keyboard 268 may be displayed on the LCD 602. Finally, web pages such as a web page available at the web site 279 may be displayed on the LCD 602. The memory 607 may store programs and menus to allow the subscriber to select which of the multiple information sources will provide a display on the viewer 266. For example, the subscriber may decide to display an electronic book on the viewer 266 and concurrently to display in a window on the LCD 602, a live feed from the video camera 273, and in another window on the LCD 602, a broadcast television program being received by the television 259, for example.

Figure 29B:
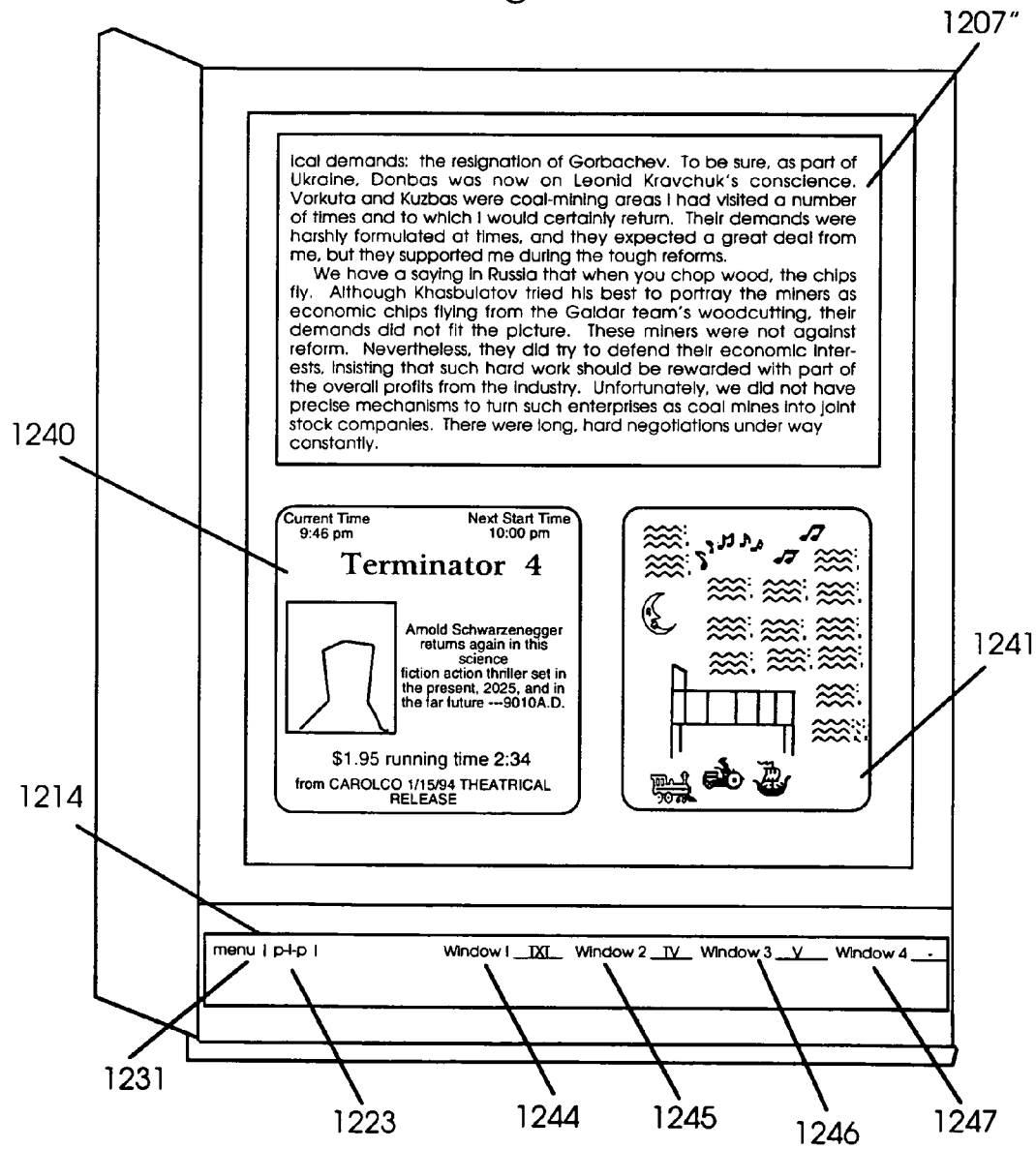
FIG. 29*b* shows the electronic book viewer displaying multiple images from separate information services.

FIG. 29b shows an example of the multiple information sources being displayed on the viewer 266. In FIG. 29b the menu bar 1214 shows the menu selection 1231 and the p-i-p selection 1223. The subscriber has elected to use the p-i-p function and the menu bar therefore displays four window options 1244-1247. In FIG. 29b the subscriber has elected to play the text from an electronic book using window one 1244, a television show using window two 1245 and a video feed from a video camera using window three 1246. Window four 1247 is not used. The result is shown as the text in a full width, upper window 1207" television show in a split with lower window 1240 and a video feed in a second split window 1241.

There are many practical uses for the multiple screen, split screen and picture-in-picture features of the viewer 266. Examples of uses of these features include, but are not limited to, the following.

For example, while in the garage working on a vehicle the subscriber can use the viewer 266 to help make a repair easier. The subscriber can use part of the LCD 602 to display the instructions to make the necessary repair on the automobile, can also display schematics, drawings and/or pictures of the parts, a short video on how to make the repair, as well as continuously watching the video camera 273 showing the front door or baby's crib.

When the car repair is completed, the subscriber can move the viewer to the kitchen where the subscriber can have one, two or more of the following on the viewer 266: a list of ingredients, text of a recipe, a video on how to mix the ingredients, listing of measurement conversions, and a video feed from a child's play room. More simply, the subscriber can read a book in the backyard while simultaneously watching the baby's playpen indoor on a video feed.

While this invention has been described in conjunction with the embodiments described above, it is evident that many alterations, modifications and variations will be apparent to those skilled in the art. Accordingly, embodiments of the invention as set forth above are intended to be only illustrative. Various changes may be made without departing from the scope of the invention as defined in the following claims and their equivalents.

The invention claimed is:

1. An apparatus for simultaneously displaying selected pages of an electronic book displayed on a viewer, comprising a plurality of hardware screens, each of the hardware screens being physically and electrically attachable, detachable, and reattachable to each other in a plurality of geometric configurations, the apparatus, comprising:
   a command module that receives a request from a subscriber for simultaneously displaying at least a portion of any plurality of pages of the electronic book as selected by the subscriber;
   a determining module that determines the number of hardware screens currently attached to the viewer;
   a format module that formats the selected pages for simultaneous display based on the determined number of hardware screens attached to the viewer; and
   a display module that simultaneously displays the portions of the selected pages on the plurality of hardware screens of the viewer,
   wherein, if a number of the selected pages is equal to the number of hardware screens, each selected page is displayed on a different one of the hardware screens,
   wherein, if the number of the selected pages is less than the number of hardware screens, the selected pages are enlarged and each of the hardware screens displays a different portion of the enlarged selected pages, and
   wherein, if the number of the selected pages is greater than the number of hardware screens, the selected pages are reduced and are distributed across the plurality of hardware screens.

2. The apparatus of claim 1, further including a task module that displays a task bar for use in receiving the request.

3. An apparatus for displaying at least one selected page of an electronic book displayed on a viewer having a plurality of hardware screens, each of the hardware screens being physically and electrically attachable, detachable, and reattachable to each other in a plurality of different geometric configurations, comprising:
   a command module that receives a request from a subscriber for displaying at least one page of an electronic book on the viewer;
   a determining module that determines the number of hardware screens currently attached to the viewer;
   a format module that formats the selected page for display on the screens of the viewer based on the determined number of hardware screens attached to the viewer; and
   a display module that provides the selected page for display across the screens of the viewer,
   wherein, if a number of the at least one page is equal to the number of hardware screens, each of the at least one page is displayed on a different one of the hardware screens,
   wherein, if the number of the at least one page is less than the number of hardware screens, the at least one page is enlarged and each of the hardware screens displays a different portion of the enlarged page, and
   wherein, if the number of the at least one page is greater than the number of hardware screens, the at least one page is reduced and is distributed across the plurality of hardware screens.

4. The apparatus of claim 3, wherein the format module includes a multiple page format module that formats the page for display on three hardware screens.

5. The apparatus of claim 3, further including a task module that displays a task bar for use in receiving the request.

6. The apparatus of claim 3, wherein the format module enlarges the page for proportional display across the hardware screens.

7. The apparatus of claim 3, wherein:

the command module receives a request for displaying a plurality of pages; and the multiple page format module reduces the pages for proportional display across the hardware screens.

8. The apparatus of claim 3, further including a screen detect module that detects a number of hardware screens within the viewer.

9. The apparatus of claim 8, wherein:

the screen detect module includes a screen change module that detects a change in the number of hardware screens of the viewer; and the format module includes a reformat module that reformats the selected page for display based upon the detected change.

\* \* \* \* \*